United States Patent
Park et al.

(10) Patent No.: US 11,929,821 B2
(45) Date of Patent: Mar. 12, 2024

(54) METHOD AND APPARATUS FOR DETERMINING AND APPLYING TIMING ADVANCE IN COMMUNICATION SYSTEM

(71) Applicant: Samsung Electronics Co., Ltd., Gyeonggi-do (KR)

(72) Inventors: Sungjin Park, Gyeonggi-do (KR); Jeongho Yeo, Gyeonggi-do (KR); Youngbum Kim, Gyeonggi-do (KR); Seho Myung, Gyeonggi-do (KR); Cheolkyu Shin, Gyeonggi-do (KR); Seunghoon Choi, Gyeonggi-do (KR); Hyunseok Ryu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/741,107

(22) Filed: May 10, 2022

(65) Prior Publication Data
US 2022/0376778 A1    Nov. 24, 2022

(30) Foreign Application Priority Data

May 10, 2021    (KR) ............. 10-2021-0060285
May 11, 2021    (KR) ............. 10-2021-0060970

(51) Int. Cl.
*H04W 84/06*    (2009.01)
*H04B 7/185*    (2006.01)
*H04W 56/00*    (2009.01)

(52) U.S. Cl.
CPC ...... *H04B 7/18589* (2013.01); *H04W 56/001* (2013.01); *H04W 56/0045* (2013.01); *H04W 84/06* (2013.01)

(58) Field of Classification Search
CPC . H04W 56/0045; H04W 56/00; H04W 16/28; H04W 84/04; H04W 88/08;
(Continued)

(56) References Cited

U.S. PATENT DOCUMENTS

2019/0230660 A1*    7/2019    Xie .................. H04W 88/14
2021/0051672 A1*    2/2021    Rastegardoost .... H04W 74/006
(Continued)

FOREIGN PATENT DOCUMENTS

EP          3860235 A1 *    8/2021    ............. G01S 19/05
KR    10-2022-0009777           1/2022
(Continued)

OTHER PUBLICATIONS

Moderator(Thales), "FL Summary on Enhancements on UL Time and Frequency Synchronization for NR", R1-2102215, P3GPP TSG-RAN WG1 Meeting #104-e, Jan. 25-Feb. 5, 2021, 85 pages.
(Continued)

*Primary Examiner* — Nathan S Taylor
(74) *Attorney, Agent, or Firm* — The Farrell Law Firm, P.C.

(57) ABSTRACT

The disclosure relates to a communication technique for converging IoT technology with 5G communication systems designed to support a higher data transfer rate beyond 4G systems, and a system therefor. Provided is a method for operation of a user equipment and a base station in a wireless communication system, including identifying a timing advance (TA) value for transmitting an uplink signal and transmitting the uplink signal, with the TA value identified based on a first value, a second value, and a third value $N_{TA}$. The first value is based on a random access response or a timing advance medium access control control element, the second value is derived from higher layer parameters, and the third value is obtained by the UE based on a position of the UE and a position of a satellite connected to the UE.

18 Claims, 38 Drawing Sheets

(58) Field of Classification Search
CPC ............. H04W 56/001; H04W 84/06; H04B 7/18589; H04B 7/185
See application file for complete search history.

(56) References Cited

U.S. PATENT DOCUMENTS

| | | | |
|---|---|---|---|
| 2021/0105761 A1* | 4/2021 | Cheng | H04B 7/18504 |
| 2021/0153193 A1* | 5/2021 | Lin | H04W 72/542 |
| 2021/0352613 A1* | 11/2021 | Yoon | H04L 5/0032 |
| 2022/0078856 A1* | 3/2022 | Jeon | H04W 56/005 |
| 2022/0086780 A1* | 3/2022 | Tsai | H04W 56/005 |
| 2022/0231809 A1* | 7/2022 | Cha | H04W 72/044 |
| 2022/0232503 A1* | 7/2022 | Cheng | H04W 56/0045 |
| 2022/0286355 A1* | 9/2022 | Park | H04L 41/0806 |
| 2022/0322414 A1* | 10/2022 | Khoshkholgh Dashtaki | H04B 7/18513 |
| 2022/0330187 A1* | 10/2022 | Cheng | H04W 56/004 |
| 2022/0330374 A1* | 10/2022 | Kim | H04W 72/23 |
| 2022/0346050 A1* | 10/2022 | Ko | H04W 56/00 |
| 2022/0408389 A1* | 12/2022 | Wang | H04W 56/005 |
| 2023/0113784 A1* | 4/2023 | Cha | H04W 72/23 370/329 |
| 2023/0247683 A1* | 8/2023 | Lin | H04W 74/0841 370/329 |

FOREIGN PATENT DOCUMENTS

| | | | | |
|---|---|---|---|---|
| WO | WO 2021/022442 | | 2/2021 | |
| WO | WO-2022079692 A1 | * | 4/2022 | |
| WO | WO-2022087330 A1 | * | 4/2022 | |
| WO | WO-2022210001 A1 | * | 10/2022 | ........... H04B 7/1853 |
| WO | WO-2022212482 A1 | * | 10/2022 | |
| WO | WO-2022235665 A1 | * | 11/2022 | |
| WO | WO-2022236055 A1 | * | 11/2022 | |

OTHER PUBLICATIONS

LG Electronics, "Discussions on UL Time and Frequency Synchronization Enhancements In NTN", R1-2103620, 3GPP TSG RAN WG1 #104b-e, Apr. 12-20, 2021, 11 pages.

Moderator(Thales), "FL Summary on Enhancements on UL Time and Frequency Synchronization for NR", R1-2104076, 3GPP TSG-RAN WG1 Meeting #104-bis-e, Apr. 12-20, 2021, 94 pages.

Huawei, HiSilicon, "Report of [POST113-e][106][NTN] MAC Aspects (Huawei)", R2-2103630, 3GPP TSG-RAN WG2 #113b-e, Apr. 12-20, 2021, 41 pages.

International Search Report dated Aug. 8, 2022 issued in counterpart application No. PCT/KR2022/006645, 9 pages.

* cited by examiner

- Link budget between UE and satellite

- Path loss : (1600)
    $FSPL(d, f_c) = 32.45 + 20 \log_{10}(f_c) + 20 \log_{10}(d)$

- Rx antenna gain for UL : 24 dBi (LEO), 45.5 dBi (GEO)

- Link budget between UE and terrestrial gNB

- Path loss (LOS) : (1610)
    $PL_2 = 28.0 + 40 \log_{10}(d_{3D}) + 20 \log_{10}(f_c) - 9 \log_{10}((d'_{BP})^2 + (h_{BS} - h_{UT})^2)$

- Path loss (NLOS) : (1620)
    $PL'_{UMa-NLOS} = 13.54 + 39.08 \log_{10}(d_{3D}) + 20 \log_{10}(f_c) - 0.6 (h_{UT} - 1.5)$

- Rx antenna gain for UL : ~12 dBi

METHOD AND APPARATUS FOR DETERMINING AND APPLYING TIMING ADVANCE IN COMMUNICATION SYSTEM

CROSS-REFERENCE TO RELATED APPLICATION(S)

This application is based on and claims priority under 35 U.S.C. § 119 to Korean Patent Application Nos. 10-2021-0060285 and 10-2021-0060970, filed on May 10, 2021 and May 11, 2021, respectively, in the Korean Intellectual Property Office, the entirety of each of which is incorporated herein by reference.

BACKGROUND

1. Field

The disclosure relates generally to communication systems, particularly to correction of a time offset due to a long distance between a terminal and a satellite, when the terminal transmits and receives a signal to and from a base station.

2. Description of Related Art

Wireless data traffic has increased since deployment of $4^{th}$ generation (4G) communication systems, and efforts have been made to develop an improved $5^{th}$ generation (5G) or pre-5G communication system, also called a beyond 4G network or a post long term evolution (LTE) System. The 5G communication system is considered to be implemented in higher frequency (mmWave) bands, e.g., 60 GHz bands, so as to accomplish higher data rates. To decrease propagation loss of radio waves and increase transmission distance, a beamforming, massive MIMO, FD-MIMO, array antenna, an analog beam forming, large scale antenna techniques are implemented in various 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. Also developed as an advanced access technologies in the 5G system are hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA).

The Internet, which is a human centered connectivity network where humans generate and consume information, is evolving to the Internet of things (IoT) where distributed entities, such as things, exchange and process information without human intervention. The Internet of everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), etc., have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

Meanwhile, as satellite launch costs have decreased, companies providing communication services through satellites have increased. Accordingly, a satellite network has emerged as a next-generation network system for supplementing the conventional ground network. The satellite network cannot provide a user experience that reaches the level of the ground network, but has an advantage of providing a communication service in an area in which it is difficult to construct the ground network or in a disaster situation and also secures economic feasibility due to a recent rapid decrease in satellite launch costs as described above. Further, some companies and the 3GPP standard organization are pushing ahead of direction communication between a smartphone and a satellite.

When a UE desires to be connected to a base station (BS) through a satellite, a large propagation delay time is generated due to a long distance of hundreds of kilometers (km), thousands of km, or longer between the UE and the satellite and between the satellite and the ground BS. Such large delay time may be significantly longer than that of direct communication between the UE and the BS in the ground network. Further, the delay time varies over time since the satellite continuously moves, and all UEs have variable delay time with the satellite or the BS.

SUMMARY

The present disclosure has been made to address at least the above-mentioned problems and/or disadvantages and to provide at least the advantages described below.

An aspect of the disclosure is to provide a method and an apparatus in which the base station indicates time offset information to the terminal; and the terminal calculates and applies a part of timing advance, reports timing advance information to the base station, and corrects a time offset on the basis of the indicated information. Another aspect of the disclosure is to provide a method and apparatus in which, when the UE transmits/receives a signal to/from the BS through the satellite, the BS indicates a time offset to correct a delay time that varies over time and is generated according to a long distance to the satellite and movement of the satellite and the UE corrects the delay time on the basis thereof.

Another aspect of the disclosure is to provide a method and an apparatus in which the UE may calculate a part of the time offset on the basis of locations of the satellite and the UE and time information, apply the same, and report the same to the BS.

In accordance with an aspect of the disclosure, a method is provided for a user equipment (UE) configured to operate in a communication system. The method includes identifying a timing advance (TA) value for transmitting an uplink signal and transmitting the uplink signal, with the TA value identified based on a first value $N_{TA}$, a second value $N_{TA,common}$, and a third value $N_{TA,UE-specific}$, with the first value $N_{TA}$ based on one of a random access response or a timing advance medium access control (MAC) control element (CE), the second value $N_{TA,common}$ derived from higher layer parameters, and the third value $N_{TA,UE-specific}$ obtained by the UE based on a position of the UE and a position of a satellite wirelessly connected to the UE.

In accordance with another aspect of the present disclosure, a method is provided for a base station configured to operate in a wireless communication system. The method includes identifying a TA value for receiving an uplink signal from a UE and receiving the uplink signal, with the TA value based on a first value $N_{TA}$, a second value $N_{TA,common}$, and a third value $N_{TA,UE-specific}$, with the first value $N_{TA}$ associated with a random access response or a timing advance MAC CE, the second value $N_{TA,common}$ associated with higher layer parameters, and the third value $N_{TA,UE-specific}$ obtained by the UE based on a position of the UE and a position of a satellite wirelessly connected to the UE.

In accordance with another aspect of the disclosure, a user equipment (UE) is provided. The UE includes a transceiver and a controller coupled with the transceiver and configured to identify a TA value for transmitting an uplink signal, and transmit the uplink signal, with the TA value identified based on a first value $N_{TA}$, a second value $N_{TA,common}$, and a third value $N_{TA,UE-specific}$, with the first value $N_{TA}$ based on a random access response or a timing advance MAC CE, the second value $N_{TA,common}$ derived from higher layer parameters, and the third value $N_{TA,UE-specific}$ obtained by the UE based on a position of the UE and a position of a satellite wirelessly connected to the UE.

In accordance with another aspect of the disclosure, a base station is provided. The base station includes a transceiver and a controller coupled with the transceiver and configured to identify a TA value for receiving an uplink signal from a UE, and receive the uplink signal, with the TA value based on a first value $N_{TA}$, a second value $N_{TA,common}$, and a third value $N_{TA,UE-specific}$, with the first value $N_{TA}$ associated with a random access response or a timing advance MAC CE, the second value $N_{TA,common}$ associated with higher layer parameters, and the third value $N_{TA,UE-specific}$ obtained by the UE based on a position of the UE and a position of a satellite wirelessly connected to the UE.

As described above, through the disclosure, the UE can access the BS through the satellite, the BS can indicate the time offset to the UE, and the UE can calculate and correct the time offset, and accordingly, the BS and the UE can effectively exchange signals.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
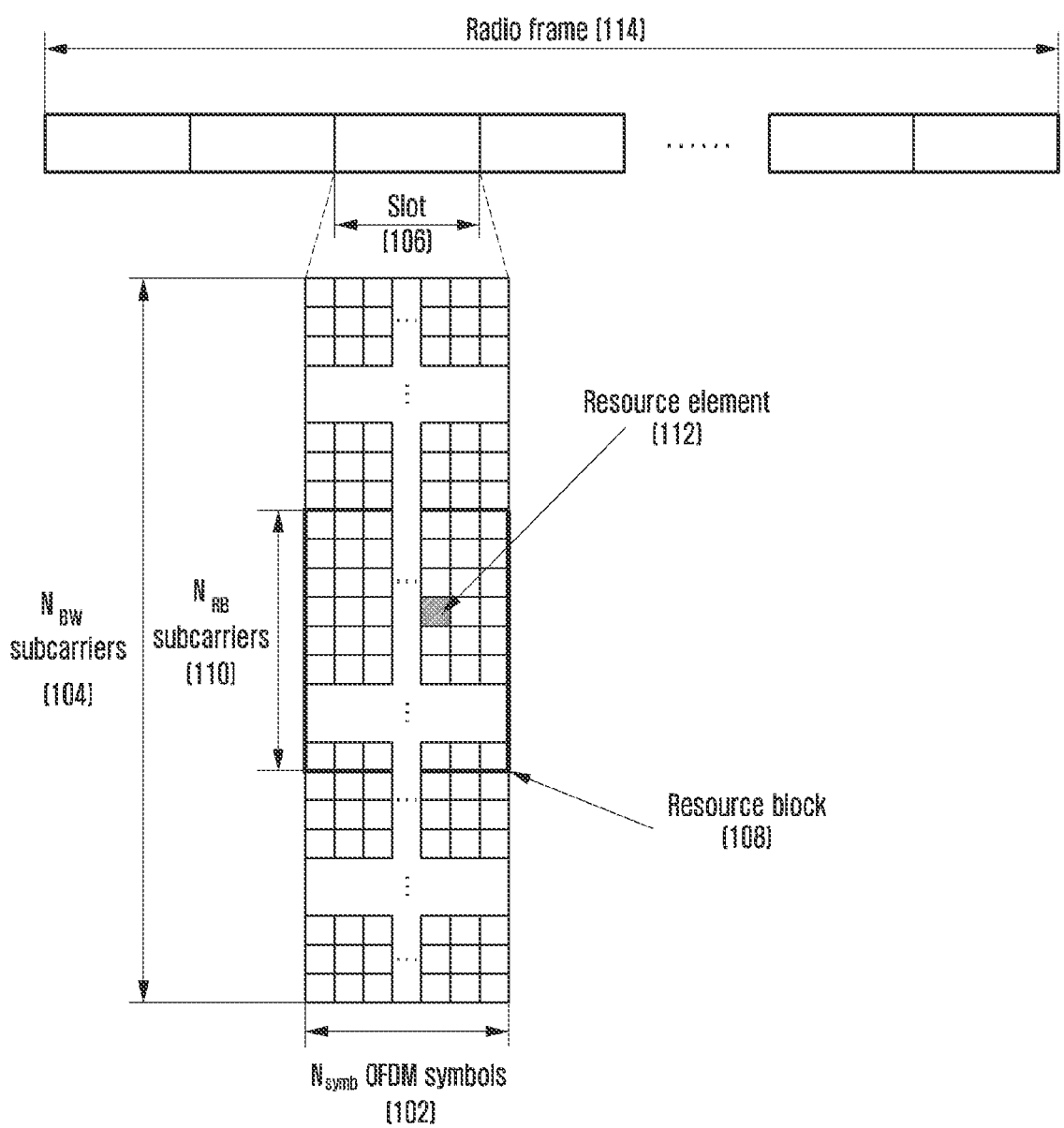
FIG. 1 illustrates a time-frequency domain that is a radio resource area in which data or a control channel is transmitted in a downlink or an uplink of an NR system.

New radio (NR) access technology is designed to freely multiplex various services in time and frequency resources. Accordingly, waveform/numerology and reference signals may be dynamically or freely allocated according to a need of the corresponding service. In order to provide an optimal service to a UE in wireless communication, optimized data transmission through measurement of a channel quality and an amount of interference is important, and thus it is necessary to accurately measure a channel state. However, unlike 4G communication in which channel and interference characteristics are largely unchanged according to frequency resources, channel and interference characteristics are largely changed according to a service in the case of a 5G channel, so that a subset of frequency resource groups (FRGs) for performing measurement according to divided services should be supported. Meanwhile, in the NR system, supported service types may be divided into categories such as enhanced mobile broadband (eMBB), massive machine type communications (mMTC), ultra-reliable and low-latency communications (URLLC), and the like. The eMBB may be a service aiming at high-speed transmission of high-capacity data, the mMTC may be a service aiming at minimization of UE power and access of a plurality of UEs, and the URLLC may be a service aiming at high reliability and low latency. Different requirements may be applied according to the type of service applied to the UE.

As described above, a plurality of services may be provided to a user in a communication system and, in order to provide the plurality of services to the user, a method of providing each service in the same time interval according to a characteristic thereof and an apparatus using the same are needed.

Hereinafter, embodiments will be described in detail with reference to the accompanying drawings, with descriptions related to technical contents well-known in the art and not associated directly with the disclosure will be omitted. Such an omission of unnecessary descriptions is intended to prevent obscuring of the main idea and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages, features and ways to achieve them will be apparent by making reference to embodiments as described below in detail in conjunction with the accompanying drawings. However, the disclosure is not limited to the embodiments set forth below, but may be implemented in various different forms. The following embodiments are provided to inform those skilled in the art of the scope, and the disclosure is defined only by the scope of the appended claims.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchartblock or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and "units" or may be implemented to reproduce one or more central processing units (CPUs) within a device or a security multimedia card. Further, the unit in the embodiments may include one or more processors.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services. As 5th generation wireless communication systems, 5G or NR communication standards are also under discussion.

As an example of the broadband wireless communication system, a NR system employs an orthogonal frequency division multiplexing (OFDM) scheme in a downlink (DL) and an uplink (UL). However, more specifically, the NR system employs a cyclic-prefix OFDM (CP-OFDM) scheme in a DL and employs two schemes, that is, CP-OFDM and discrete Fourier transform spreading OFDM (DFT-S-OFDM) schemes in a UL. The uplink indicates a radio link through which a UE or a mobile station (MS) transmits data or control signals to a BS (gNode B), and the downlink indicates a radio link through which the base station transmits data or control signals to the UE. The above multiple access schemes separate data or control information of respective users by allocating and operating time-frequency resources for transmitting the data or control information for each user so as to avoid overlapping each other, that is, so as to establish orthogonality.

If decoding fails at the initial transmission, the NR system employs hybrid automatic repeat request (HARQ) of retransmitting the corresponding data in a physical layer. In the HARQ scheme, when a receiver does not accurately decode data, the receiver transmits information (negative acknowledge: NACK) informing the transmitter of decoding failure and thus the transmitter may re-transmit the corresponding data on the physical layer. The receiver may combine data retransmitted from the transmitter and previous data, the decoding of which failed, whereby data reception performance may increase. When the receiver accurately decodes data, the receiver transmits information (acknowledgement: ACK) informing the transmitter of decoding success and thus the transmitter may transmit new data.

FIG. 1 illustrates a time-frequency domain that is a radio resource area in which data or a control channel is transmitted in a downlink or an uplink of an NR system.

Figure 2:
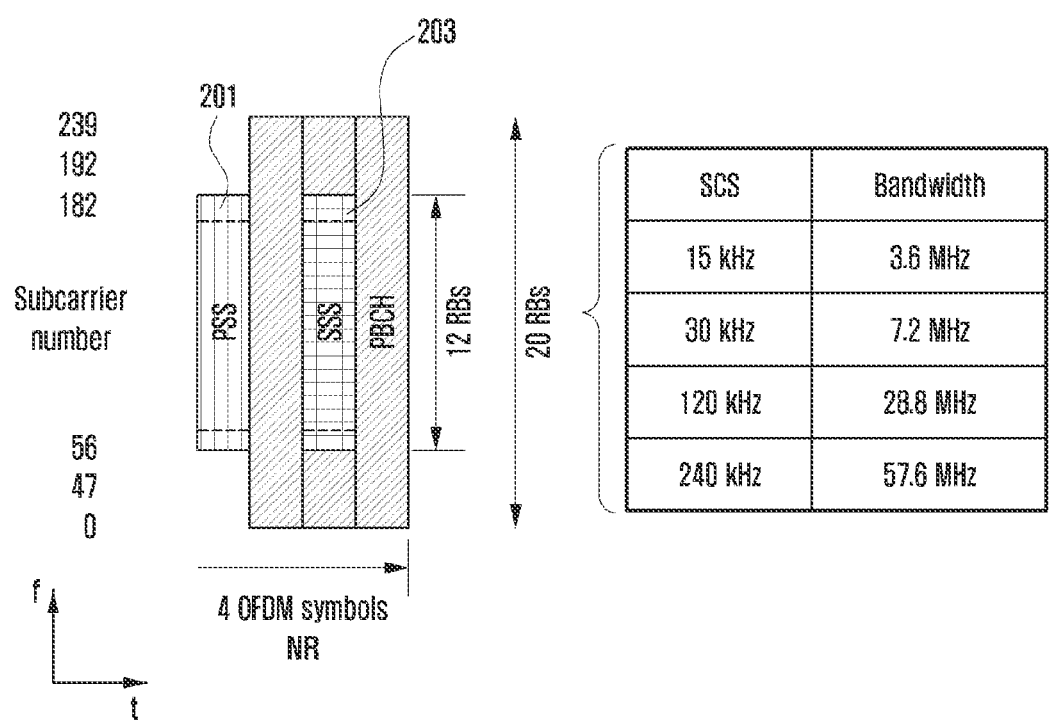
FIG. 2 illustrates mapping of a synchronization signal (SS) and a physical broadcasting channel (PBCH) in the frequency and time domain of the NR system.

Referring to FIG. 1, the horizontal axis indicates a time domain, and the vertical axis indicates a frequency domain. The minimum transmission unit in the time domain is an OFDM symbol, and Nsymb OFDM symbols 102 are in one slot 106. The length of a subframe is 1.0 ms and a radio frame 114 is 10 ms. The minimum transmission unit in the frequency domain is a subcarrier, and a bandwidth of the entire system transmission band includes a total of $N_{BW}$ subcarriers 104. One frame may be 10 ms. A subframe may be 1 ms, and accordingly, one frame may include a total of 10 subframes. One slot may be 14 OFDM symbols (that is, the number $N_{symb}^{slot}$ of symbols=14). One subframe may include one or a plurality of slots, and the number of slots per subframe may vary depending on a configuration value μ for SCS. In FIG. 2, the case in which the SCS configuration value μ=0 and the case in which μ=1 are illustrated. One subframe may include one slot in the case of μ=0, and one subframe may include two slots in the case of μ=1. That is, the number $N_{slot}^{subframe,\mu}$ of slots per subframe may vary depending on the configuration value μ for SCS, and accordingly, the number $N_{slot}^{frame,\mu}$ of slots per frame may become different. $N_{slot}^{subframe,\mu}$ and $N_{slot}^{frame,\mu}$ according to each SCS configuration μ, as shown in Table 1, below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80- | 8 |
| 4 | 14 | 160 | 16 |

A UE before a radio resource control (RRC) connection may receive a configuration of an initial bandwidth part (initial BWP) for initial access from a BS through a master information block (MIB). More specifically, the UE may receive configuration information for a control resource set (CORESET) and a search space in which a physical downlink control channel (PDCCH) for receiving system information (remaining system information: RMSI or system information block 1: SIB1) required for initial access through the MIB can be transmitted in an initial access step. Each of the CORESET and the search space configured through the MIB may be considered as an identity (ID) 0. The BS may inform the UE of configuration information such as frequency allocation information for CORESET #0, time allocation information, numerology, and the like through the MIB. Further, the BS may inform the UE of configuration information for a monitoring period and an occasion of CORESET #0, that is, configuration information for search space #0 through the MIB. The UE may consider a frequency region configured as CORESET #0 acquired from the MIB as an initial bandwidth part for initial access. At this time, the ID of the initial BWP may be considered as 0.

The MIB may include information as shown in Table 2, below.

TABLE 2

```
--ASNI START
-- TAG-MIB-START
  MIB ::=                    SEQUENCE {
  systemFrameNumber              BIT STRING (SIZE (6)),
  subCarrierSpacingCommon        ENUMERATED {scs15or60, scs30or120},
  ssb-SubcarrierOffset           INTEGER (0.. 15),
```

TABLE 2-continued

```
dmrs-TypeA-Position          ENUMERATED {pos2, pos3},
pdcch-ConfigSIB1             ,
cellBarred                   ENUMERATED {barred, notBarred),
intraFreqReselection         ENUMERATED {allowed, notAllowed},
spare                        BIT STRING (SIZE (1))
}
-- TAG-MIB-STOP
--ASN1STOP
```

MIB fields are described below.

cellBarred

Value barred means that the cell is barred, as specified in TS 38.304.

dmrs-TypeA-Position

Position of (first) DM-RS for downlink (see TS 38.211, clause 7.4.1.1.2) and uplink (see TS 38.211, clause 6.4.1.1.3).

intraFreqReselection

Controls cell selection/reselection to intra-frequency cells when the highest ranked cell is barred, or treated as barred by the UE, as specified in TS 38.304.

pdcch-ConfigSIB1

Determines a common CORESET, a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213, clause 13).

ssb-SubcarrierOffset

Corresponds to kSSB (see TS 38.213), which is the frequency domain offset between SSB and the overall resource block grid in number of subcarriers. (See TS 38.211, clause 7.4.3.1).

The value range of this field may be extended by an additional most significant bit (MSB) encoded within PBCH as specified in TS 38.213.

This field may indicate that this cell does not provide SIB1 and that there is hence no CORESET #0 configured in MIB (see TS 38.213, clause 13). In this case, the field pdcch-ConfigSIB1 may indicate the frequency positions where the UE may (not) find a SS/PBCH with a CORESET and search space for SIB1 (see TS 38.213, clause 13).

subCarrierSpacingCommon

SCS for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

systemFrameNumber

The 6 MSBs of the 10-bit system frame number (SFN). The 4 least significant bits (LSBs) of the SFN are conveyed in the PBCH TB as part of channel coding (i.e. outside the MIB encoding), as in clause 7.1 in TS 38.212.

In a method of configuring the BWP, UEs before the RRC connection may receive configuration information for the initial BWP through the MIB from the initial access stage. More specifically, the UE may receive a configuration of a CORESET for a downlink control channel in which downlink control information (DCI) for scheduling a system information block (SIB) can be transmitted from an MIB of a PBCH. At this time, a bandwidth of the CORESET configured as the MIB may be considered as an initial BWP, and the UE may receive a physical downlink shared channel (PDSCH) in which the SIB is transmitted through the configured initial BWP. The initial BWP may be used not only for reception of the SIB but also other system information (OSI), paging, or random access.

When one or more BWPs are configured in the UE, the BS may instruct the UE to change the BWPs through a BWP indicator field within the DCI.

A basic unit of resources in the time-frequency domain is a resource element (RE) 112 and may be indicated by an OFDM symbol index and a subcarrier index. A resource block (RB) 108 (or physical resource block (PRB)) is specified by NRB contiguous subcarriers 110 in the frequency domain. In general, the minimum transmission unit of data is the RB. In the NR system, generally, $N_{symb}$=14 and $N_{RB}$=12. New is proportional to a bandwidth of a system transmission band. A data rate may increase in proportion to the number of RBs scheduled to the UE.

In the case of a frequency division duplex (FDD) system, in which the downlink and the uplink are divided by the frequency in the NR system, a downlink transmission bandwidth and an uplink transmission bandwidth may be different from each other. A channel bandwidth refers to an RF bandwidth corresponding to a system transmission bandwidth. Table 3 and Table 4 show some of the corresponding relation between a system transmission bandwidth, SCS, and a channel bandwidth specified in the NR system in a frequency band lower than 6 GHz (frequency range 1 (FR1)) and a frequency band higher than 6 GHz (FR 2). For example, the NR system having a channel bandwidth of 100 kHz with SCS of 30 kHz includes a transmission bandwidth of 273 RBs. Hereinafter, N/A may be a combination of bandwidth-subcarrier that is not supported by the NR system.

TABLE 3

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 279 |
| 60 | N/A | 11 | 18 | 24 | 31 | 38 | 51 | 65 | 79 | 107 | 121 | 135 |

TABLE 4

| | Channel bandwidth $BW_{Channel}$ [MHz] | | | |
|---|---|---|---|---|
| Subcarrier width | 50 MHz | 100 MHz | 200 MHz | 400 MHz |
| Transmission bandwidth configuration $N_RB$  60 kHz | 66 | 132 | 264 | N/A |
| 120 kHz | 32 | 66 | 132 | 264 |

In the NR system, a frequency range may be divided into FR1 and FR2 as shown in Table 5 below.

TABLE 5

| Frequency range designation | Corresponding frequency range |
|---|---|
| FR1 | 450 MHz-7125 MHz |
| FR2 | 24250 MHz-52600 MHz |

Ranges of FR1 and FR2 may be changed to other values and applied. For example, a frequency range of FR1 may be changed from 450 MHz to 600 MHz and applied.

Subsequently, an SS/PBCH block in 5G is described.

The SS/PBCH block may be a physical layer channel block including a primary SS (PSS), a secondary SS (SSS), and a PBCH. A detailed description thereof is made below.

PSS: is a signal which is a reference of downlink time/frequency synchronization and provides some pieces of information of a cell ID.

SSS: is a reference of downlink time/frequency synchronization and provides the remaining cell ID information which the PSS does not provide. In addition, the SSS serves as a reference signal for demodulation of a PBCH.

PBCH: provides necessary system information required for transmitting and receiving a data channel and a control channel by the terminal. The necessary system information may include control information related to a search space indicating radio resource mapping information of a control channel, scheduling control information for a separate data channel for transmitting system information, and the like.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire an MIB from the PBCH and receive a configuration of CORESET #0 (corresponding to a CORESET having a CORESET index of 0) therefrom. The UE may monitor CORESET #0 on the basis of the assumption that the selected SS/PBCH block and a demodulation reference signal (DMRS) transmitted in CORESET #0 are quasi co-located (QCLed). The UE may receive system information through downlink control information transmitted in CORESET #0. The UE may acquire configuration information related to a random access channel (RACH) required for initial access from the received system information. The UE may transmit a PRACH to the BS in consideration of the selected SS/PBCH block index, and the BS receiving the PRACH may acquire the SS/PBCH block index selected by the UE. Through the process, the BS may know which block was selected from the SS/PBCH blocks by the UE and that the UE monitored CORESET #0 associated therewith.

FIG. 2 illustrates mapping of an SS and a PBCH in the frequency and time domain of the NR system.

A PSS 201, an SSS 203, and a PBCH are mapped over 4 OFDM symbols, and the PSS and the SSS are mapped to 12 RBs and the PBCH is mapped to 20 RBs. FIG. 2 shows how a frequency band of 20 RBs is changed according to subcarrier spacing (SCS). A resource area in which the PSS, the SSS, and the PBCH are transmitted may be called an SS/PBCH block. Further, the SS/PBCH block may be referred to as an SSB block.

Figure 3:
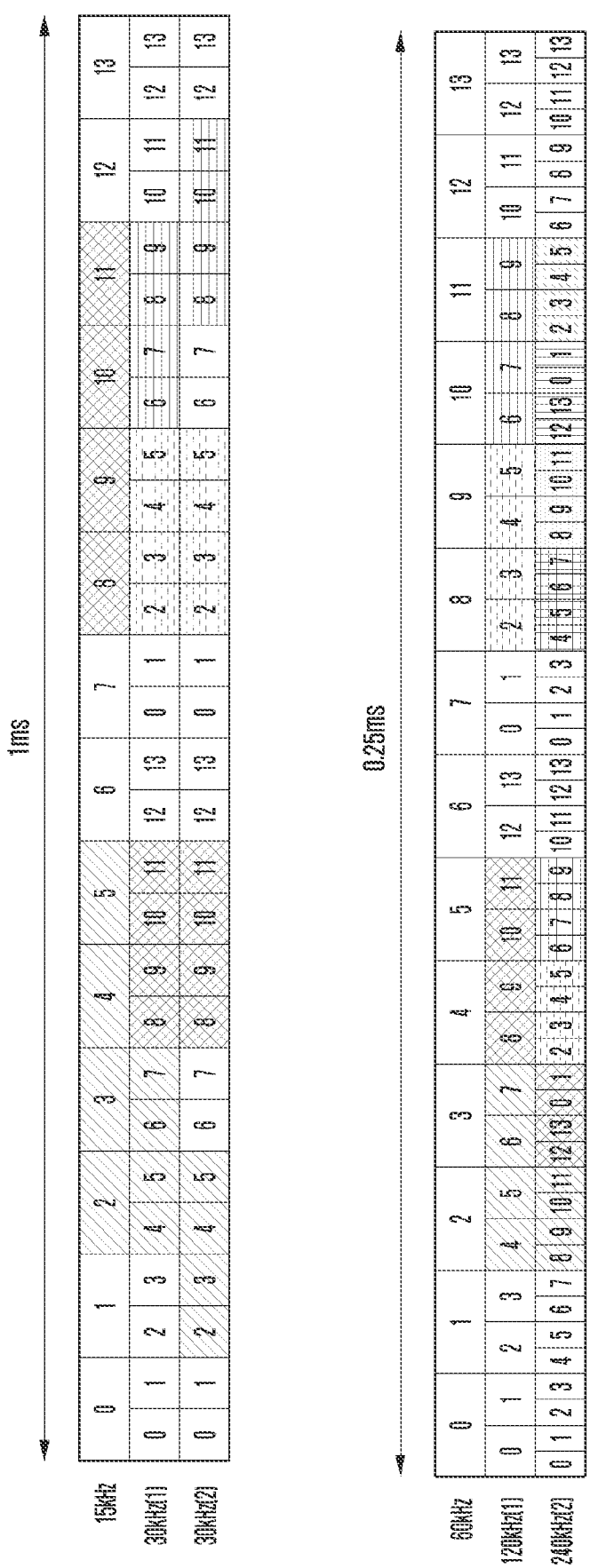
FIG. 3 illustrates symbols in which the SS/PBCH block can be transmitted according to subcarrier spacing (SCS)

FIG. 3 illustrates symbols in which the SS/PBCH block can be transmitted according to SCS.

Referring to FIG. 3, SCS may be configured as 15 kHz, 30 kHz, 120 kHz, 240 kHz, and the like, and the location of a symbol in which the SS/PBCH block (or SSB block) can be positioned may be determined according to each SCS. FIG. 3 illustrates the location of symbols in which the SSB can be transmitted according to SCS in symbols within 1 ms, and the SSB does not have to be always transmitted in marked areas of FIG. 3. The location in which the SSB block is transmitted may be configured in the UE through system information or dedicated signaling.

Hereinafter, the downlink control channel in the 5G communication system will be described in more detail with reference to the drawings.

Figure 4:
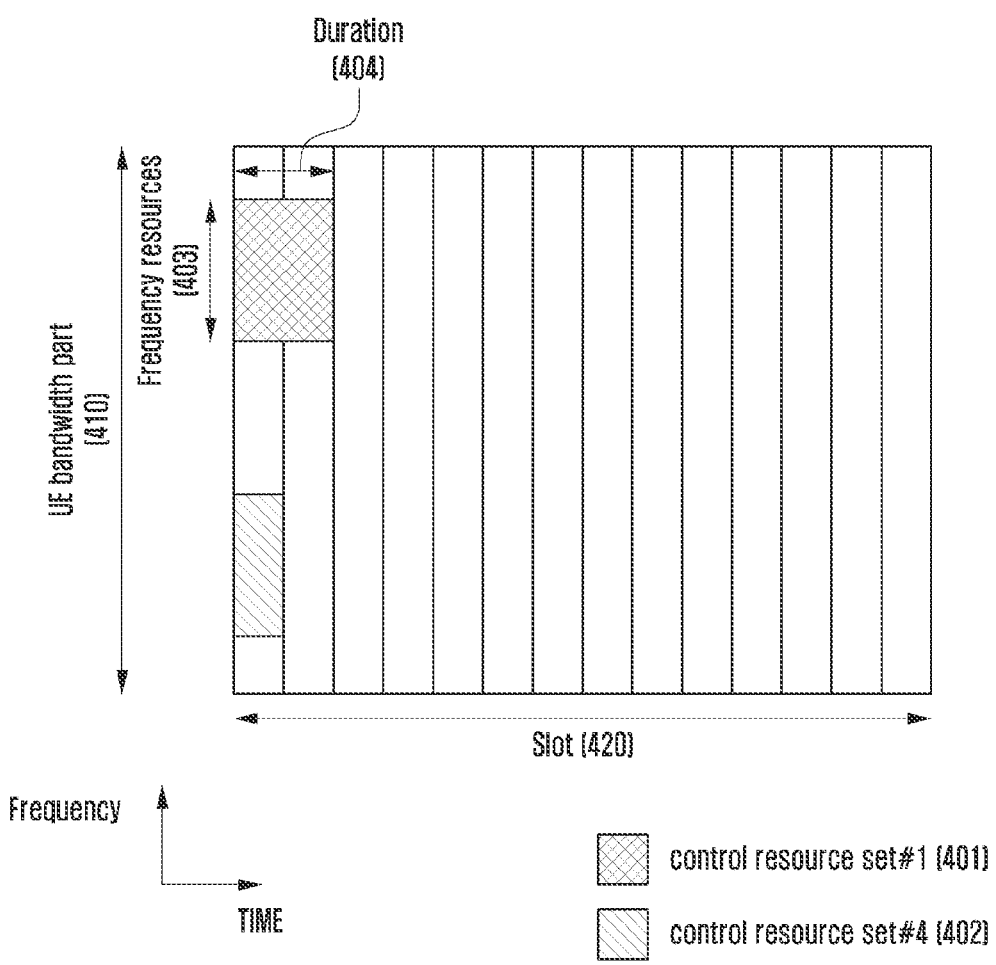
FIG. 4 illustrates a control area in which a downlink control channel is transmitted in a 5G wireless communication system.

FIG. 4 illustrates a control area in which a downlink control channel is transmitted in a 5G wireless communication system. That is, FIG. 4 illustrates a control region CORESET in which a downlink control channel is transmitted in a 5G wireless communication system. FIG. 3 illustrates an example in which a UE bandwidth part 210 is configured in the frequency axis and two CORESETs (CORESET #1 401 and CORESET #2 402) are configured within one slot 420 in the time axis. The CORESETs 401 and 402 may be configured in specific frequency resources 403 within the entire UE bandwidth 410 in the frequency axis. The CORESET may be configured as one or a plurality of OFDM symbols in the time axis, which may be specified as a CORESET duration 404.

Referring to the example illustrated in FIG. 4, CORESET #1 401 may be configured to have the CORESET duration of two symbols, and CORESET #2 402 may be configured to have the CORESET duration of one symbol.

The CORESET in the 5G system may be configured in the UE by the BS through higher layer-signaling (for example, system information, MIB, or RRC signaling). Configuring the CORESET in the UE may mean providing information such as a CORESET identity, a frequency location of the CORESET, and a symbol length of the CORESET. For example, the higher-layer signaling may include information in Table 6, below.

TABLE 6

```
ControlResourceSet ::=           SEQUENCE {
-- Corresponds to L 1 parameter 'CORESET-ID'
control Resource Set Id          ControlResourceSetId,
(CORESET identity)
frequencyDomainResources         BIT STRING (SIZE (45)),
(frequency axis resource allocation information)
duration                         INTEGER (1..maxCoReSetDuration),
(time axis resource allocation information)
cce-REG-MappingType              CHOICE {
(CCE-to-REG mapping scheme)
```

TABLE 6-continued

| | |
|---|---|
| interleaved | SEQUENCE { |
| reg-BundleSize<br>(REG bundle size) | ENUMERATED {n2, n3, n6}, |
| precoderGranularity<br>{ sameAsREG-bundle, all ContiguousR s}, | ENUMERATED |
| interleaverSize<br>(interleaver size) | ENUMERATED {n2, n3, n6} |
| shiftIndex<br>INTEGER(0. .maxNrofPhysicalResourceBlocks-1)<br>OPTIONAL<br>(interleaver shift)<br>} | |
| nonInterleaved<br>}, | NULL |
| tci-StatesPDCCH<br>StatesPDCCH)) OF TCI-StateId<br>(QCL configuration information)<br>tci -PresentInDCI | SEQUENCE(SIZE (1. maxNrofTCI-<br>OPTIONAL,<br>ENUMERATED {enabled} |
| } | OPTIONAL, -- Need S |

The configuration information of tci-StatesPDCCH (simply referred to as a transmission configuration indication (TCI) state) in Table 6 may include information on one or a plurality of SS/PBCH block indexes or channel state information reference signal (CSI-RS) indexes having the QCL relation with a DMRS transmitted in a corresponding CORESET.

Subsequently, DCI in the 5G system is described in detail.

In the 5G system, scheduling information for uplink data (or a physical uplink data channel (physical uplink shared channel (PUSCH)) or downlink data (or physical downlink data channel (PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field. In addition, there are various formats in DCI, and each format may indicate whether DCI is for controlling power or notifying of a slot format indicator (SFI).

The DCI may be transmitted through a PDCCH which is a physical downlink control channel via a channel coding and modulation process. A CRC may be added to a DCI message payload and may be scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result. The PDCCH is mapped to a CORESET configured in the UE and transmitted.

For example, DCI for scheduling a PDSCH for system information (SI) may be scrambled by an SI-RNTI. DCI for scheduling a PDSCH for an RAR message may be scrambled by an RA-RNTI. DCI for scheduling a PDSCH for a paging message may be scrambled by a P-RNTI. DCI for notifying of a SFI may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the information in Table 7, below.

TABLE 7

Identifier for DCI formats—[1] bit
Frequency domain resource assignment—$\lceil \log_2(N_{RB}^{UL,BWP} + 1)/2 \rceil$ bits
Time domain resource assignment—X bits
Frequency hopping flag—1 bit
Modulation and coding scheme—5 bits
New data indicator—1 bit
Redundancy version—2 bits
HARQ process number—4 bits
TPC command for scheduled PUSCH—[2] bits
Uplink (UL)/supplementary UL (SUL) indicator—0 or 1 bit DCI format 0_1 may be used for non-fallback DCI for scheduling a PUSCH in which case the CRC may be scrambled by a C-RNTI. DCI format 0_1 in which the CRC is scrambled by the C-RNTI may include, for example, the information in Table 8, below.

TABLE 8

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
 For resource allocation type 0, $\lceil N_{RB}^{UL,BWP}/P \rceil$ bits
 For resource allocation type 1, $\lceil \log_2(N_{RB}^{UL,BWP}(N_{RB}^{UL,BWP} + 1)/2) \rceil$ bits
- Time domain resource assignment -1, 2, 3, or 4 bits
- Virtual resource block (VRB)-to- PRB mapping - 0 or 1 bit, only for resource allocation type 1.
 0 bit if only resource allocation type 0 is configured;
 1 bit otherwise.
- Frequency hopping flag - 0 or 1 bit, only for resource allocation type 1.
 0 bit if only resource allocation type 0 is configured;
 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
 1 bit for semi-static HARQ-ACK codebook;
 2 bits for dynamic HARQ-ACK codebook with single HARQ-ACK codebook.
- 2nd downlink assignment index - 0 or 2 bits
 2 bits for dynamic HARQ-ACK codebook with two HARQ-ACK sub-codebooks;
 0 bit otherwise.
- TPC command for scheduled PUSCH - 2 bits

- SRS resource indicator $\left\lceil \log\left(\sum_{k=1}^{L_{max}} \binom{N_{SRS}}{k}\right)\right\rceil$ or $\lceil \log_2(N_{SRS}) \rceil$ bits $\left\lceil \log\left(\sum_{k=1}^{L_{max}} \binom{N_{SRS}}{k}\right)\right\rceil$ bits for non-codebook based *PUSCH* transmission;

$\lceil \log_2(N_{SRS}) \rceil$ bits for codebook based PUSCH transmission.
- Precoding information and number of layers -up to 6 bits
- Antenna ports - up to 5 bits
- SRS request - 2 bits
- Channel state information (CSI) request - 0, 1, 2, 3, 4, 5, or 6 bits
- CB group (CBG) transmission information - 0, 2, 4, 6, or 8 bits
- Phase tracking reference signal (PTRS)-demodulation reference signal (DMRS) association - 0 or 2 bits.
- beta_offset indicator - 0 or 2 bits
- DMRS sequence initialization - 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the information in Table 9, below.

TABLE 9

Identifier for DCI formats—[1] bit
Frequency domain resource assignment—
[⌈log$_2$(N$_{RB}^{DL,BWP}$ (N$_{RB}^{DL,BWP}$ + 1)/2)⌉] bits
Time domain resource assignment—X bits
VRB-to-PRB mapping—1 bit.
Modulation and coding scheme—5 bits
New data indicator—1 bit
Redundancy version—2 bits
HARQ process number—4 bits|
Downlink assignment index—2 bits|
TPC command for scheduled PUCCH—[2] bits
Physical uplink control channel (PUCCH) resource indicator—3 bits
PDSCH-to-HARQ feedback timing indicator—[3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information.

TABLE 10

Carrier indicator—0 or 3 bits
Identifier for DCI formats—[1] bits
Bandwidth part indicator—0, 1 or 2 bits
Frequency domain resource assignment
For resource allocation type 0, [(N$_{RB}^{DL,BWP}$/P)] bits
For resource allocation type 1, [log$_2$(N$_{RB}^{DL,BWP}$ (N$_{RB}^{DL,BWP}$ + 1)/2)] bits
Time domain resource assignment—1, 2, 3, or 4 bits
VRB-to-PRB mapping—0 or 1 bit, only for resource allocation type 1.
0 bit if only resource allocation type 0 is configured;
1 bit otherwise.
PRB bundling size indicator—0 or 1 bit
Rate matching indicator—0, 1, or 2 bits
Zero power (ZP) channel state information
(CSI)-reference signal (RS) trigger—0,
For TB 1:
Modulation and coding scheme—5 bits
New data indicator—1 bit
Redundancy version—2 bits
For TB 2:
Modulation and coding scheme—5 bits
New data indicator—1 bit
Redundancy version—2 bits
HARQ process number—4 bits
Downlink assignment index—0 or 2 or 4 bits
TPC command for scheduled PUCCH—2 bits
PUCCH resource indicator—3 bits
PDSCH-to-HARQ feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit For example, each piece of control information included in DCI format 1_1 that is scheduling control information (DL grant) for downlink data is described below.
  Carrier indicator: indicates a carrier through which data scheduled by DCI is transmitted—0 or 3 bits
  Identifier for DCI formats: indicates a DCI format and corresponds to an indicator for identifying whether corresponding DCI is for downlink or uplink—[1] bits.
  Bandwidth part indicator: indicates, if there is a change in a BWP, the change—0, 1, or 2 bits.
  Frequency domain resource assignment: is resource allocation information indicating frequency domain resource allocation, wherein expressed resources vary depending on a resource allocation type of 0 or 1.
  Time domain resource assignment: is resource allocation information indicating time domain resource allocation and indicates one configuration of a predefined PDSCH time domain resource allocation list.
  VRB-to-PRB mapping: indicates a mapping relation between a virtual resource block (VRB) and a PRB—0 or 1 bit.
  PRB bundling size indicator: indicates the size of PRB bundling on the basis of the assumption that the same precoding is applied—0 or 1 bit.
  Rate matching indicator: indicates which rate matching group among the rate matching groups configured through a higher layer applied to a PDSCH is applied—0, 1, or 2 bits.
  ZP CSI-RS trigger: triggers a zero power channel state information reference signal—0, 1, or 2 bits.
  TB-related configuration information: indicates a modulation and coding scheme (MCS), a new data indicator (NDI), and a redundancy version (RV) for one or two TBs.
  MCS: indicates a modulation scheme and a coding rate used for data transmission. That is, it may indicate a coding rate value for informing of TBS and channel coding information as well as information on QPSK, 16 QAM, 64 QAM, or 256 QAM.
  New data indicator: indicates HARQ initial transmission or HARQ retransmission.
  Redundancy version: indicates a redundancy version of HARQ.
  HARQ process number: indicates an HARQ process number applied to a PDSCH—4 bits.
  Downlink assignment index: is an index for generating a dynamic HARQ-ACK codebook when HARQ-ACK for a PDSCH is reported—0, 2, or 4 bits.
  TPC command for scheduled PUCCH: indicates power control information applied to a PUSCH for reporting HARQ-ACK for a PDSCH—2 bits.
  PUCCH resource indicator: is information indicating resources of a PUCCH for reporting HARQ-ACK for a PDSCH.
  PDSCH-to-HARQ_feedback timing indicator: indicates configuration information on a slot in which a PUCCH for reporting HARQ-ACK for a PDSCH is transmitted—3 bits.
  Antenna ports: is information indicating a PDSCH DMRS antenna port and a DMRS CDM group in which no PDSCH is transmitted—4, 5, or 6 bits.
  Transmission configuration indication: is information indicating information related to a beam of a PDSCH—0 or 3 bits.
  SRS request: is information making a request for SRS transmission—2 bits.
  CBG transmission information: is information indicating a CBG corresponding to data transmitted through a PDSCH when CBG-based retransmission is configured.
  CBG flushing out information: is information indicating whether a CBG previously received by the UE can be used for HARQ combining—0 or 1 bit.
  DMRS sequence initialization: indicates a DMRS sequence initialization parameter—1 bit.
Hereinafter, a method of allocating time domain resources for a data channel in a 5G communication system is described.
Downlink data may be transmitted through a PDSCH which is a physical channel for downlink data transmission. Uplink data may be transmitted through a PUSCH which is a physical channel for uplink data transmission. The PDSCH may be transmitted after the control channel transmission interval, and scheduling information such as the detailed mapping location in the frequency domain and the modulation scheme is determined on the basis of the DCI transmitted through the PDCCH.

The BS may configure a table for time domain resource allocation information for a PDSCH and a PUSCH in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), information on a location and a length of a start symbol in which a PDSCH or a PUSCH is scheduled within the slot, a mapping type of a PDSCH or a PUSCH, and the like. For example, information shown in Table 11 and Table 12, below, may be notified to the UE by the BS.

transmitted, a start symbol location S in the corresponding slot, and the number L of symbols to which the PDSCH/PUSCH is mapped. S may be a relative location from start of the slot, L may be the number of successive symbols, and S and L may be determined on the basis of a start and length indicator value (SLIV) provided by Equation 1, below.

if $(L-1) \leq 7$ then $$SLIV = 14 \cdot (L-1) + S$$

else $$SLIV = 14 \cdot (14-L+1) + (14-1-S) \qquad (1)$$

where $0 < L \leq 14-S$

In the NR system, a PDSCH mapping type may be defined as a type A and a type B. In the PDSCH mapping type A, a first symbol of the DMRS symbols is located at a second or a third OFDM symbol of the slot. In the PDSCH mapping type B, a first symbol of the DMRS symbols of the first OFDM symbol may be located in time area resources allocated through PUSCH transmission.

Through the MCS of the control information included in the DCI, the BS informs the UE of a modulation scheme applied to the PDSCH to be transmitted and the size of data (TB size (TBS)) to be transmitted. In an embodiment, the MCS may include 5 bits or bits larger than or smaller than 5 bits. The TBS corresponds to the size before channel coding for error correction is applied to the data (TB) which the BS desires to transmit.

TABLE 11

PDSCH-TimeDomainResourceAllocationList information element

```
PDSCH-TimeDomainResourceAllocationList ::= SEQUENCE (SIZE(1..maxNrofDL-Allocations))
OF PDSCH-TimeDomainResourceAllocation
PDSCH-TimeDomainResourceAllocation := SEQUENCE {
k0                     INTEGER(0..32)                    OPTIONAL,
-- Need S
(PDCCH-to-PDSCH timing, in units of slots)
mappingType            ENUMERATED {type A, typeB},
(PDSCH mapping type)
startSymbolAndLength   INTEGER (0..127)
(start symbol and length of PDSCH)
}
```

TABLE 12

PUSCH-TimeDomainResourceAllocationinformation element

```
PUSCH-TimeDomainResourceAllocationList ::= SEQUENCE
(SIZE(1..maxNrofUL-Allocations)) OF PUSCH-TimeDomainResourceAllocation
PUSCH-TimeDomainResourceAllocation ::= SEQUENCE {
k2          INTEGER(0..32)              OPTIONAL, -- Need S
(PDCCH-to-PUSCH timing, in units of slots)
mappingType       ENUMERATED {typeA, typeB},
(PUSCH mapping type)
startSymbolAndLength    INTEGER (0..127)
(start symbol and length of PUSCH)
}
```

The BS may inform the UE of one of the entries in the table for the time domain resource allocation information through L1 signaling (for example, DCI) (for example, indicated through a 'time domain resource allocation' field within DCI). The UE may acquire time domain resource allocation information for a PDSCH or a PUSCH on the basis of the DCI received from the BS.

Time domain resource assignment may be delivered by information on a slot in which the PDSCH/PUSCH is In the disclosure, the TB may include a MAC header, a MAC control element, one or more MAC service data units (SDUs), and padding bits. Alternatively, the TB may indicate a unit of data delivered from a MAC layer to a physical layer or a MAC protocol data unit (PDU).

Modulation schemes supported by the NR system are quadrature phase shift keying (QPSK), 16 QAM, 64 QAM, and 256 QAM, and modulation orders (Qm) thereof correspond to 2, 4, 6, and 8, respectively. That is, 2 bits may be transmitted per symbol in the QPSK modulation, 4 bits may be transmitted per symbol in the 16 QAM modulation, 6 bits may be transmitted per symbol in the 64 QAM modulation, and 8 bits may be transmitted per symbol in the 256 QAM modulation.

The terms physical channel and signal in the NR system may be used to describe the method and the apparatus proposed by embodiments. However, the disclosure may be applied to a wireless communication system rather than the NR system.

Downlink (DL) refers to a wireless transmission path of a signal that the BS transmits to the UE, and uplink (UL) refers to a wireless transmission path of a signal that the UE transmits to the BS.

Although the NR system is described as an example in embodiments, the embodiments may also be applied to other communication system having a similar technical background or channel form. Further, embodiments may be applied to other communication system through some modifications without departing the scope on the basis of a determination of those skilled in the art.

The terms physical channel and signal may be interchangeably used with data or control signal. For example, a PDSCH is a physical channel for transmitting data, but may refer to data in the disclosure.

Higher-layer signaling may be a method of transmitting a signal from the BS to the UE through a downlink data channel of a physical layer or from the UE to the BS through an uplink data channel of a physical layer, and may also be referred to as RRC signaling or a MAC CE.

In various embodiments, the TA may be transmitted through a MAC CE, for example, a timing advance command MAC CE, an absolute timing advance command MAC CE, or the like.

Meanwhile, a message transmitted from the MAC layer to the physical layer, for example, a MAC PDU may include one or more MAC sub PDUs. Each MAC sub PDU may include one of the following descriptions.

Only MAC subheader (including padding)
MAC subheader and MAC SDU
MAC subheader and MAC CE
MAC subheader and padding MAC SDUs may have the variable size, and each MAC subheader may correspond to a MAC SDU, a MAC CE, or padding.

Figure 5:
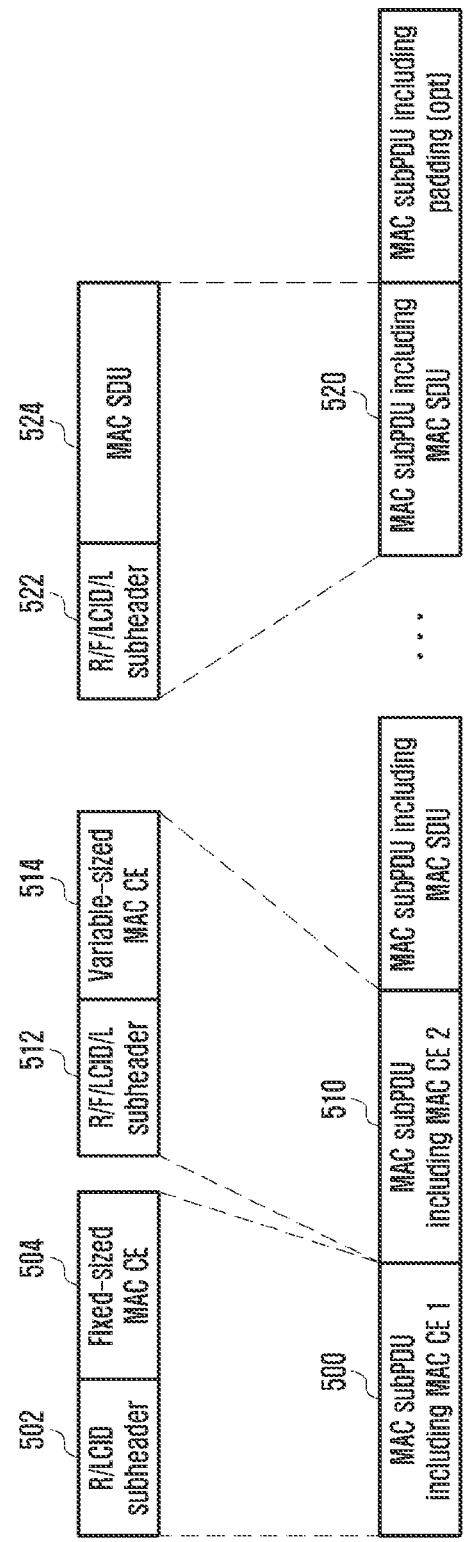
FIG. 5 schematically illustrates the message transmitted from the MAC layer to the physical layer in the downlink of the communication system according to various embodiments.
Figure 6:
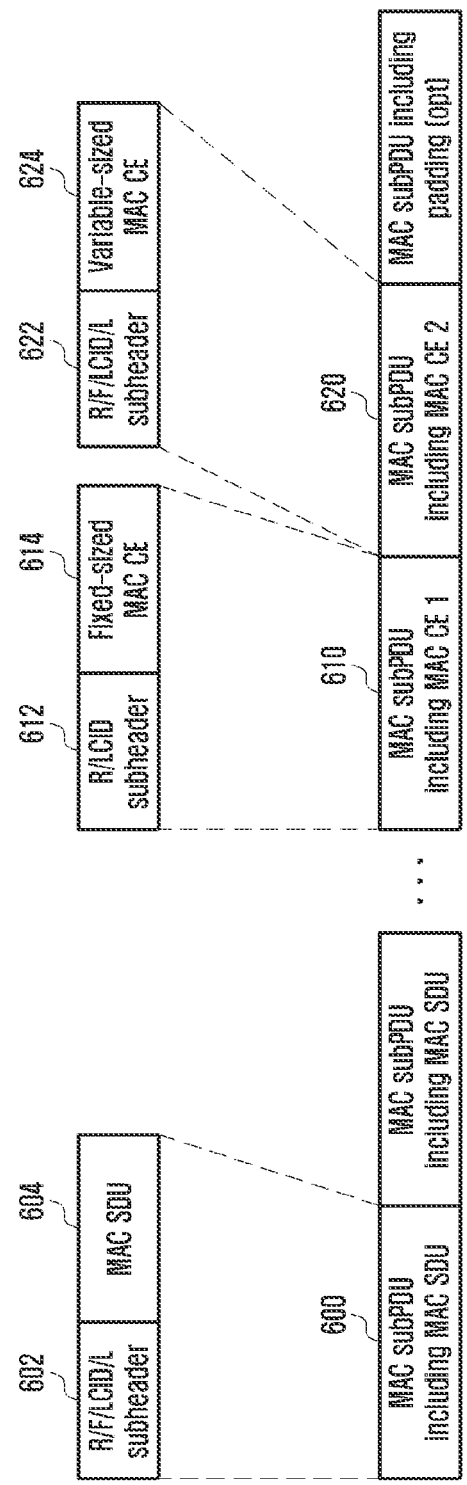
FIG. 6 schematically illustrates messages transmitted from the MAC layer to the physical layer in the uplink of the communication system according to various embodiments.

Meanwhile, a message transmitted from the physical layer to the MAC layer, for example, a MAC PDU may be configured as shown in FIG. 5 and FIG. 6 for the cases of downlink and uplink.

First, an example of a message transmitted from the MAC layer to the physical layer in the downlink of the communication system according to various embodiments is described with reference to FIG. 5.

FIG. 5 schematically illustrates the message transmitted from the MAC layer to the physical layer in the downlink of the communication system according to various embodiments.

Referring to FIG. 5, the example of the message transmitted from the MAC layer to the physical layer in the downlink may be a DL MAC PDU. In FIG. 5, a MAC sub PDU 500 including MAC CE 1 includes an R/LCID subheader 502 and a fixed-sized MAC CE 504, and a MAC sub PDU 510 including MAC CE 2 includes an R/F/LCID/L subheader 512 and a variable-sized MAC CE 514. Further, a MAC sub PDU 520 including a MAC SDU includes an R/F/LCID/L subheader 522 and a MAC SDU 524.

In FIG. 5, the LCID indicates a logical channel ID field, and the LCID field indicates an instance of a corresponding MAC SDU, a type of a corresponding MAC CE, or padding, which will be described with reference to Table 13 and Table 14, below. Table 13 below indicates values of the LCID for DL-SCH, and Table 14 indicates values of the el-CID for DL-SCH.

TABLE 13

| Codepoint/ index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 50 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 81 | Timing Advance Command |
| 62 | UE Contention Resolution Identity |
| 63 | Padding |

TABLE 14

| Codepoint | Index | LCID values |
|---|---|---|
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

One LCID field exists for each MAC subheader, and the size of the LCID field is 6 bits. When the LCID field is configured as, for example, "34", there is one additional octet in the MAC subheader including an extended logical channel ID (eLCID) field, and the one octet follows the octet including the LCID field. When the LCID field is configured as, for example, "33", there are two additional octets in the MAC subheader including the eLCID field and the two octets follow the octet including the LCID field.

The eLCID denotes an extended logical channel ID field, and indicates a logical channel instance of a corresponding MAC SDU or a corresponding MAC CE type. The size of the eLCID is 8 bits or 16 bits.

L denotes a length field, and the length field indicates a corresponding MAC SDU or the length of a variable-sized MAC CE. One length field exists per MAC sub header excluding sub headers corresponding to MAC SDUs including the fixed-sized MAC CEs, the padding, or the common control channel (CCCH). The size of the length field is indicated by the F field.

F denotes a format field and indicates the size of the length field. One F field exists per MAC subheader excluding MAC SDUs including the fixed MAC CEs, the padding, and the UL CCCH. The size of the F field is 1 bit, and 0 indicates 8 bits of the length field in an example and 1 indicates 16 bits of the length field in another example.

R is a reserved bit and is configured as, for example, "0".

As illustrated in FIG. 5, MAC CEs, for example, MAC CE 1 and MAC CE 2 are arranged together, and MAC sub PDU(s) including MAC CE(s) are arranged before a MAC sub PDU including a MAC SDU and a MAC sub PDU including padding. The size of the padding may be zero.

Subsequently, an example of messages transmitted from the MAC layer to the physical layer in the uplink of the communication system according to various embodiments is described with reference to FIG. 6.

FIG. 6 schematically illustrates messages transmitted from the MAC layer to the physical layer in the uplink of the communication system according to various embodiments.

Referring to FIG. 6, the example of the messages transmitted from the MAC layer to the physical layer in the uplink may be an uplink MAC PDU (UL MAC PDU). In FIG. 6, a MAC sub PDU 610 including MAC CE 1 includes an R/LCID sub header 612 and a fixed-sized MAC CE 614, and a MAC sub PDU 620 including MAC CE 2 includes an R/F/LCID/L subheader 622 and a variable-sized MAC CE 624. Further, a MAC sub PDU 600 including a MAC SDU includes an R/F/L CID/L subheader 602 and a MAC SDU 604.

As illustrated in FIG. 6, MAC CEs, for example, MAC CE 1 and MAC CE 2 are arranged together, and MAC sub PDU(s) including MAC CE(s) are arranged after the MAC sub PDU including the MAC SDU and before a MAC sub PDU including padding. The size of the padding may be zero.

In FIGS. 5 and 6, the logical channel ID (LCID) included in the subheader of the MAC layer, that is, the LCID or the eLCID may indicate a type of the transmitted MAC SDU or MAC CE. Mapping between an index of the LCID and a type of the MAC SDU or the MAC CE may be as shown in, for example, Table 13, above, and an index of the eLCID and the type of the MAC SDU or the MAC CE may be as shown in, for example, Table 14, above. In various embodiments, the LCID may indicate an instance of a logical channel of the MAC SDU, a type of the MAC CE, or padding information of a downlink shared channel (DL-SCH) and an uplink shared channel (UL-SCH). When one LCID is mapped to one MAC subheader, the LCID may be implemented by, for example, 6 bits.

Figure 7:
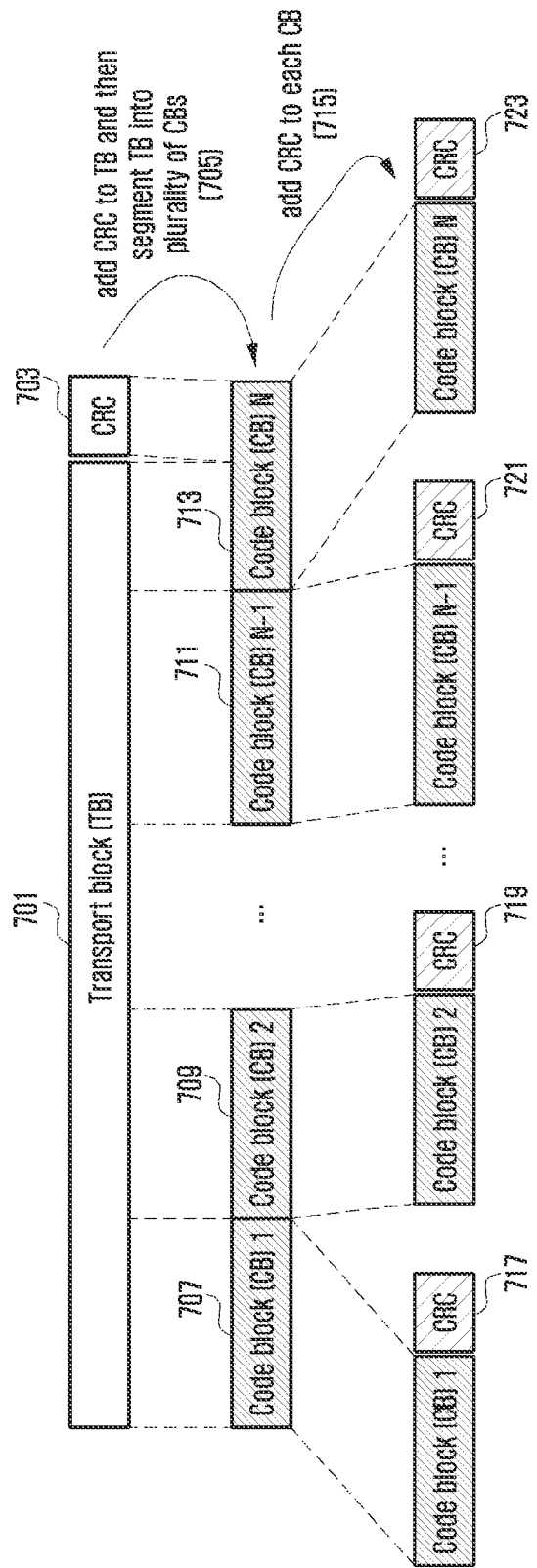
FIG. 7 illustrates a process in which one transport block (TB) is divided into a plurality of CBs (CBs) and a cyclic redundancy check (CRC) is added.

FIG. 7 illustrates a process in which one TB is divided into a plurality of CBs and a CRC is added.

Referring to FIG. 7, a CRC 703 may be added to the last or the first part of one TB 701 to be transmitted in the uplink or the downlink. The CRC 703 may have 16 bits, 25 bits, a prefixed number of bits, or a variable number of bits according to a channel condition, and may be used to determine whether channel coding is successful. A block obtained by adding the CRC 703 to the TB 701 may be segmented into a plurality of CBs (CBs) 707, 709, 711, and 713 as indicated by reference numeral 705. The segmented CBs may have a predetermined maximum size, in which case the last CB 713 may have the size smaller than the sizes of the other blocks 707, 709, and 711. However, this is only an example, and the sizes of the last CB 713 and the other CBs 707, 709, and 711 may become the same through insertion of 0, a random value, or 1 into the last CB 713 according to another embodiment.

Further, CRCs 717, 719, 721, and 723 may be added to the CBs 707, 709, 711, and 713, respectively. The CRC may have 16 bits, 24 bits, a prefixed number of bits, or a variable number of bits, and may be used to determine whether channel coding is successful.

The TB 701 and a cyclic generator polynomial may be used to generate the CRC 703, and the cyclic generator polynomial may be obtained in various ways. For example, when it is assumed that a cyclic generator polynomial for a 24-bit CRC is $gCRC24A(D)=D^{24}+D^{23}+D^{18}+D^{17}+D^{14}+D^{11}+D^{10}+D^7+D^6+D^5+D^4+D^3+D+1$ and L=24, the CRC $p_0, p_1, p_2, p_3, \ldots, p_{L-1}$ may be determined as a value to obtain remainder 0 by dividing $a_0D^{A+23}+a_1D^{A+22}+\ldots+a_{A-1}D^{24}+p_0D^{23}+p_1D^{22}+\ldots+p_{22}D^1+p_{23}$ by gCRC24A(D) for TB data. In the above example, it is assumed and described that the CRC length L is 24, the CRC length L may be determined as several values such as 12, 16, 24, 32, 40, 48, and 64.

After the CRC is added to the TB through the process, TB+CRC may be segmented into N CBs 707, 709, 711, and 713. The CRCs 717, 719, 721, and 723 may be added to the segmented CBs 707, 709, 711, and 713 as indicated by reference numeral 515. The CRC added to the CB may be a different length from that when the CRC added to the TB is generated, or another cyclic generator polynomial may be used to generate the CRC. Further, the CRC 703 added to the TB and the CRCs 717, 719, 721, and 723 added to the CBs may be omitted according to the type of a channel code to be applied to the CBs. For example, when an LDPC code rather than a turbo code is applied to the CBs, the CRCs 717, 719, 721, and 723 to be added to the CBs may be omitted.

However, even when the LDPC code is applied, the CRCs 717, 719, 721, and 723 may be added to the CBs. Further, the CRC may be added or omitted when a polar code is used.

As illustrated in FIG. 7, in the TB to be transmitted, a maximum length of one CB may be determined according to the type of applied channel coding, and the TB and the CRC added to the TB may be segmented into CBs according to the maximum length of the CB.

In the conventional LTE system, CRCs for CB may be added to segmented CBs, data bits of the CBs and the CRCs are encoded by a channel code to determine coded bits, and the number of rate-matching bits is determined as preappointed for the coded bits.

In the NR system, the TBS may be calculated via the following steps.

Step 1: calculates the number $N_{RE}'$ of Res allocated to PDSCH mapping in one PRB of allocated resources. $N_{RR}'$ may be calculated as $N_{sc}^{RB} \cdot N_{symb}^{sh} - N_{DMRS}^{PRB} - N_{oh}^{PRB}$ Here, $N_{sc}^{RB}$ is 12, and $N_{symb}^{sh}$ may indicate the number of OFDM symbols allocated to the PDSCH. $N_{DMRS}^{PRB}$ is the number of Res in one PRB occupied by DMRSs in the same CDM group. $N_{oh}^{PRB}$ as is the number of REs occupied by the overhead within one PRB configured through higher signaling, and may be configured as one of 0, 6, 12, and 18. Thereafter, a total number $N_{RE}$ of REs allocated to the PDSCH may be calculated. $N_{RE}$ may be calculated as $\min(156, N_{RR}')\cdot n_{PRE}$, and $n_{PRB}$ indicates the number of PRBs allocated to the UE.

Step 2: the number $N_{info}$ of temporary information bits may be calculated as $N_{RE}*R*Q_m*v$. Here, R is a code rate, and $Q_m$ is a modulation order and information of the value may be transmitted using an MCS bit field of DCI and a pre-appointed table. Further, v is the number of allocated layers. In the case of $N_{info} \leq 3824$, the TBS may be calculated through step 3 below. The TBS may be calculated through step 4.

Step 3: $N_{info}'$ may be calculated through Equations 2 and 3, below.

$$N_{info}' = \max\left(24, 2^n * \left\lfloor \frac{N_{info}}{2^n} \right\rfloor\right) \quad (2)$$

$$n = \max(3, \lfloor \log_2(N_{info}) \rfloor - 6) \quad (3)$$

The TBS may be determined as a value closest to $N_{info}'$ of Equations 2 and 3, among values that are not smaller than $N_{info}'$ in Table 15, below.

TABLE 15

| Index | TBS |
|-------|-----|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ may be calculated through Equations 4 and 5, below:

$$N_{info}' = \max\left(3840, 2^n \times \text{round}\left(\frac{N_{info} - 24}{2^n}\right)\right) \quad (4)$$

$$n = \lfloor \log_2(N_{info} - 24) \rfloor - 5 \quad (5)$$

The TBS may be determined through $N_{info}'$ and pseudo-code 1, in Table 16 below, and C corresponds to the number of CBs included in one TB.

TABLE 16

[Pseudo-code 1 starts]
if R ≤ 1/4

$$TBS = 8 * C * \left\lceil \frac{N_{info}' + 24}{8 * C} \right\rceil - 24, \text{ where } C = \left\lceil \frac{N_{info}' + 24}{3816} \right\rceil$$

else
　　if $N_{info}' > 8424$

TABLE 16-continued $$TBS = 8*C*\left\lceil\frac{N'_{info}+24}{8*C}\right\rceil - 24, \text{ where } C = \left\lceil\frac{N'_{info}+24}{8424}\right\rceil$$

else $$TBS = 8*\left\lceil\frac{N'_{info}+24}{8}\right\rceil - 24$$

end if
end if
[Pseudo-code 1 ends]

In the NR system, when one CB is input into an LDPC encoder, parity bits may be added and output. At this time, an amount of parity bits may vary depending on an LDPCbase graph. A method of sending all parity bits generated by LDPC coding for a specific input may be full buffer rate matching (FBRM), and a method of limiting the number of parity bits which can be transmitted may be limited buffer rate matching (LBRM). When resources are allocated for data transmission, a circular buffer may be made by the LDPC encoder output, bits of the made buffer may be transmitted repeatedly by the number of allocated resources, and the length of the circular buffer may be $N_{cb}$.

When the number of all parity bits generated by LDPC coding is N, $N_{cb}$=N in the FBRM method. In the LBRM method, $N_{cb}$ is min(N,$N_{ref}$), $N_{ref}$ is $$\left\lfloor\frac{TBS_{LBRM}}{C \cdot R_{LBRM}}\right\rfloor,$$

and $R_{LBRM}$ may be determined as 2/3. In order to calculate $TBS_{LBRM}$, the aforementioned method of calculating the TBS is used and the maximum number of layers and a maximum modulation order supported by the UE in the corresponding cell are assumed. The maximum modulation order $Q_m$ is assumed as 8 when it is configured to use an MCS table supporting 256 QAM for at least one BWP in the corresponding cell and as 6 (64 QAM) when it is not configured to use the MCS table, the code rate is assumed as 948/1024 that is a maximum code rate, $N_{RE}$ is assumed as 156·$n_{PRB}$, and $n_{PRB}$ is assumed as $n_{PRB,LBRM}$. $n_{PRB,LBRM}$ may be given as shown in Table 17, below.

TABLE 17

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

A maximum data rate supported by the UE in the NR system may be determined through Equation 6, below.

$$\text{data rate (in } Mbps) = 10^{-6} \cdot \sum_{j=1}^{J}\left(v_{layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1-OH^{(j)})\right) \quad (6)$$

In Equation 6, J is the number of carriers grouped by carrier aggregation, Rmax=948/1024, $v_{Layers}^{(j)}$ is the maximum number of layers, $Q_m^{(j)}$ is a maximum modulation order, $f^{(j)}$ is a scaling index, and μ is SCS. For $f^{(j)}$, one of 1, 0.8, 0.75, and 0.4 may be reported by the UE, and μ may be given as shown in Table 18, below.

TABLE 18

| μ | Δf = $2^{\mu}$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^{\mu}$ an average OFDM symbol length, and $T_s^{\mu}$ may be calculated as $$\frac{10^{-3}}{14 \cdot 2^{\mu}},$$

and $N_{PRR}^{BW(j),\mu}$ is the maximum number of RBs in BW(j). $OH^{(j)}$ is an overhead value and may have 0.14 in the downlink of FR1 (band equal to or lower than 6 GHz) and 0.18 in the uplink and 0.08 in the downlink of FR2 (band higher than 6 GHz) and 0.10 in the uplink. A maximum data rate in the downlink in a cell having a frequency bandwidth of 100 MHz with SCS of 30 kHz may be calculated through Equation 6 as shown in Table 19, below.

TABLE 19

| $f^{(j)}$ | $v_{Layers}^{(j)}$ | $Q_m^{(j)}$ | Rmax | $N_{PRB}^{BW(j)\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1896.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

A real data rate which can be measured by the UE in real data transmission may be a value obtained by dividing an amount of data by a data transmission time. This may be a value obtained by dividing the TBS by the TTI length in 1-TB transmission and dividing a sum of TBSs by the TTI length in 2-TB transmission. For example, as assumed in Table 17, a maximum real data rate in the downlink in a cell having a frequency bandwidth of 100 MHz with SCS of 30 kHz may be determined according to the number of allocated PDSCH symbols as shown in Table 20, below.

TABLE 2

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 522,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 38852 | 1002865.5 | 14 | 999,424 | 119 | 999,576 | 0.392857 | 2,514.38 |
| 12 | 8 | 136 | 37125 | 1099917.0 | 15 | 1,114,112 | 133 | 1,115,0,8 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be identified through Table 19, and a real data rate according to the allocated TBS may be identified through Table 20. At this time, the real data rate may be larger than the maximum data rate according to scheduling information.

In the wireless communication system, particularly, in the NR system, a data rate which can be supported by the UE may be appointed between the BS and the UE. This may be calculated using a maximum frequency band supported by the UE, a maximum modulation order, the maximum number of layers, and the like. However, the calculated data rate may be different from a value calculated on the basis of the size of a TB, i.e., TBS, used for real data transmission and a transmission time interval (TTI) length.

Accordingly, the UE may receive a TBS larger than a value corresponding to the data rate supported by the UE, and thus there may be limitation on the TBS which can be scheduled according to the data rate supported by the UE in order to prevent the problem.

Since the UE is generally spaced apart from the BS, a signal transmitted by the UE is received by the BS after a propagation delay. The propagation delay is a value obtained by dividing a path of propagation from the UE to the BS by the velocity of light, and may be a value obtained by dividing the distance from the UE to the BS by the velocity of light. In an embodiment, when the UE is spaced apart from the BS by 100 km, a signal transmitted by the UE is received by the BS after about 0.34 msec. Inversely, a signal transmitted by the BS is received by the UE after about 0.34 msec. As described above, a time at which the signal transmitted by the UE arrives at the BS may be different according to the distance between the UE and the BS. Accordingly, when a plurality of UEs existing in different locations transmit signals at the time, times at which the signals arrive at the BS may be all different. In order to make the signals transmitted by the plurality of UEs arrive at the BS at the same time by solving the problem, times at which uplink signals are transmitted may be determined to be different according to locations of the UEs. In the 5G, NR, and LTE systems, this is called timing advance.

Figure 8:
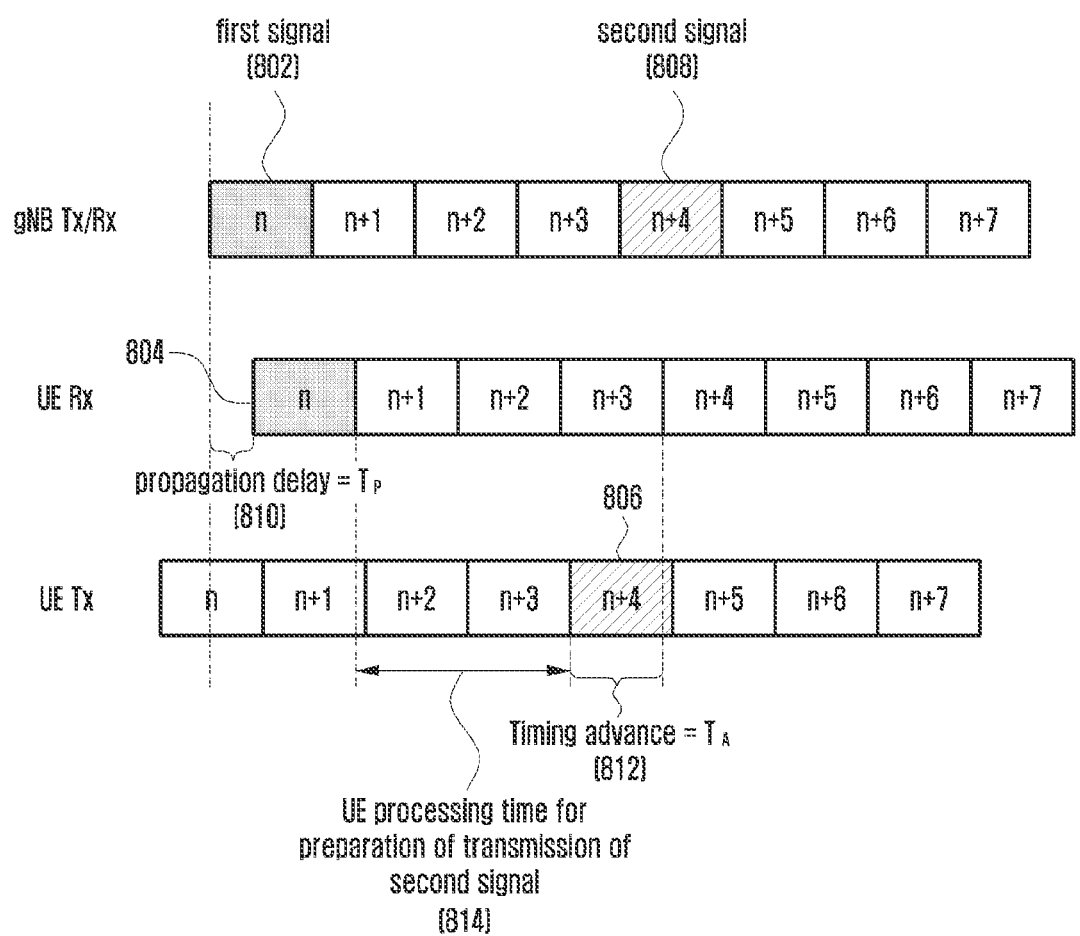
FIG. 8 illustrates a processing time of the UE according to timing advance when the UE receives a first signal and transmits a second signal in response thereto in the 5G or NR system according to an embodiment.

FIG. 8 illustrates a processing time of the UE according to timing advance when the UE receives a first signal and transmits a second signal in response thereto in the 5G or NR system according to an embodiment.

When the BS transmits a first signal (an uplink scheduling grant (UL grant) or a downlink control signal and data (DL grant and DL data) to the UE in slot n 802, the UE may receive the first signal in slot n 804. At this time, the UE may receive a signal later than a time at which the BS transmits the signal by a propagation delay ($T_p$) 810. When the UE receives the first signal in slot n 804, the UE transmits a corresponding second signal (HARQ-ACK/NACK for uplink data or downlink data) in slot n+4 806. When the UE transmits a signal to the BS, the UE may transmit the second signal at timing 806 that is earlier than slot n+4 by the TA 812 according to a reference of the signal received by the UE in order to make the signal arrive at the BS at a specific time. Accordingly, a time for which the UE prepares receiving the uplink scheduling grant, transmitting uplink data or receiving downlink data, and transmitting HARQ ACK or NACK may be a time obtained by subtracting TA from a time corresponding to 3 slots as indicated by reference numeral 814.

In order to determine the timing, the BS may calculate an absolute value of TA of the corresponding UE. When the UE initially accesses, the BS may calculate the absolute value of TA while adding a change in the TA transmitted through higher-layer signaling to the TA initially transmitted to the UE in a random access step or subtracting the change in the TA from the initially transmitted TA, The absolute value of the TA may be a value obtained by subtracting a start time of an $n^{th}$ TTI which the UE receives from a start time of an $n^{th}$ TTI which the UE transmits.

One of the important references of the performance of a cellular wireless communication system is packet data latency. To this end, signals are transmitted and received in units of subframes having a TTI of 1 ms in the LTE system. In the LTE system operating as described above, the UE (short-TTI UE) having a TTI shorter than 1 ms may be supported. Meanwhile, in the 5G or NR system, the TTI may be shorter than 1 ms. The short-TTI UE is suitable for services such as a voice over LTE (VoLTE) in which latency is important, and remote control. Further, the short-TTI UE may be a means to realize cellular-based mission-IoT.

In the 5G or NR system, when the BS transmits a PDSCH including downlink data, DCI for scheduling the PDSCH indicates a K1 value that is a value corresponding to information on timing at which the UE transmits HARQ-ACK information of the PDSCH. When transmission of HARQ-ACK information including the timing advance earlier than the symbol L1 is not indicated, the UE may transmit the HARQ-ACK information to the BS. That is, HARQ-ACK information may be transmitted from the UE to the BS at a time point that is the same as or later than the symbol L1, including timing advance. When transmission of HARQ-ACK information earlier than the symbol L1 including timing advance is indicated, the HARQ-ACK information may not be HARQ-ACK information effective for HARQ-ACK transmission from the UE to the BS.

The symbol L1 may be a first symbol at which cyclic prefix (CP) starts after $T_{proc,1}$ from the last time point of the PDSCH. $T_{proc,1}$ may be calculated as shown in Equation 7, below.

$$T_{proc,1}=((N_1+d_{1,1}+d_{1,2})(2048+144)\cdot\kappa 2^{-\mu})\cdot T_C \quad (7)$$

In Equation 7, above, $N_1$, $d_{1,1}$, $d_{1,2}$, $\kappa$, $\mu$, and TC may be obtained as follows.

$d_{1,1}=0$ when HARQ-ACK information is transmitted through a PUCCH (uplink control channel) and, $d_{1,1}=1$ when HARQ-ACK information is transmitted through a PUSCH (uplink shared channel, data channel).

When the UE receives a configuration of a plurality of activated component carriers or carriers, a maximum timing difference between carriers may be reflected in second signal transmission.

In the case of a PDSCH mapping type A, i.e., in the case in which a first DMRS symbol location is a third or fourth symbol in the slot, $d_{1,2}=7-i$, a location index i of the last symbol of the PDSCH is smaller than 7.

In the case of a PDSCH mapping type B, i.e., in the case in which the first DMRS symbol location is a first symbol of the PDSCH, $d_{1,2}=3$ when the length of the PDSCH is 4 symbols, $d_{1,2}=3+d$ when the length of the PDSCH is 2 symbols, and d is the number of symbols in which the PDSCH overlaps a PDCCH including a control signal for scheduling the corresponding PDSCH.

$N_1$ is obtained according to $\mu$ as shown in Table 21, below. $\mu=0, 1, 2, 3$ corresponds to SCS 15 kHz, 30 kHz, 60 kHz, and 120 kHz.

TABLE 21

| $\mu$ | PDSCH decoding time $N_1$ [symbols] | |
|---|---|---|
| | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

$N_1$ provided by Table 21 above may be different according to UE capability. $T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta f_{ref}\cdot N_{f,ref})$, $\Delta f_{ref}=15\cdot 10^3$ Hz, $N_{f,ref}=2048$ In the 5G or NR system, when the BS transmits control information including the uplink scheduling grant, a K2 value corresponding to information on timing at which the UE transmits uplink data or the PUSCH may be indicated.

When transmission of the PUSCH earlier than the symbol L2 including timing advance is not indicated, the UE may transmit the PUSCH to the BS. That is, the PUSCH may be transmitted from the UE to the BS at a time point that is the same as or later than the symbol L2, including timing advance. When transmission of the PUSCH including timing advance earlier than the symbol L2 is indicated, the UE may ignore uplink scheduling grant control information from the BS.

The symbol L2 may be a first symbol at which a CP of a PUSCH symbol which should be transmitted after $T_{proc,2}$ from the last time point of the PDCCH including the scheduling grant starts. $T_{proc,2}$ may be calculated as shown in Equation 8, below.

$$T_{proc,2}=((N_2+d_{2,1})(2048+144)\cdot\kappa 2^{-\mu})\cdot T_C \quad (8)$$

In Equation 8, above, $N_2$, $d_{2,1}$, $\kappa$, $\mu$, and $T_C$ may be obtained as follows.

$d_{2,1}=0$ when a first symbol of the symbols to which the PUSCH is allocated includes only a DMRS, and otherwise, $d_{2,1}=1$.

When the UE receives a configuration of a plurality of activated component carriers or carriers, a maximum timing difference between carriers may be reflected in second signal transmission.

$N_2$ is obtained according to $\mu$ as shown in Table 22, below. $\mu=0, 1, 2, 3$ corresponds to SCS 15 kHz, 30 kHz, 60 kHz, and 120 kHz.

TABLE 22

| $\mu$ | PUSCH preparation time $N_2$ [symbols] |
|---|---|
| 0 | 10 |
| 1 | 12 |
| 2 | 23 |
| 3 | 36 |

$N_2$ provided by Table 22, above may be different according to UE capability.

The 5G or NR system may configure a frequency BWP within one carrier and designate transmission and reception by a specific UE within the BWP. This is to reduce power consumption of the UE. The BS may configure a plurality of BWPs and change activated BWPs in control information. A time available by the UE to change the BWPs may be obtained as shown in Table 23, below.

TABLE 23

| Frequency range | Scenario | Type 1 delay (μs) | Type 2 delay (μs) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 23, frequency range FR 1 may be a frequency band equal to lower than 6 GHz, and frequency range FR 2 may be a frequency band higher than or equal to 6 GHz, or the frequency ranges may be distinguished as shown in Table 4. In general, FR 2 is a high frequency band close to an mmWave band, and FR 1 refers to a frequency band relatively lower than FR 2. In the above embodiment, type 1 and type 2 may be determined according to UE capability. In the above embodiment, scenarios 1, 2, 3, and 4 are shown in Table 24, below.

TABLE 24

| | Chance in center frequency | Unchanged in center frequency |
|---|---|---|
| Change in frequency bandwidth | Scenario 3 | Scenario 2 |
| Unchanged in frequency bandwidth | Scenario 1 | Scenario 4 when SCS is changed |

Figure 9:
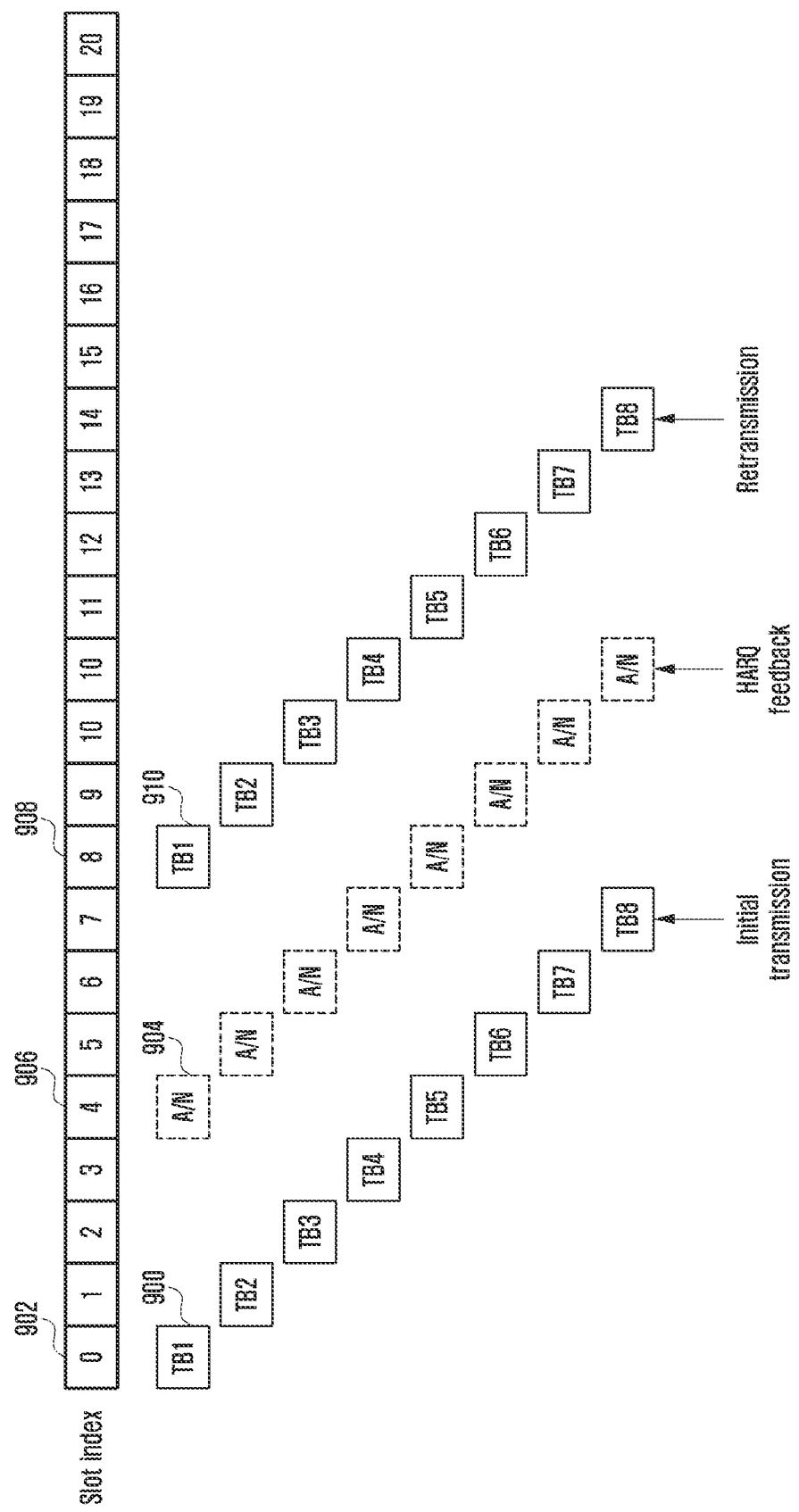
FIG. 9 illustrates an example in which data (e.g., TBs) are scheduled and transmitted according to a slot, HARQ-ACK feedback for the corresponding data is received, and retransmission is performed according to the feedback.

FIG. 9 illustrates an example in which data (e.g., TBs) are scheduled and transmitted according to a slot, HARQ-ACK feedback for the corresponding data is received, and retransmission is performed according to the feedback. In FIG. 9, TB #1 900 is initially transmitted in slot #0 902, and an ACK/NACK feedback 904 therefor is transmitted in slot #4 906. When initial transmission of TB #1 has failed and NACK has been received, retransmission 910 of TB #1 may be performed in slot #8 908. A time point at which the ACK/NACK feedback is transmitted and a time point at which retransmission is performed may be predetermined or may be determined according to control information or/and a value indicated by higher-layer signaling.

FIG. 9 illustrates an example in TB #1 to TB #8 are sequentially scheduled and transmitted according to slots from slot no. 0. This may mean transmission of TB #1 to TB #8 to which HARQ process IDs 0 to 7 are assigned. When the number of HARQ process IDs which can be used by the BS and the UE is only 4, transmission for 8 different TBs cannot be successively performed.

Figure 10:
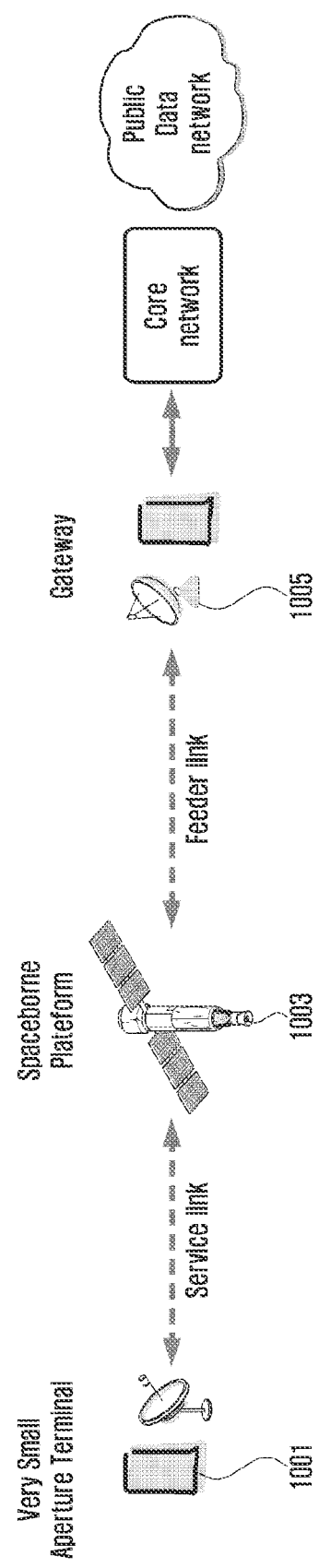
FIG. 10 illustrates a communication system using a satellite.

FIG. 10 illustrates a communication system using a satellite. For example, when a UE 1001 transmits a signal to a satellite 1003 through a service link, the satellite 1003 may transmit the signal to a BS 1005 through a feeder link, and the BS 1005 may process the received signal and transmit the signal including a demand of the following operation therefor to the UE 1001 through the satellite 1003 again. The distance between the UE 1001 and the satellite 1003 is long and the distance between the satellite 1003 and the BS 1005 is also long, and thus a time spent for data transmission/reception from the UE 1001 to the BS 1005 may become longer.

Figure 11:
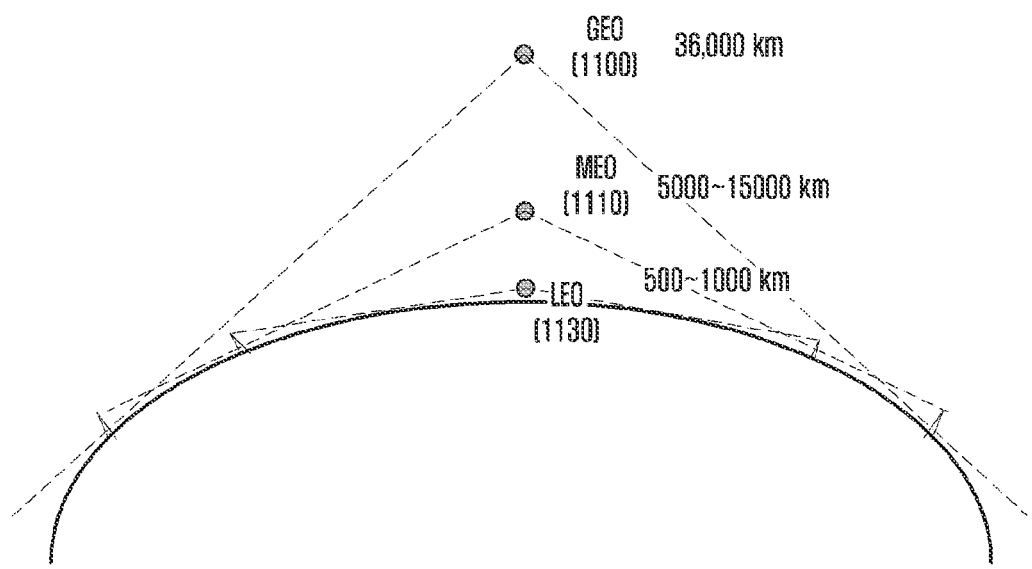
FIG. 11 illustrates revolution periods of a communication satellite around the earth according to satellite altitude and height.

FIG. 11 illustrates a revolution period of a communication satellite around the earth according to satellite altitude and height. Communication satellites may be divided into a low earth orbit (LEO) 1130, a middle earth orbit (MEO) 1110, a geostationary earth orbit (GEO) 1100, and the like. In general, the GEO 1100 refers to an altitude of 36,000 km, the MEO 1110 refers to an altitude from 5,000 to 15,000 km, and the LEO 1130 refers to an altitude from 500 to 1,000 km. The revolution period around the earth varies depending on the altitude, and the GEO 1100 has a revolution period around the earth of about 24 hours, the MEO 1110 has about 6 hours, and the LEO 1130 has about 90 to 120 minutes. A LEO (~2,000 km) satellite has a shorter propagation delay time (understood as a time spent until a signal output from a transmitter arrives at a receiver) and lower loss with a relatively low altitude than the GEO (36,000 km) satellite.

Figure 12:
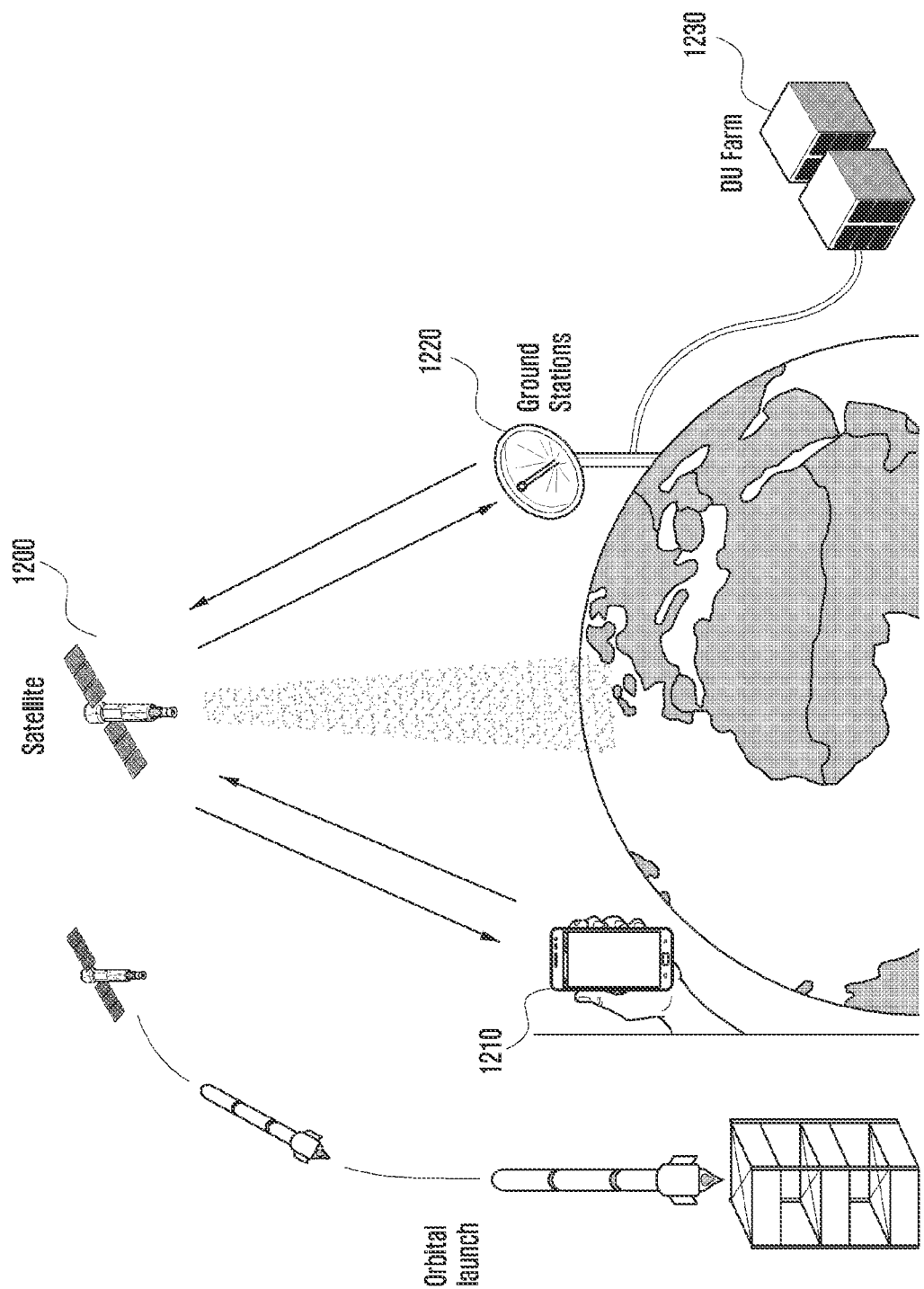
FIG. 12 illustrates direct communication between a satellite and a UE.

FIG. 12 illustrates direct communication between a satellite and a UE. A satellite 1200 transmits and receives a signal to and from the UE 1210 on the ground and also transmits and receives a signal to and from a ground station 1230 connected to a ground BS (DU farms) 1230.

Figure 13:
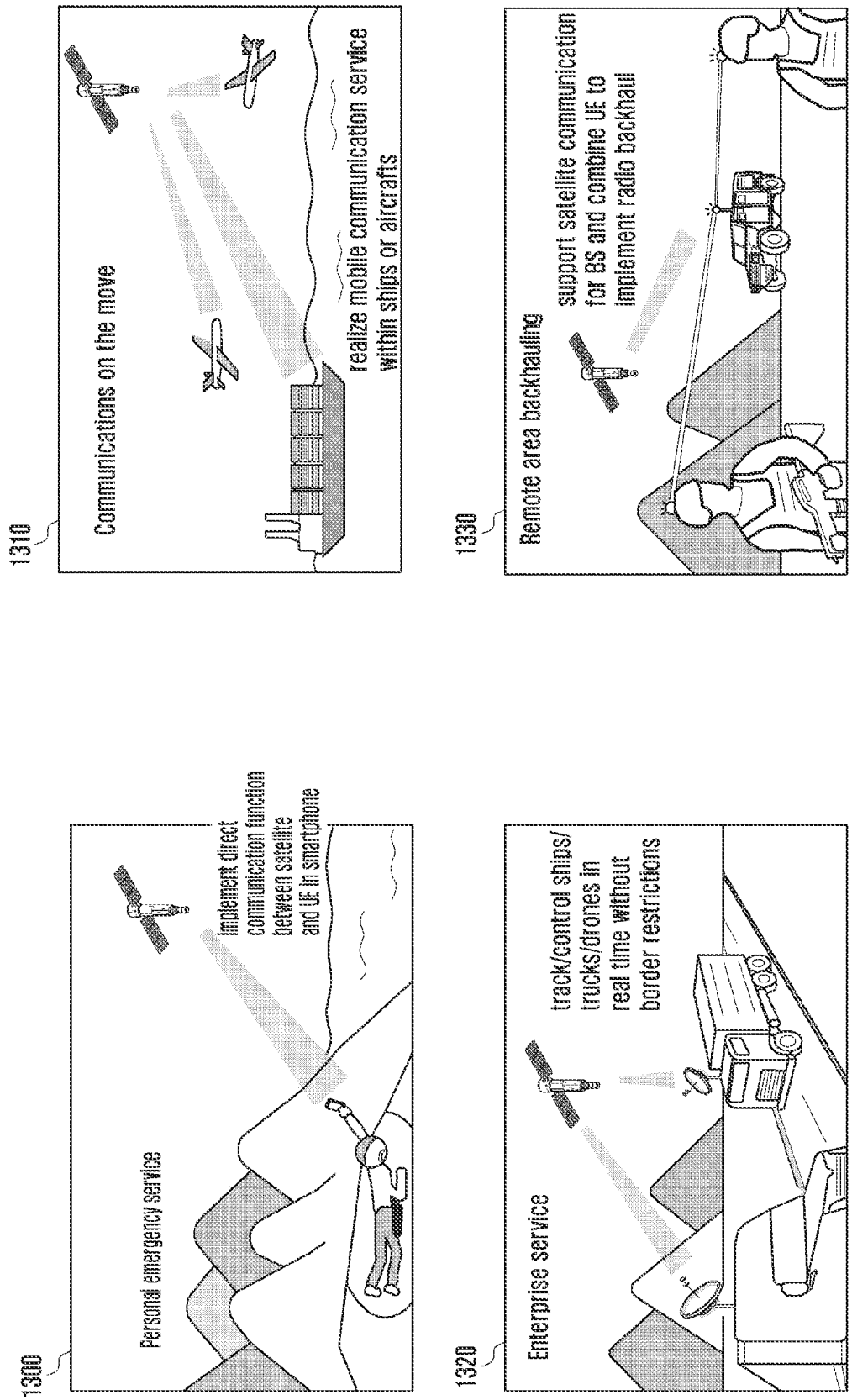
FIG. 13 illustrates direct communication between the satellite and the UE.

FIG. 13 illustrates direct communication between the satellite and the UE. The direct communication between the satellite and the UE can support a communication service specialized to compensate the coverage limit of a ground network. For example, by implementing in the UE a function of the direct communication between the satellite and the UE, satellite communication can be used to make emergency relief of the user or/and transmission and reception of a disaster signal possible in locations lacking ground network communication coverage, as indicated by reference numeral 1300; provide a mobile communication service to the user in an area in which ground network communication is impossible such as on a boat or/and aircraft, as indicated by reference 1310; track and control locations of ships, trucks, or/and drones in real time without border restrictions, as indicated by reference numeral 1320; and perform a backhaul function in a physically remote area by supporting a satellite communication function in the BS and functioning as a backhaul of the BS, as indicated by reference numeral 1330.

Figure 14:
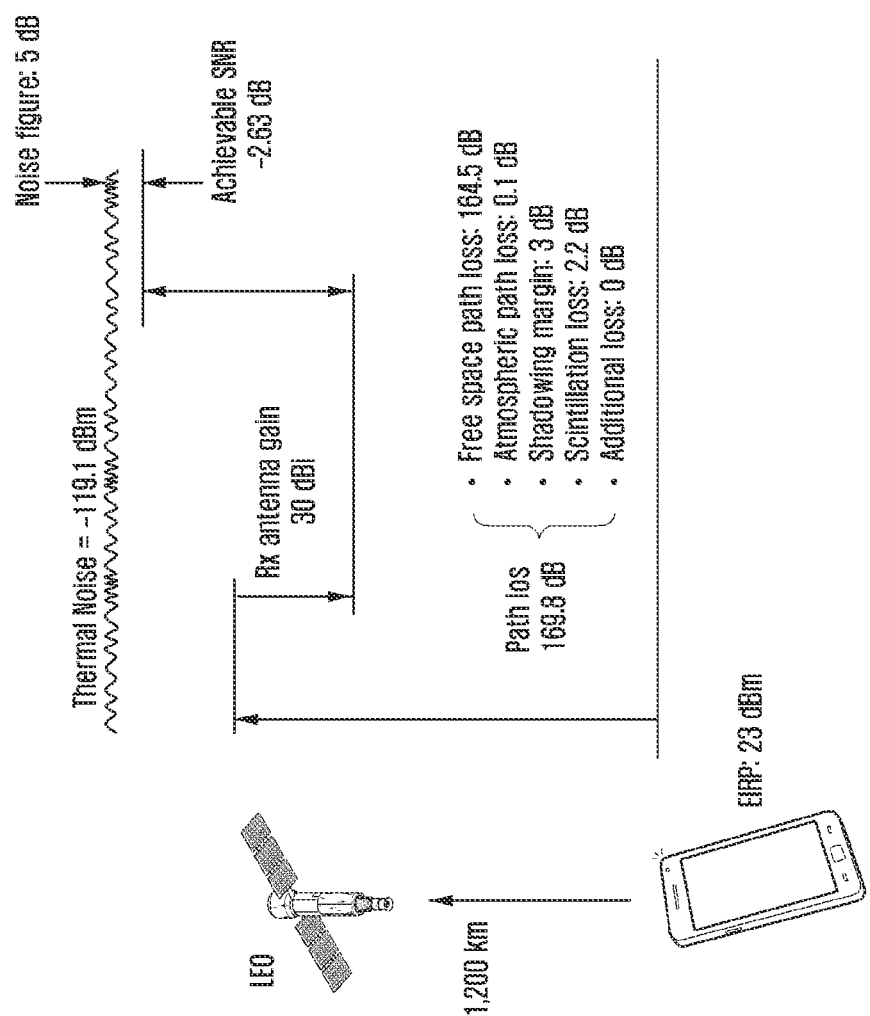
FIG. 14 illustrates calculation of expected data throughput in the uplink when the LEO satellite having an altitude of 1200 km and the UE on the ground perform direct communication.

FIG. 14 illustrates calculation of expected data throughput in the uplink when the LEO satellite having an altitude of 1200 km and the UE on the ground perform direct communication. When effective isotropic radiated power (EIRP) of the ground UE in the uplink is 23 dBm, a path loss of a radio channel to the satellite is 169.8 dB, and a satellite reception antenna gain is 30 dBi, an achievable signal-to-noise ratio (SNR) is estimated as −2.63 dB. In this case, the path loss may include a path loss in the space, a path loss in the atmosphere, and the like. When it is assumed that a signal-to-interference ratio (SIR) is 2 dB, a signal-to-interference and noise ratio (SINR) is calculated as −3.92 dB, in which case a transmission rate of 112 kbps can be achieved when SCS of 30 kHz and frequency resources of 1 PRB are used.

Figure 15:
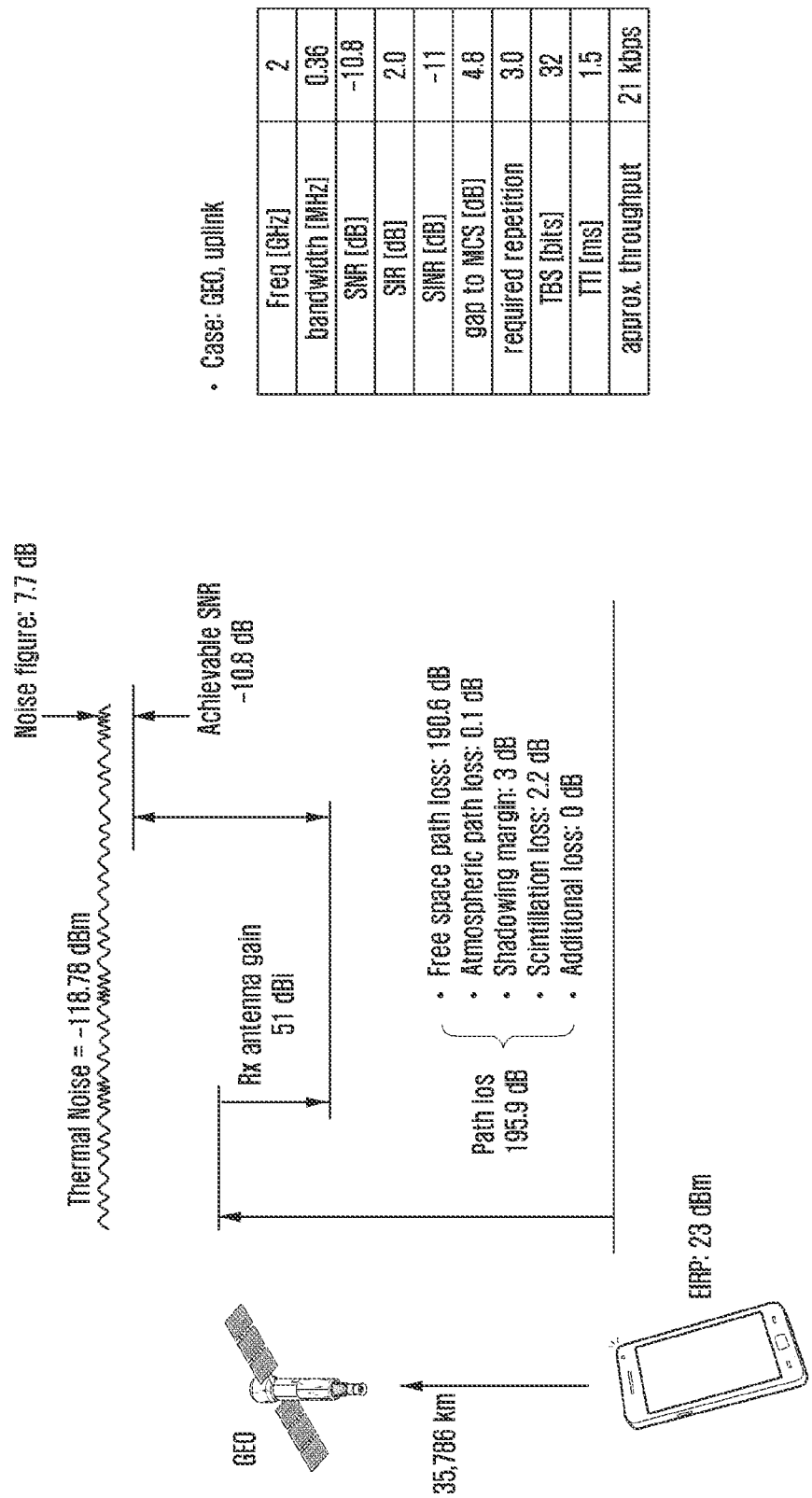
FIG. 15 illustrates calculation of expected data throughput in the uplink when the GEO satellite having an altitude of 35,786 km and the ground UE perform direct communication.

FIG. 15 illustrates calculation of expected data throughput in the uplink when the GEO satellite having an altitude of 35,786 km and the ground UE perform direct communication. When ELRP of the ground UE in the uplink is 23 dBm, a path loss of a radio channel to the satellite is 195.9 dB, and a satellite reception antenna gain is 51 dBi, an achievable SNR is estimated as −10.8 dB. In this case, the path loss may include a path loss in the space, a path loss in the atmosphere, and the like. When it is assumed that the SIR is 2 dB, the SINR is calculated as −11 dB, in which case a transmission rate of 21 kbps can be achieved when SCS of 30 kHz and frequency resources of 1 PRB are used, which is the result of 3 repeated transmissions.

Figure 16:
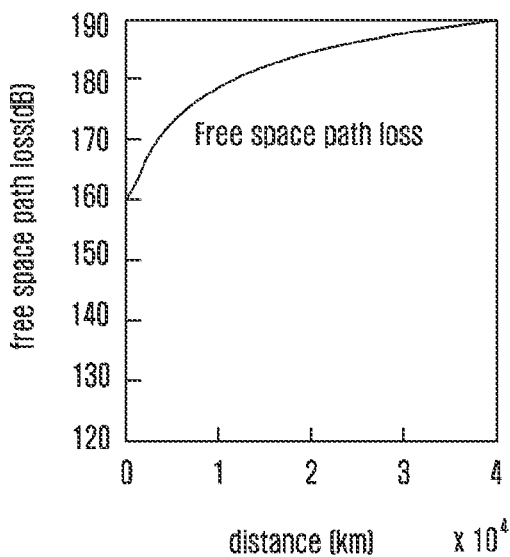
FIG. 16 illustrates a path loss value according to a path loss model between a UE and a satellite and a path loss according to a path loss model between the UE and a ground network communication BS.
Figure 16:
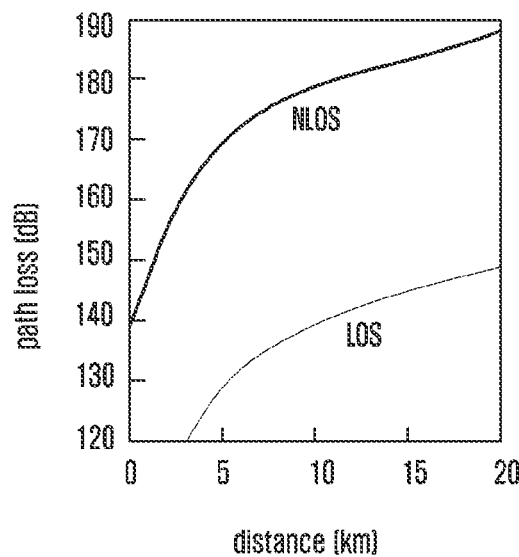

FIG. 16 illustrates a path loss value according to a path loss model between a UE and a satellite and a path loss according to a path loss model between the UE and a ground network communication BS.

Referring to FIG. 16, d is a distance and $f_c$ is a frequency of a signal. A path loss 1600 in a free space in which communication between the UE and the satellite is performed is inversely proportional to the square of the distance, but path losses 1610 and 1620 ($PL_2$ and $PL'_{Uma-NLOS}$) on the ground on which air exists and communication between the UE and a ground network communication BS (terrestrial gNB) is performed is inversely proportional almost to the fourth power of the distance. $d_{3d}$ is a straight-line distance between the UE and the BS, $h_{BS}$ is a height of the BS, and $h_{UT}$ is a height of the UE. It is calculated that $d'_{BP}=4 \times h_{BS} \times h_{UT} \times f_c/c$ $f_c$ is a central frequency in units of Hz and c is a speed of light in units of m/s.

In satellite communication (or non-terrestrial network (NTN)), Doppler shift, that is, frequency movement (offset) of a transmission signal is generated due to continuous fast movement of the satellite.

Figure 17:
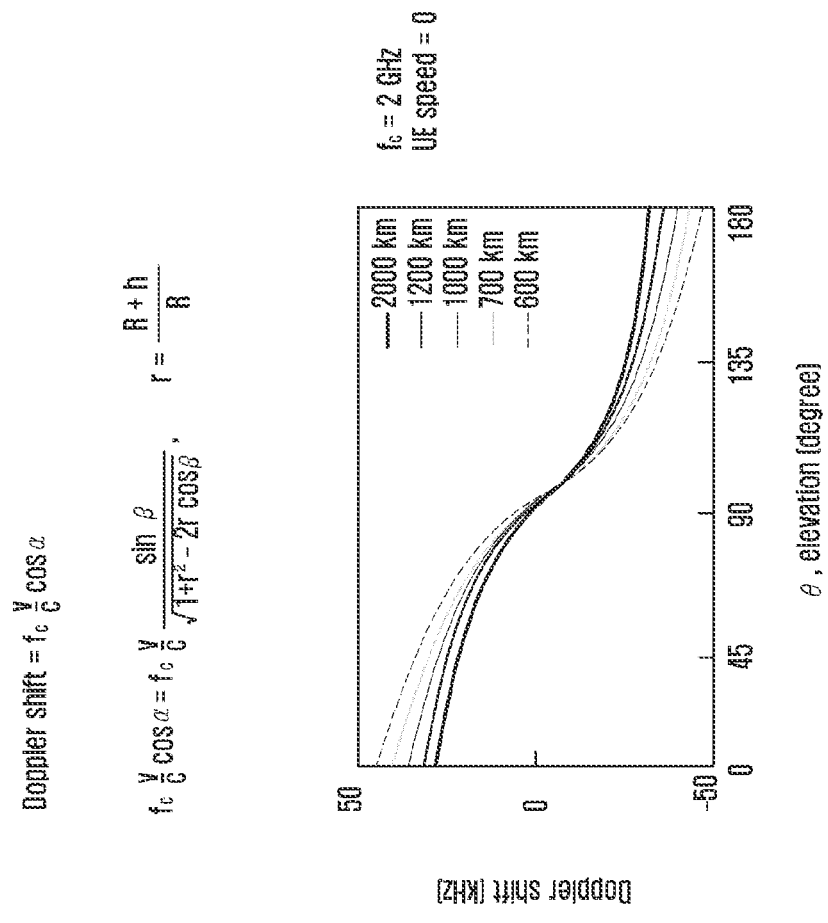
FIG. 17 illustrates parameters of an equation for calculating an amount of the Doppler shift which a signal experiences and the result thereof when the signal transmitted from the satellite is received by a user on the ground according to altitude and a location of the satellite, and a location of the user of the UE on the ground.
Figure 17:
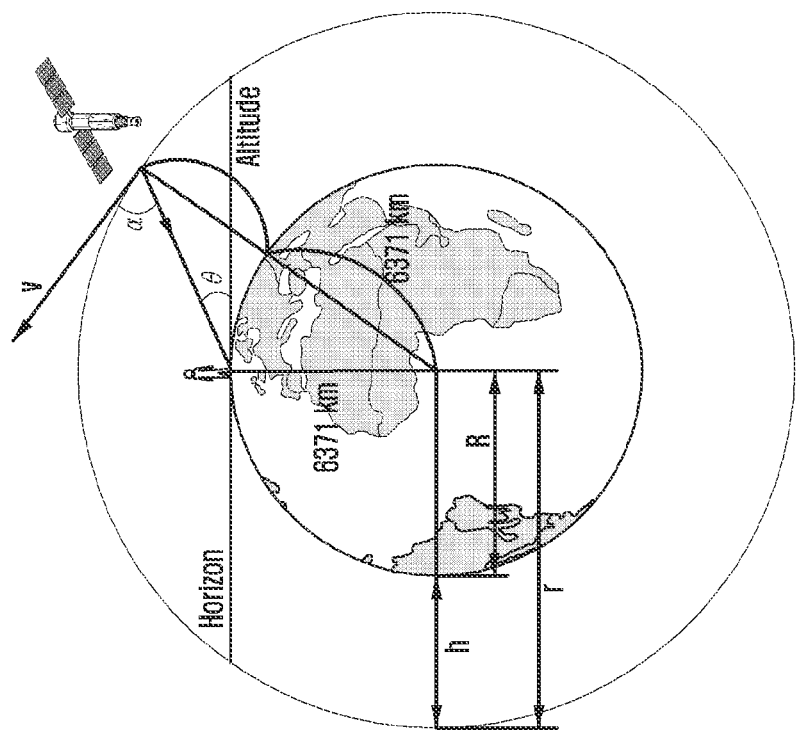
Figure 18:
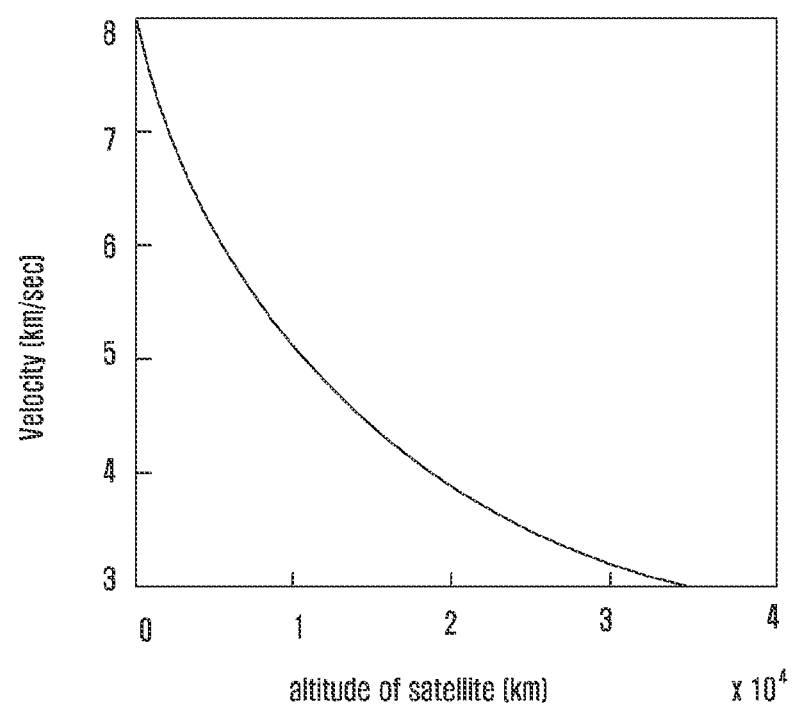
FIG. 18 illustrates a velocity of the satellite calculated at an altitude of the satellite.

FIG. 17 illustrates parameters of an equation for calculating an amount of the Doppler shift which a signal experiences and the result thereof when the signal transmitted from the satellite is received by a user on the ground according to altitude and a location of the satellite, and a location of the user of the UE on the ground. An earth radius is R, h is an altitude of the satellite, v is a speed of revolution of the satellite around the earth, $f_c$ is a frequency of a signal, and r is the sum of the earth radius R and satellite altitude h. The speed of the satellite may be calculated by the altitude of the satellite, which corresponds to a speed making the gravity that is the force which causes the earth to pull the satellite the same as the centripetal force generated according to the revolution of the satellite, and may be calculated as shown in FIG. 18. FIG. 18 illustrates a velocity of the satellite calculated at an altitude of the satellite. As identified in FIG. 17, an angle α is determined by an elevation angle θ, and thus a value of Doppler shift is determined according to the elevation angle θ.

Figure 19:
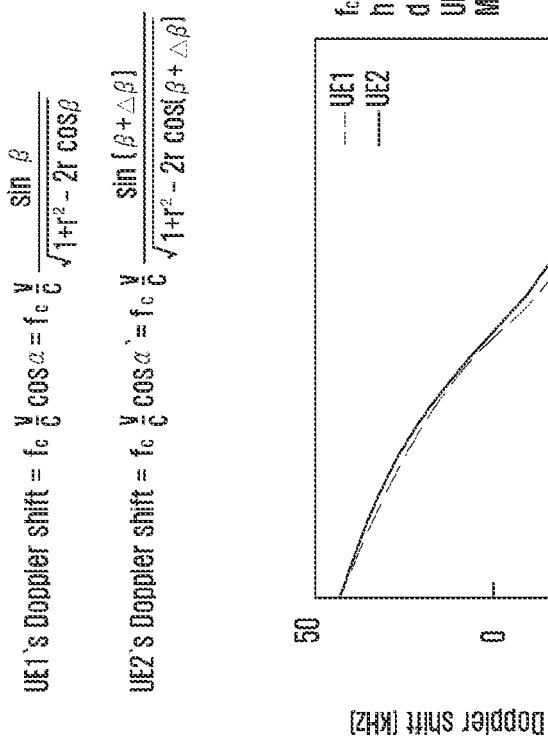
FIG. 19 illustrates Doppler shift which different UEs in one beam which a satellite transmits to the ground experience.
Figure 19:
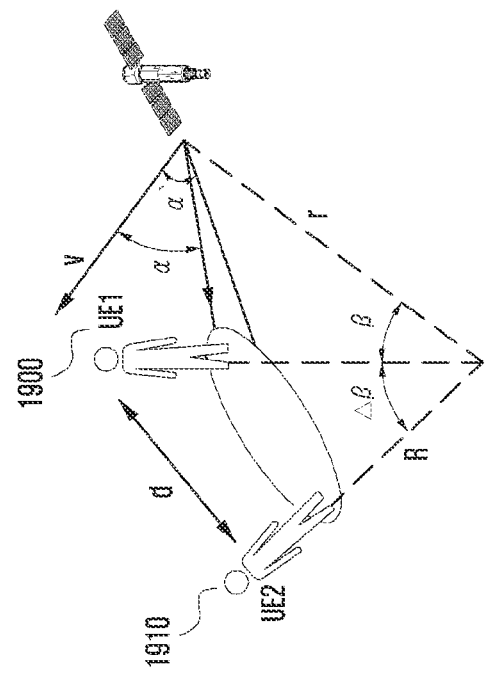

FIG. 19 illustrates Doppler shift which different UEs in one beam which a satellite transmits to the ground experience.

Referring to FIG. 19, Doppler shifts which UE #1 1900 and UE #2 1910 experience according to an elevation angle θ are calculated. It is the result of the assumption that the center frequency is 2 GHz, a satellite altitude is 700 km, a radius of one beam on the ground is 50 km, and a speed of the UE is 0. Further, the calculated Doppler shift ignores an effect according to a speed of earth rotation, which may be considered as a small influence since the speed of the earth's rotation is slow compared to a speed of the satellite.

Figure 20:
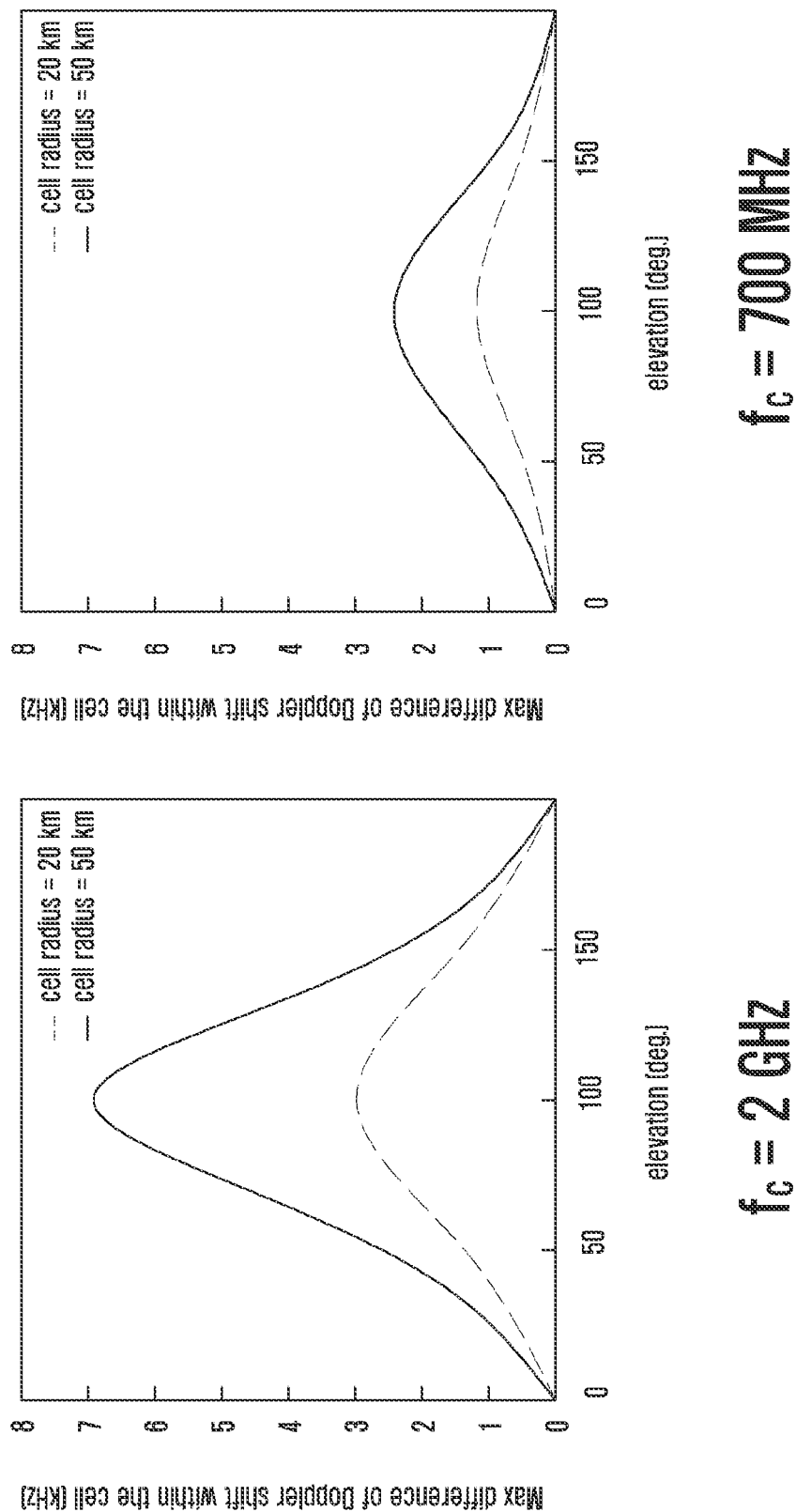
FIG. 20 illustrates a difference between Doppler shifts generated within one beam according to a location of the satellite determined by an elevation angle.

FIG. 20 illustrates a difference between Doppler shifts generated within one beam according to a location of the satellite determined by an elevation angle. When the satellite is directly above the beam, that is, when an elevation angle is 90 degrees, the difference between Doppler shifts is the largest within the beam (or cell). When the satellite is located at the top in the middle, Doppler shift values on one end and the other end of the beam have a positive value and a negative value, respectively.

Meanwhile, since a great distance exists between the satellite and a user on the ground in satellite communication, the satellite communication has a longer delay time compared to ground network communication.

Figure 21:
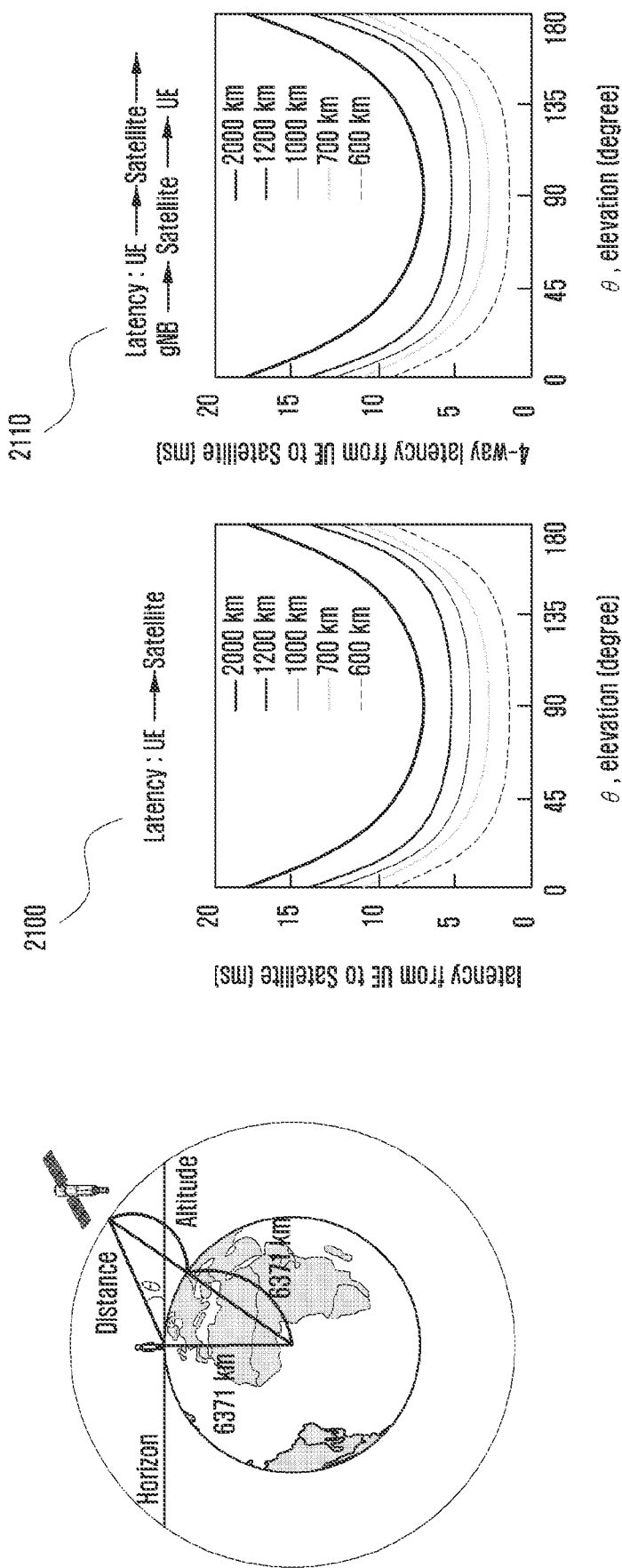
FIG. 21 illustrates a delay time from a UE to a satellite according to a location of the satellite determined by an elevation angle and a round trip delay time between the UE, the satellite, and a BS.

FIG. 21 illustrates a delay time from a UE to a satellite according to a location of the satellite determined by an elevation angle and a round trip delay time between the UE, the satellite, and a BS. Reference numeral 2100 indicates a delay time from the UE to the satellite, and reference numeral 2110 indicates a round trip delay time between the UE, the satellite, and the BS.

At this time, it is assumed that the delay time between the satellite and the BS and the delay time between the UE and the satellite are the same as each other.

Figure 22:
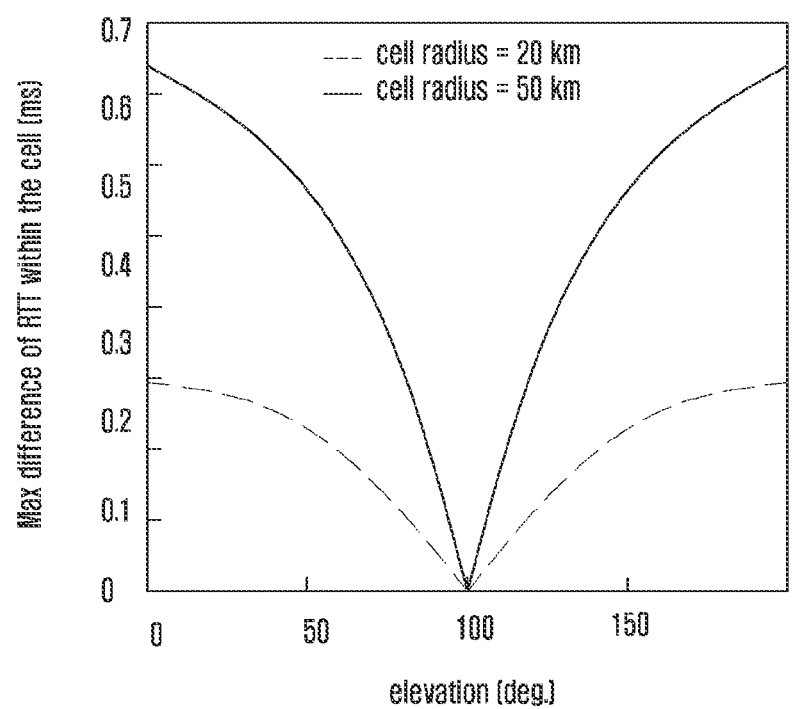
FIG. 22 illustrates a maximum difference value of a round trip delay time varying depending on a location of a user within one beam.

FIG. 22 illustrates a maximum difference value of a round trip delay time varying depending on a location of a user within one beam. For example, when a beam radius (or cell radius) is 20 km, a difference between round trip delay times between UEs at difference locations within the beam and the satellite may be equal to or smaller than about 0.28 ms according to the location of the satellite.

Transmission and reception of a signal with the BS by the UE in satellite communication may mean delivery of the signal through the satellite. That is, the satellite may serve to receive a signal, which the BS transmits to the satellite, and then transmit the signal to the UE in the downlink, and may also serve to receive a signal, which the UE transmits to the satellite, and then transmit the signal to the BS in the uplink. The satellite may receive the signal and then transmit the signal after performing only frequency shift or may perform signal processing such as decoding and re-encoding based on the received signal and then transmit the signal.

In the case of LTE or NR, the UE may access the BS through the following procedure.

Step 1: the UE receives an SS (or an SS block (SSB) including a broadcasting signal) from the BS. The synchronization signal may include a PSS, an SSS, and a PBCH. The SS may include information on a slot boundary of a signal which the BS desires to transmit, a frame number, a downlink, an uplink configuration, and the like. Further, through the SS, the UE may acquire a subcarrier offset, scheduling information for transmitting system information, and the like.

Step 2: the UE receives system information (SIB) from the BS. The SIB may include information for performing initial access and random access. Information for performing random access may include resource information for transmitting a random access preamble.

Step 3: a random access preamble (or message 1 (msg1)) is transmitted in random access resources configured in Step 2. The preamble may be a signal determined on the basis of the information configured in Step 2 using a predetermined progression. The BS receives the preamble transmitted by the UE. The UE may attempt reception of the preamble configured in resources which the BS configures without knowing which UE transmitted the preamble and, when the reception is successful, may know that at least one UE transmitted the preamble.

Step 4: when the preamble is received in Step 3, the BS transmits a RAR (or message 2 (msg2)) corresponding to a response thereto. The UE transmitting the random access preamble in Step 3 may attempt reception of the RAR transmitted by the BS in this step. The RAR is transmitted on a PDSCH, and a PDCCH for scheduling the PDSCH is transmitted together or in advance. A CRC scrambled by an RA-RNTI is added to DCI for scheduling the RAR, and the DCI (and CRC) is channel-coded and then mapped to the PDCCH and transmitted. The RA-RNTI may be determined on the basis of a time at which the preamble is transmitted in Step 3 and frequency resources.

A maximum limit time until the UE transmitting the random access preamble in Step 3 receives the RAR in this step can be configured in the SIB transmitted in Step 2. This may be restrictively configured as, for example, a maximum of 10 ms or 40 ms. That is, when the UE transmitting the preamble in Step 3 does not receive the RAR within a time determined on the basis of, for example, the configured maximum time 10 ms, the preamble may be transmitted again. The RAR may include scheduling information for allocating resources of the signal to be transmitted by the UE in a following Step 5.

Figure 23:
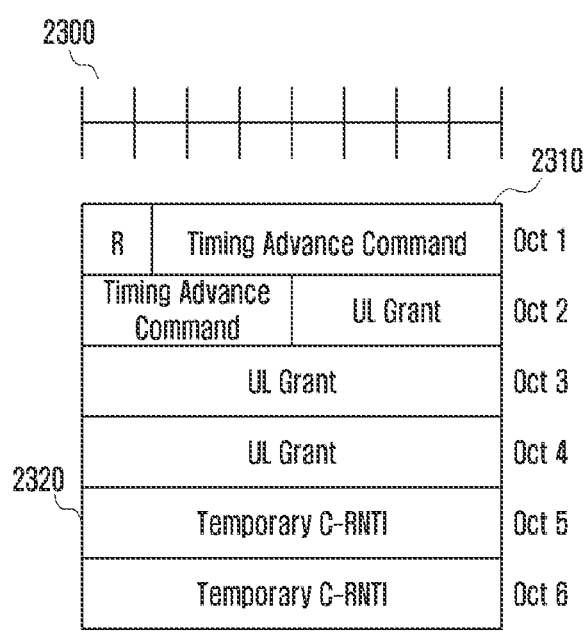
FIG. 23 illustrates the information format of a random access response (RAR)

FIG. 23 illustrates the information format (MAC payload) of the RAR. This may be a MAC payload format (fallback RAR) of Msg B. A RAR 2300 may be, for example, a MAC PDU, and may include information 2310 on TA to be applied by the UE and a temporary C-RNTI 2320 to be used in the following step.

R field: is a reserved bit and may be configured as, for example, "0".

Timing advance command field 2310: indicates an index value TA used to control an amount of timing adjustment which should be applied by the MAC entity. The size of the timing advance command field is, for example, 12 bits.

UL grant field: indicates resources to be used in the uplink, wherein the size of the UL grant field is, for example, 27 bits.

Temporary C-RNTI field 2320: indicates a temporary identifier used by the MAC entity during random access, wherein the size of the temporary C-RNTI field is, for example, 16 bits.

Step 5: the UE receiving the RAR in step 4 transmits message 3 (msg3) to the BS according to scheduling information included in the RAR. The UE may insert its own unique ID into msg3 and transmit the msg3. The BS may attempt reception of msg3 according to the scheduling information which the BS transmitted in Step 4.

Step 6: after receiving msg3 and identifying ID information of the UE, the BS generates message 4 (msg4) including the ID information of the UE and transmits the same to the UE. The UE transmitting msg3 in step 5 may attempt reception of msg4 to be transmitted in Step 6 thereafter. The UE receiving msg4 may compare the ID included in msg4 with the ID which the UE transmitted in Step 5 and identify whether msg3 which the UE transmitted is received by the BS. After the UE transmits msg3 in Step 5, the time until msg4 is received in this step may have restrictions and a maximum time may be configured by the SIB in Step 2.

When the initial access procedure using the steps is applied to satellite communication, a propagation delay time in the satellite communication may have a problem. For example, a period (random access window) from transmission of the random access preamble (or PRACH preamble) by the UE in Step 3 to reception of the RAR in Step 4, that is, a maximum time to the reception thereof may be configured through ra-ResponseWindow, and the maximum time in the conventional LTE or 5G NR system may be configured up to a maximum of 10 ms.

Figure 24:
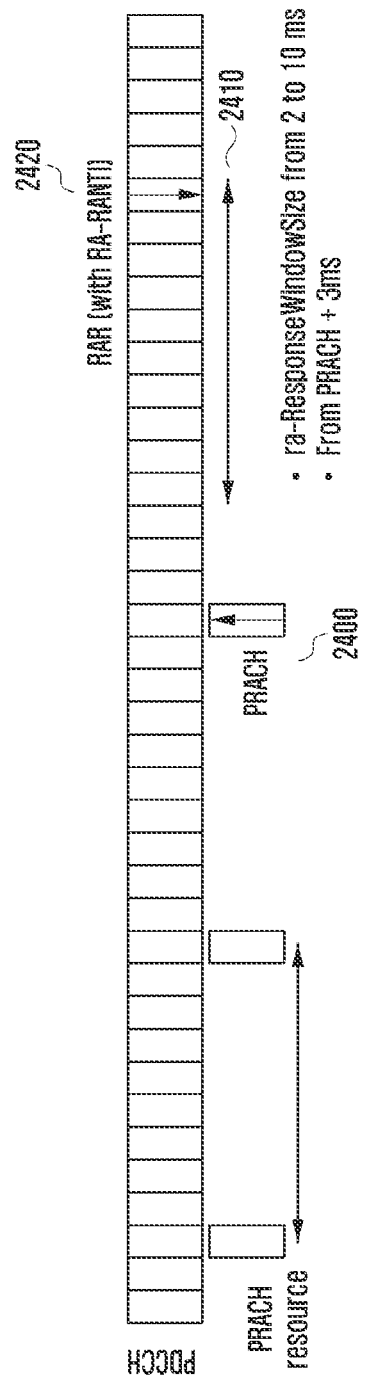
FIG. 24 illustrates the relation between a physical random access channel (PRACH) preamble configuration resources and a RAR reception time point in the LTE system.
Figure 25:
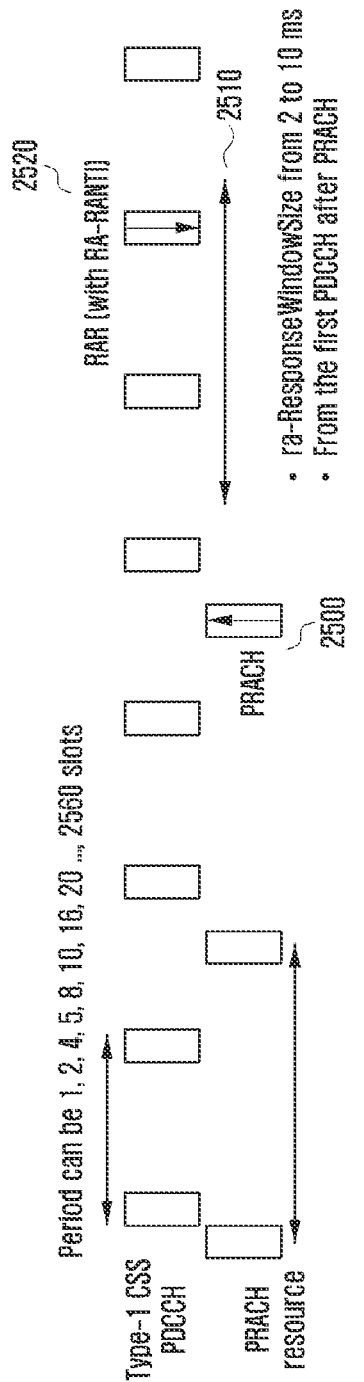
FIG. 25 illustrates the relation between PRACH preamble configuration resources and a RAR reception time point in the 5G NR system.

FIG. 24 illustrates the relation between PRACH preamble configuration resources and a RAR reception time point in the LTE system, and FIG. 25 illustrates the relation between PRACH preamble configuration resources and a RAR reception time point in the 5G NR system. Referring to FIG. 24, in the case of LTE, a random access window 2400 starts at a time point after 3 ms from transmission 2410 of a PRACH (random access preamble), and when the UE receives a RAR within the random access window, as indicated by reference numeral 2420, the UE may determine that transmission of the PRACH preamble is successful. Referring to FIG. 25, in the case of NR, a random access window 2500 starts at a control information area for RAR scheduling that first appears after transmission 2510 of the PRACH random access preamble. When the UE receives the RAR within the random access window as indicated by reference numeral 2520, it may be determined that transmission of the PRACH preamble is successful.

For example, TA for uplink transmission timing in the 5G NR system may be determined as follows. First, $T_c=1/(\Delta f_{max} \cdot N_f)$, where $\Delta f_{max}=480 \cdot 10^2$ Hz and $N_f=4096$. Further, $\kappa=T_s/T_c=64$, and $T_s=1/(\Delta f_{ref} \cdot N_{f,ref})$, $\Delta f_{ref}=15 \cdot 10^3$ Hz and $N_{f,ref}=2048$ may be determined.

Figure 26:
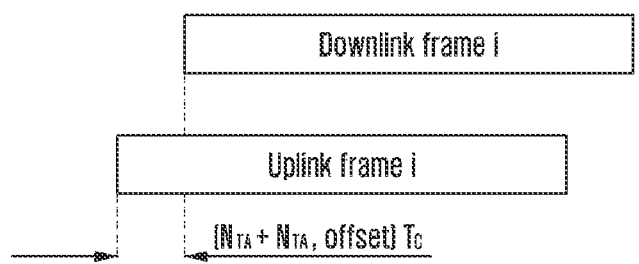
FIG. 26 illustrates timing of a downlink frame and an uplink frame for the UE.

FIG. 26 illustrates timing of a downlink frame and an uplink frame for the UE. The UE may advance an uplink frame 2410 by $T_{TA}=(N_{TA}+N_{TA,offset})T_c$ 2420 from the time point of a downlink frame 2400, and perform uplink transmission. A value of $N_{TA}$ may be transmitted through a RAR or may be determined on the basis of a MAC CE, and $N_{TA,offset}$ may be a value configured in the UE or determined on the basis of a predetermined value.

$T_A$ may be indicated by the RAR of the 5G NR system, in which case $T_A$ may indicate one of 0, 1, 2, . . . , 3846. In this case, when SCS of the RAR is $2^\mu \cdot 15$ kHz, $N_{TA}$ is determined as $N_{TA}=T_A \cdot 16 \cdot 64/2^\mu$. After the UE completes the random access process, a change value of TA may be indicated from the BS through a MAC CE or the like. $T_A$ information indicated through the MAC CE may indicate one of 0, 1, 2, . . . , 63, which may be used to calculate a new TA value by being added to or subtracted from the existing TA value, and the resultant TA value may be newly calculated as $T_{TA\_new}=N_{TA\_old}+(T_A-31) \cdot 16 \cdot 64/2^\mu$ The indicated TA value may be applied to uplink transmission by the UE after a predetermined time.

Figure 27:
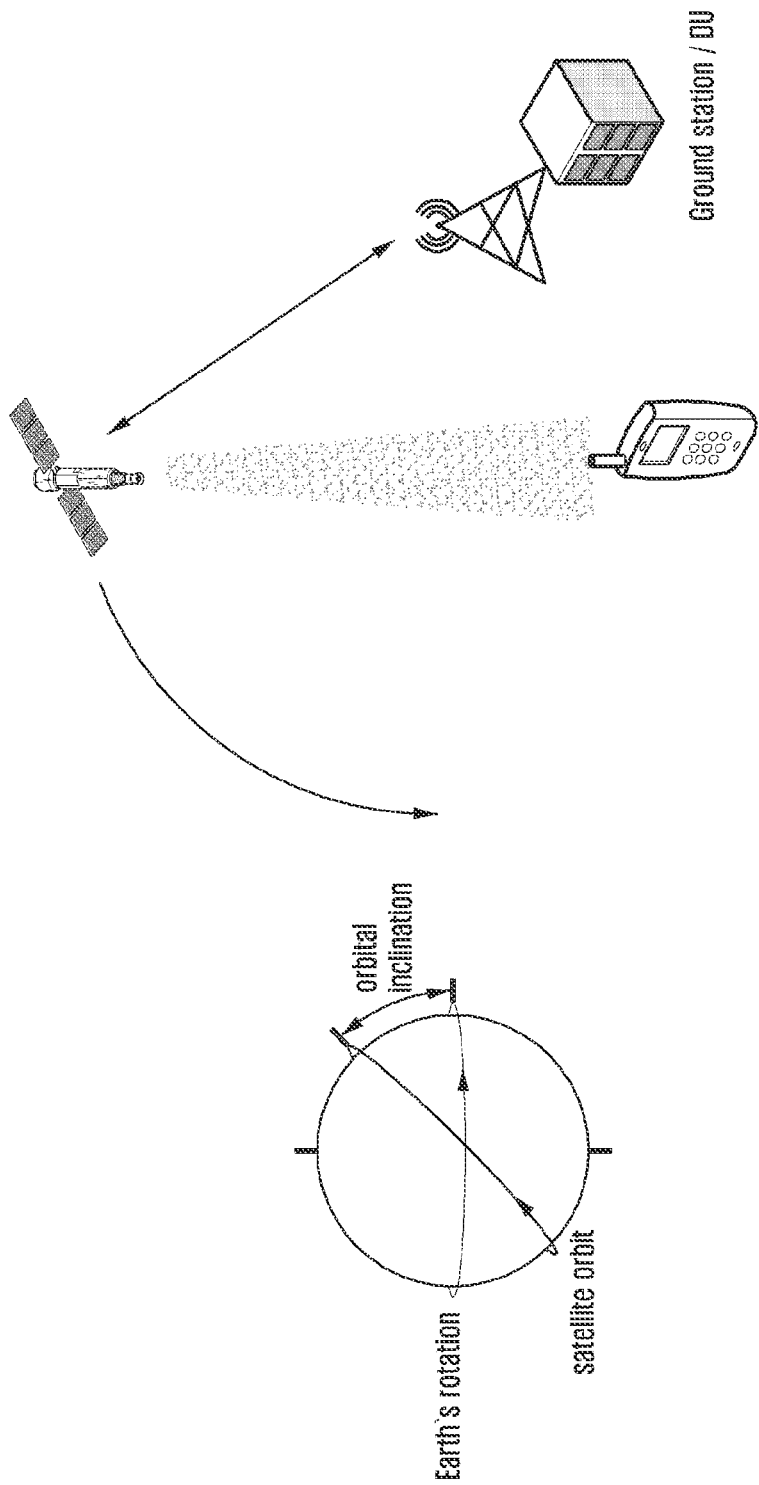
FIG. 27 illustrates continuous movement of a satellite with respect to the ground of the earth or a UE located on the earth according to revolution of the satellite along a satellite orbit around the earth.

FIG. 27 illustrates continuous movement of a satellite with respect to the ground of the earth or a UE located on the earth according to revolution of the satellite along a satellite orbit around the earth. Since the distance between the UE and the satellite varies depending on an elevation angle at which the UE views the satellite, the propagation delay between the UE, the satellite, and the BS may be different.

Figure 28:
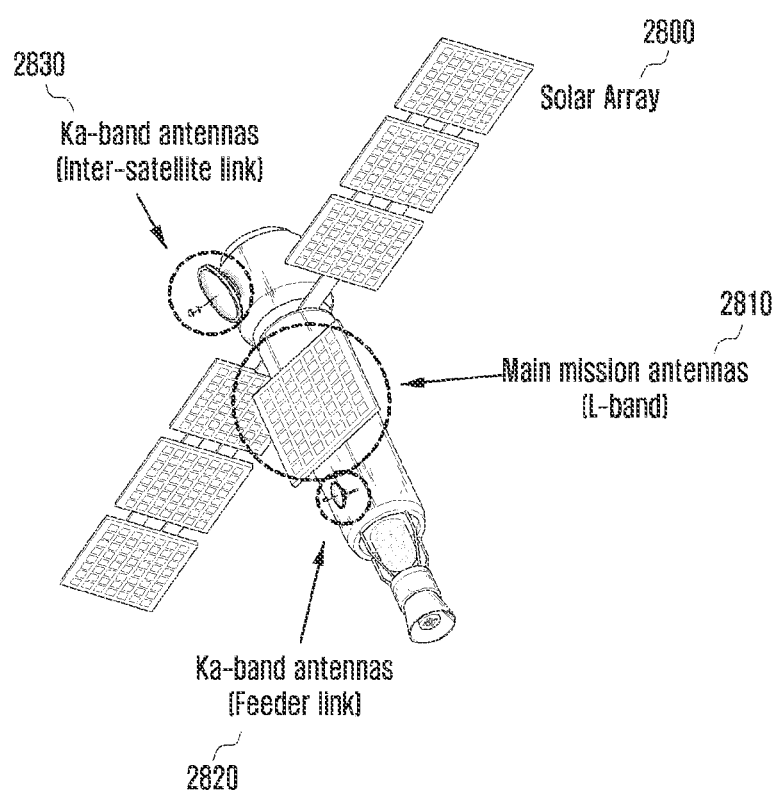
FIG. 28 illustrates the structure of a satellite.

FIG. 28 illustrates the structure of a satellite. The satellite may include a solar panel or a solar array 2800 for solar thermal or solar power generation, a transmission and reception antenna (main mission antenna) 2810 for communication with the UE, a transmission and reception antenna (feeder link antenna) 2820 for communication with the ground station, a transmission and reception antenna (inter-satellite link) 2830 for communication between satellites, and a processor for controlling transmission and reception and processing a signal. When communication between satellites is not supported, the antenna for signal transmission and reception between satellites may not be arranged. Although FIG. 28 illustrates that an L band of 1 to 2 GHz is used for communication with the UE, a K band (18 to 26.5 GHz), a Ka band (26.5 to 40 GHz), and a Ku band (12 to 18 GHz) corresponding to high-frequency bands can be used.

In various embodiments, the term base station (BS) may indicate a predetermined component (or a set of components) configured to provide radio access, such as a transmission point (TP), a transmit-receive point (TRP), an enhanced node B (eNodeB or eNB), a 5G base station (gNB), a macro cell, a femto cell, a WiFi access point (AP), or other wireless enable devices. The BSs may provide radio access according to one or more wireless protocols, for example, 5G 3GPP new wireless interface/access, long-term evolution (LTE), LTE-advanced (LTE-A), high speed packet access (HSPA), Wi-Fi 802.11a/b/g/n/ac, and the like.

In various embodiments, the term terminal may indicate a predetermined component such as UE, a mobile station, a subscriber station, a remote terminal, a wireless terminal, a receive point, or a user device. For convenience, the term UE is used to indicate a device configured to access the BS in various embodiments regardless of whether the terminal should be considered as a mobile device (mobile phone or smartphone) or a stationary device (for example, desktop computer or vending machine).

In various embodiments, the term TA may be used interchangeably with TA information, TA value, TA index, or the like.

In various embodiments, data or control information which the BS transmits to the UE may be referred to as a first signal, and an uplink signal associated with the first signal may be referred to as a second signal. For example, the first signal may include DCI, a UL grant, a PDCCH, a PDSCH, a RAR, and the like, and the second signal associated with the first signal may include a PUCCH, a PUSCH, msg3, and the like.

There may be association between the first signal and the second signal. For example, when the first signal is a PDCCH including a UL grant for uplink data scheduling, the second signal corresponding to the first signal may be a PUSCH including uplink data. Meanwhile, a gap between time points at which the first signal and the second signal are transmitted and received may be a predetermined value between the UE and the BS. Unlike this, a gap between time points at which the first signal and the second signal are transmitted and received may be determined by an indication of the BS or determined by a value transmitted through higher-layer signaling.

Since a great distance exists between the satellite and the BS, and the satellite continuously moves, a time offset may be generated due to a delay time in direct communication when the UE or the BS receives a signal which the BS or the UE transmits. Accordingly, a method and an apparatus are provided in which the BS indicates time offset information to correct the time offset and the UE corrects the time offset according to the time offset information. The following embodiments assume communication between the UE, and the satellite and the ground BS, but do not exclude the case in which the satellite BS communicates with the UE, and the time offset may be interchangeably used with timing advance. The method and the apparatus provided by various embodiments can be applied not only to a satellite communication system but also to a grand communication system.

First Embodiment

In the first embodiment, a method and an apparatus in which, when the UE transmits an uplink signal to the satellite or the BS, the UE directly determines (for example, calculates) a TA value and applies the determined TA value are described. Further, a method and an apparatus are provided in which the BS or the satellite indicates a TA value to be applied to the UE when the UE transmits an uplink signal to the satellite or the BS and the UE applies the indicated TA value to transmit the uplink signal. In addition, in the first embodiment, a method and an apparatus in which the UE adaptively determines the TA value to be applied when the UE transmits an uplink signal to the satellite or the BS are described. More specifically, a method by which the UE determines the TA value by itself and a method and an apparatus in which the BS or the satellite indicates the TA value to the UE as described above and the UE adaptively selects one of the methods of applying the indicated TA value and determines the TA value are described.

First, the UE may compare an uplink transmission time point with a downlink reception time point for uplink synchronization and advance the uplink transmission time point by $T_{TA}$ from the downlink reception time point on the basis of the comparison result. $T_{TA}$ calculated for TA in satellite communication may be expressed as shown in Equation 9, below.

$$T_{TA} = (N_{TA} + N_{TA,UE\text{-}specific} + N_{TA,common} + N_{TA,offset}) \times T_c \quad (9)$$

In Equation 9, above, $T_c$ may be $T_c = 1/(\Delta f_{max} \cdot N_f)$, and $\Delta f_{max} = 480 \cdot 10^3$ Hz and $N_f = 4096$. In Equation 9, $N_{TA}$ may be a value determined on the basis of a TA value included in a RAR or a MAC CE received from the BS, and $N_{TA,offset}$ may be a pre-fixed or pre-appointed value. In Equation 9, $N_{TA\text{-}UE\text{-}specific}$ may be a TA correction value measured by the UE on the basis of locations of the UE and the satellite (or reference location), and $N_{TA,common}$ may be a TA correction value configured or indicated using higher signaling or a physical layer signal.

Equation 9 may be an equation to which parameters $N_{TA,UE\text{-}specific}$ and $N_{TA,common}$ are added compared to Equation 10, below that is the conventional TA application method.

$$T_{TA} = (N_{TA} + N_{TA,offset}) \times T_c \quad (10)$$

Figure 29:
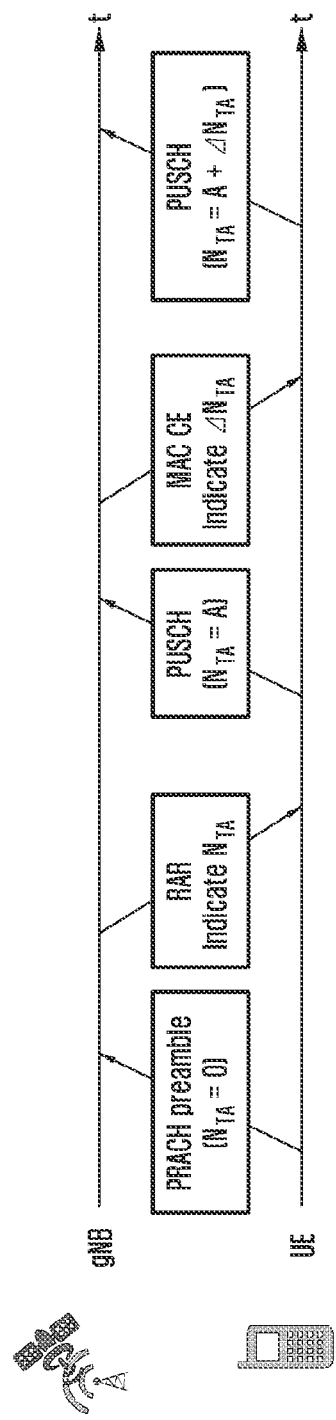
FIG. 29 illustrates a process in which the UE determines $N_{TA}$ from the initial access.

FIG. 29 illustrates a process in which the UE determines $N_{TA}$ from the initial access.

Figure 30:
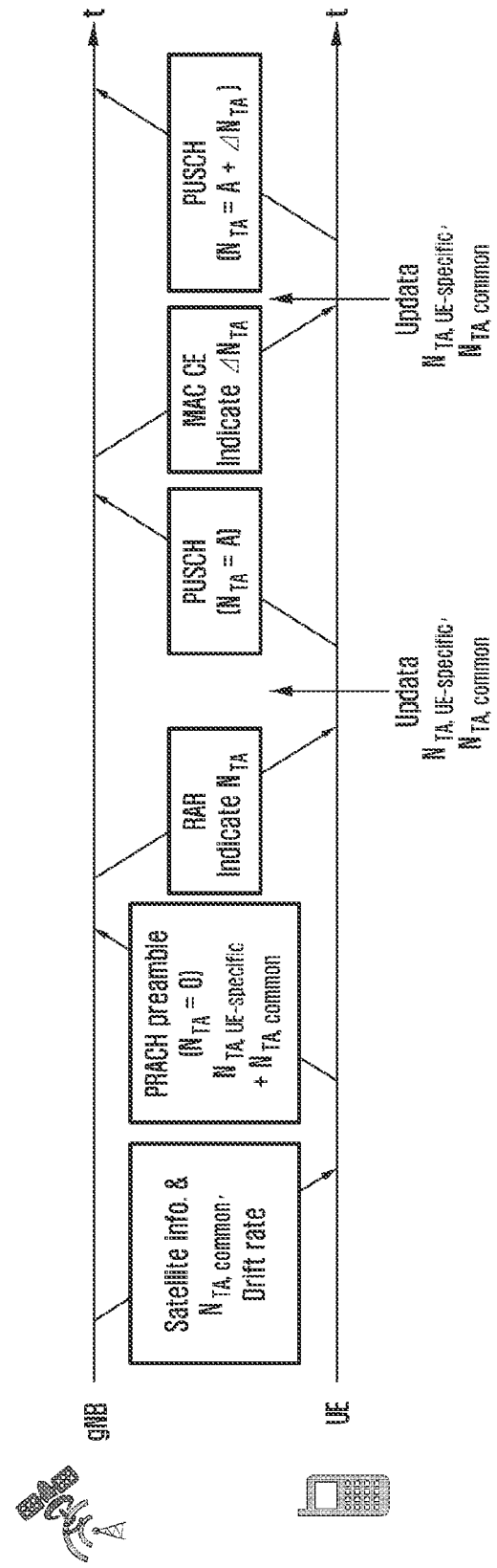
FIG. 30 illustrates a process in which the UE determines $N_{TA}$, $N_{TA,UE-specific}$, and $N_{TA,common}$ from the initial access through a method provided by the disclosure.

FIG. 30 illustrates a process in which the UE determines $N_{TA}$, $N_{TA,UE\text{-}specific}$, and $N_{TA,common}$ from the initial access through a method provided by the disclosure. Referring to FIG. 29, the UE applies $N_{TA} = 0$ and transmits a PRACH preamble to the BS, and the BS transmits a RAR indicating $N_{TA} = 0$. Thereafter, the UE applies $N_{TA} = A$ and transmits a PUSCH, and the BS transmits a MAC CE indicating $\Delta N_{TA}$ to the UE. Then, the UE applies $N_{TA} = A + \Delta N_{TA}$ and transmits the PUSCH.

Referring to FIG. 30, the BS transmits satellite information and configuration information including $N_{TA,common}$ and drift rate to the UE. The UE assumes $N_{TA} = 0$, applies $N_{TA,UE\text{-}specific}$ which the UE measures and configured $N_{TA,common}$n, and transmit a PRACH preamble to the BS. The BS may transmit a RAR indicating $N_{TA}$ to the UE, and update $N_{TA,UE\text{-}specific}$ and $N_{TA,common}$. The UE assumes $N_{TA} = A$, transmits the PUSCH according to the $T_{TA}$ calculated according to Equation 9, and the BS transmits an MAC CE indicating $\Delta N_{TA}$ to the UE. Thereafter, $N_{TA,UE\text{-}specific}$ and $N_{TA,common}$ may be updated, and the UE transmits the PUSCH according to the $T_{TA}$ calculated according to Equation 9 by applying $N_{TA,UE\text{-}specific}$ and $N_{TA,common}$ updated through the application of $N_{TA} = A + \Delta N_{TA}$.

$T_{TA}$ may be determined as $N_{TA} = T_A \cdot 16 \cdot 64/2^\mu$ on the basis of $T_A = 0, 1, 2, \ldots, 3846$ transmitted in msgB. $T_A = 0, 1, 2, \ldots, 63$ may be transmitted through a MAC CE and may be updated to $N_{TA\_new} = N_{TA\_old} + (T_A - 31) \cdot 16 \cdot 64/2\mu$. $\Delta_{fmax}$, $N_f$, $T_A$ transmitted through the RAR or msgB, or the $T_A$ value transmitted through the MAC CE may be changed according to a communication system. When the UE performs the TA update like $N_{TA\_new} = N_{TA\_old} + (T_A - M) \cdot 16 \cdot 64/2^\mu$ on the basis of $T_A$ transmitted from the MAC CE, M may be a value larger than or equal to 31 if a maximum value of $T_A$ is larger than 63 and may be a value equal to or smaller than 31 if the maximum value of $T_A$ is smaller than 63, and the UE may determine the updated $N_{TA}$ value $N_{TA\_new}$ on the basis thereof.

Figure 31:
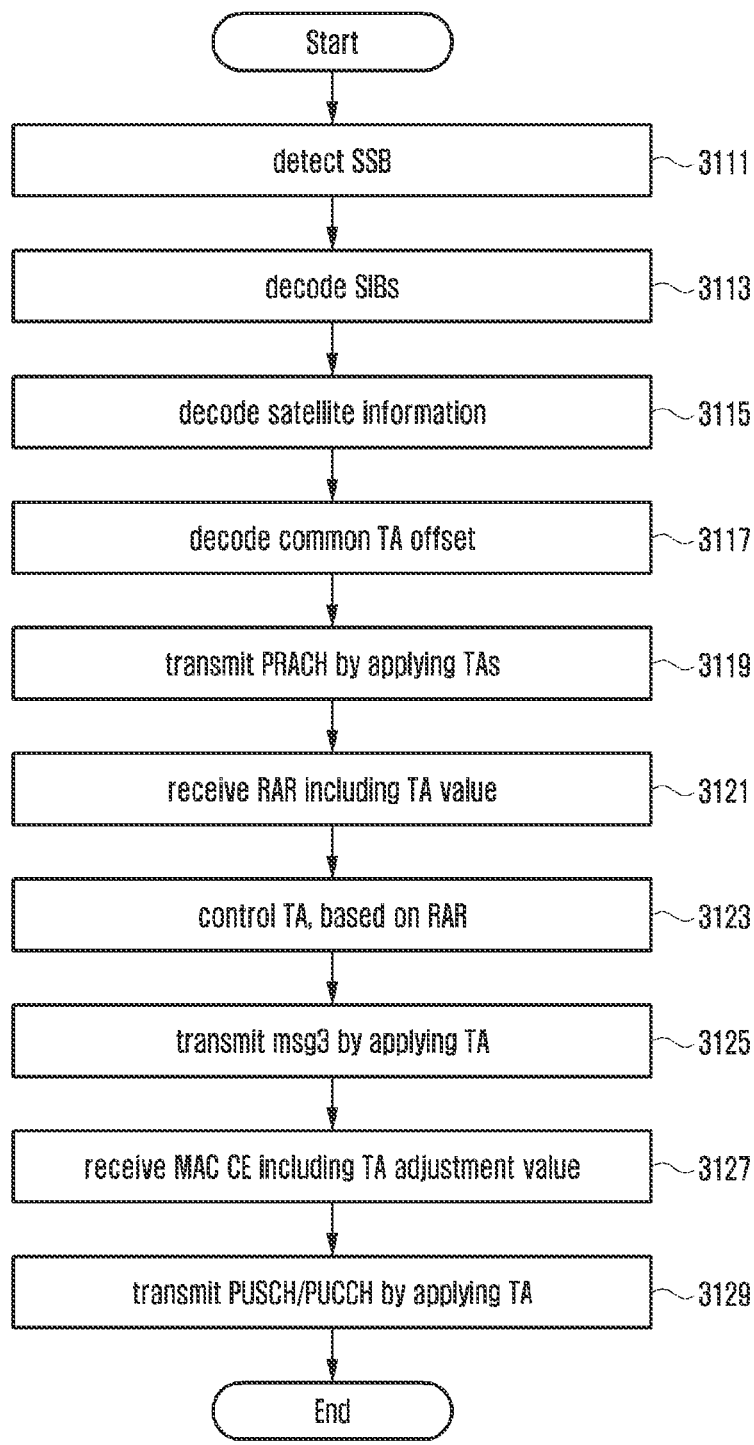
FIG. 31 illustrates an example of an initial access procedure of the UE according to an embodiment.

FIG. 31 schematically illustrates an example of an operation process of the UE in a communication system according to an embodiment.

Referring to FIG. 31, the UE may perform an initial access procedure according to a process described with reference to FIG. 31 and determine TA after performing the initial access procedure, which is described below in detail.

In step 3111, the UE detects a SS and PBCH block received from the BS. In operation 3113, the UE decodes system information blocks (SIBs) on the basis of the detected SSB. The UE may detect information on RACH resources by decoding the SIBs.

In step 3115, the UE acquires (or decodes) satellite information by decoding the SIBs. The satellite information may include at least one of various parameters such as location information of the satellite. In operation 3115, the UE may acquire a UE-specific TA correction value, for example, $N_{TA,UE\text{-}specific}$ on the basis of the locations (or reference location) of the UE and the satellite based on the acquired location information. In operation 3117, the UE acquires (or decodes) a common TA offset, for example, $N_{TA,common}$ by decoding the SIBs.

In step 3119, the UE may calculate TAs based on $N_{TA,UE\text{-}specific}$ and $N_{TA,common}$, and transmit a PRACH to the BS by applying the calculated TAs. In step 3121, the UE receives a RAR including a TA value in response to transmission of the PRACH. In step 3123, the UE adjusts TA on the basis of the received RAR.

In step 3125, the UE transmits msg3 to the BS by applying TA. Here, msg3 is a part of the random access procedure, and indicates a message which includes a C-RNTI MAC CE or a CCCH SDU and is transmitted in the UL-SCH, and may be first scheduled transmission of the random access procedure. In operation 3127, the UE receives a MAC CE including the TA adjustment value form the BS. In operation 3129, the UE applies TA on the basis of the TA adjustment value included in the MAC CE and transmits a PUSCH or/and a PUCCH.

The operations of the UE as described with reference to FIG. 31, that is, the process of performing the initial access procedure and determining TA after performing the initial access procedure may be compared to an operation process of the UE according to another embodiment and summarized as shown in Table 25, below.

TABLE 25

| UE operation process | UE operation process based on FIG. 31 |
|---|---|
| 1. Detects SSB | 1. Detects SSB |
| 2. Decodes SIBs (detect RACH resource information) | 2. Decodes SIBs (detect RACH resource information) |
| 3. Transmits PRACH | 3. Decodes satellite information (location information or the like) and acquires $N_{TA, UE\text{-}specific}$ |
| 4. Receives RAR including TA value | |
| 5. Adjusts TA on the basis of RAR | |
| 6. Transmits msg3 by applying TA | 4. Decodes common TA offset and acquires $N_{TA, common}$ |
| 7. Receive MAC CE including TA adjustment value | 5. Transmits PRACH by applying TAs |
| 8. Transmits PUSCH/PUCCH by applying TA on the basis of TA adjustment value | 6. Receives RAR including TA value |
| | 7. Adjusts TA on the basis of RAR |
| | 8. Transmits msg3 by applying TA |
| | 9. Receives MAC CE including TA adjustment value |
| | 10. Transmits PUSCH/PUCCH by applying TA |

Further, the order of some operations in the operation process of the UE described with reference to FIG. 31 may be changed, and for example, the order of the operation of decoding satellite information and the operation of decoding the common TA offset may be changed.

Although the operation process of the UE in the communication system according to various embodiments has been described with reference to FIG. 31, various modifications can be made for FIG. 31. For example, consecutive steps are illustrated in FIG. 31, but the steps of FIG. 31 may overlap each other or may be performed in parallel, the order thereof may be changed, or one or more steps may be performed several times.

Figure 32:
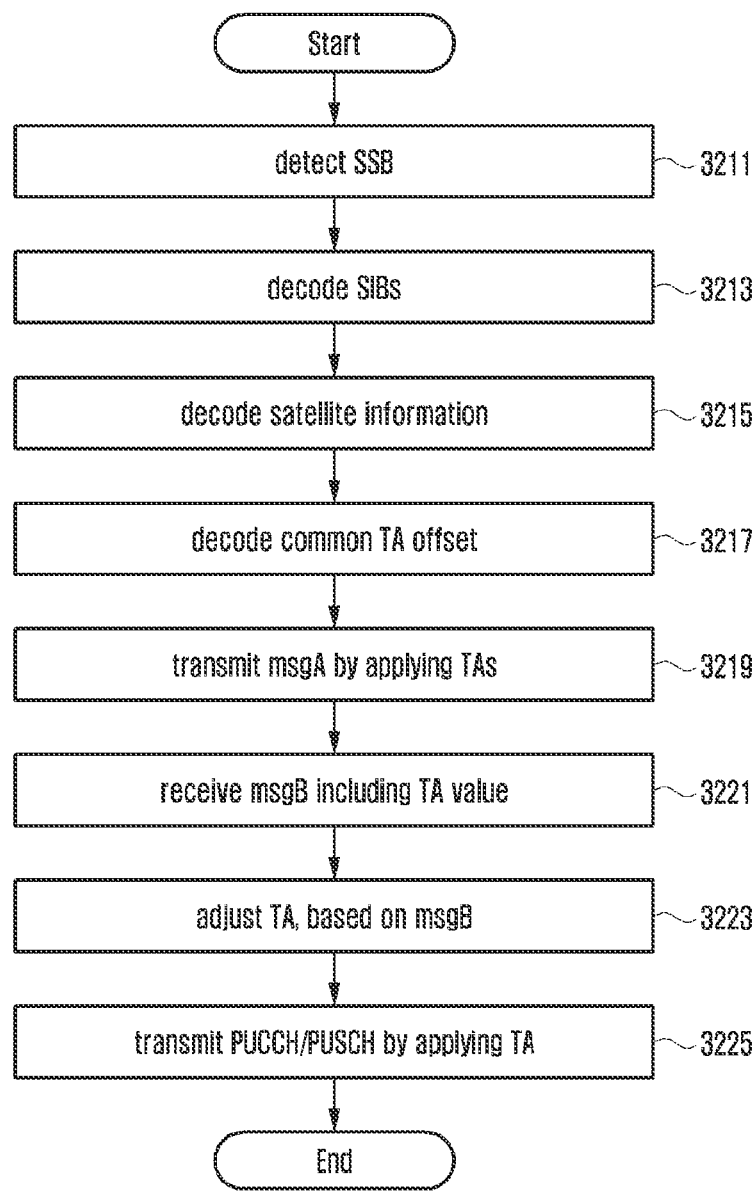
FIG. 32 illustrates another example of the initial access procedure of the UE according to an embodiment.

FIG. 32 illustrates another example of the operation process of the UE in the communication system according to an embodiment.

Referring to FIG. 32, the UE may perform an initial access procedure and determine TA after performing the initial access procedure, which is described below in detail. Particularly, FIG. 32 illustrates the operation process of the UE based on the random access procedure for a 4-step random access (RA) type, and the operation process of the UE illustrated in FIG. 32 may be an operation process of the UE based on a random access procedure for a 2-step RA type.

First, in step 3211, the UE detects an SSB received from the BS. In step 3213, the UE decodes SIBs on the basis of the detected SSB. The UE may acquire information on RACH resources by decoding the SIBs.

In step 3215, the UE acquires (or decodes) satellite information by decoding the SIBs. The satellite information may include at least one of various parameters such as location information of the satellite.

In step 3215, the UE may acquire a UE-specific TA correction value, for example, $N_{TA,UE\text{-}specific}$ on the basis of locations of the UE and the satellite (or reference location) based on the decoded satellite location. In step 3217, the UE acquires (or decodes) a common TA offset, for example, $N_{TA,common}$ by decoding the SIBs.

In step 3219, the UE calculates TAs on the basis of $N_{TA,UE\text{-}specific}$ and $N_{TA,common}$, and transmits msgA to the BS by applying the calculated TAs. Here, msgA may be transmission of a preamble and payload in the random access procedure for the 2-step random access (RA) type. In operation 3221, the UE receives msgB including a TA value from the BS. Here, msgB is a response to msgA in the random access procedure for the 2-step RA type and may include response(s) to contention resolution, fallback indication(s), and backoff indication. In step 3223, the UE adjusts TA on the basis of a TA adjustment value included in msgB. In step 3225, the UE transmits a PUSCH or/and PUCCH by applying the TA, The operations of the UE as described with reference to FIG. 32, that is, the process of performing the initial access procedure and determining TA after performing the initial access procedure may be compared to an operation process of the UE according to another embodiment and summarized as shown in Table 26, below.

TABLE 26

| UE operation process | UE operation process based on FIG. 32 |
|---|---|
| 1. Detects SSB | 1. Detects SSB |
| 2. Decodes SIBs (detect RACH resource information) | 2. Decodes SIBs (detect RACH resource information) |
| 3. Transmits MsgA (PRACH + Msg3) | 3. Decodes satellite information (location information or the like) and acquires $N_{TA, UE\text{-}specific}$ |
| 4. Receives MsgB including TA value | |
| 5. Adjusts TA on the basis of MsgB | |
| 6. Transmits PUCCH/PUSCH by applying TA | 4. Decodes common TA offset and acquires $N_{TA, common}$ |
| | 5. Transmits MsgA by applying TAs |
| | 6. Receives MsgB including TA value |
| | 7. Adjusts TA on the basis of MsgB |
| | 8. Transmits PUCCH/PUSCH by applying TA |

Further, the order of some operations of the UE described in FIG. 32 may be changed, and for example, the order of the operation of decoding satellite information and the operation of decoding the common TA offset may be changed.

Meanwhile, the operation process of the UE in the communication system according to various embodiments has been described with reference to FIG. 32, but various modifications can be made for FIG. 32. For example, consecutive steps are illustrated in FIG. 32, but the steps of FIG. 32 may overlap each other or may be performed in parallel, the order thereof may be changed, or one or more steps may be performed several times.

Meanwhile, $N_{TA,UE\text{-}specific}$ used in embodiments is a value calculated and applied by the UE. Accordingly, the BS may not know the value of $N_{TA,UE\text{-}specific}$ calculated by the UE. Further, the value of $N_{TA,UE\text{-}specific}$ calculated by the UE may change over time due to movement of the UE.

Accordingly, the BS may need to control TA of the UE in consideration of the value of $N_{TA,UE\text{-}specific}$ which may change over time, and thus the UE may need to configure a time point to update the value of $N_{TA,UE\text{-}specific}$. Therefore, the UE may update the value of $N_{TA,UE\text{-}specific}$ on the basis of one of the following methods, for example, method 1-1 to method 1-6 or a method of combining at least two of method 1-1 to method 1-6, as set forth below.

Method 1-1: the UE always updates $N_{TA,UE\text{-}specific}$ at every time point at which the SIB including satellite information (for example, including satellite information and the like) is received. Method 1-1 may be applied to the case in which the UE determines that the SIB is received from the BS or the case in which the UE determines that a paging signal indicating an SIB update is received from the BS.

Method 1-2: the BS may separately indicate a change rate of TA, for example, $N_{TA,UE\text{-}specific}$, and configure a period and an offset for calculating the TA value again according to the change rate of the TA, for example, updating the TA value. In this case, the UE may update the TA, for example, $N_{TA,UE\text{-}specific}$ at a time point determined according to the period and the offset, and an amount of the TA updated by the UE may be determined according to the change rate of the TA. In various embodiments, the BS may indicate the change rate of the TA on the basis of an explicit method or an implicit method.

Method 1-3: the BS may configure an update period and offset for updating $N_{TA,UE\text{-}specific}$ by the UE on the basis of the location of the satellite and the location of the UE. In this case, the UE may update the TA at the corresponding time point determined according to the update period and offset configured by the BS. In various embodiments, the BS may indicate the update period and offset on the basis of an explicit method or an implicit method.

Method 1-4: the UE may always update and apply $N_{TA,UE\text{-}specific}$ at a corresponding time point, for example, at a corresponding slot time point in every case of at least some cases in which uplink transmission (for example, PUCCH/PUSCH, PRACH, and SRS transmission) is performed (in every performance case, according to a regular period, and at an irregular performance time point).

Method 1-5: the UE updates $N_{TA,UE\text{-}specific}$ on the basis of a time point at which a TA command transmitted by the BS through a MAC CE expires. For example, the UE updates $N_{TA,UE\text{-}specific}$ at the time point at which TA expires. The expiration may mean that a time value reaches a specific time point on the basis of a timer for the TA command. The timer may be configured as timeAlignmentTimer and may be a parameter indicating how long the uplink time is synchronized. When receiving a new TA command, the UE may start or restart timeAlignmentTimer. When timeAlignmentTimer expires, the UE may empty an HARQ buffer and newly make an RRC configuration.

Method 1-6: anew timer timeAlignmentTimer_UEspecific related to $N_{TA,UE\text{-}specific}$ has been introduced, and the UE may update $N_{TA,UE\text{-}specific}$ on the basis of the new timer timeAlignmentTimer_UEspecific. The timeAlignmentTimer_UEspecific may start or restart when the UE newly calculate $N_{TA,UE\text{-}specific}$ or information on $N_{TA,UE\text{-}specific}$ is transmitted to the BS. When the timeAlignmentTimer_UEspecific expires, the UE may newly calculate $N_{TA,UE\text{-}specific}$ to update the same, configure $N_{TA,UE\text{-}specific}$ as 0, or perform PRACH transmission.

Second Embodiment

The second embodiment provides a method and an apparatus for transmitting (reporting) a TA value which the UE is applying or has applied to the BS or the satellite. In the disclosure, the satellite may be an object located high above the ground and may correspond to an aircraft, an airship, or the like.

The UE may perform an operation of transmitting the TA value which the UE is applying to the BS. The operation informs the BS of the applied TA value when the UE applies the TA value without any separate indication from the BS or to identify or determine how the UE applies the TA value indicated by the BS. For example, the operation may be performed to identify, when the satellite connected to the UE is changed, the TA value of the UE by the satellite connected to the UE. For example, the UE may apply the TA calculated on the basis of the locations of the UE and the satellite by itself.

The UE may use one or a combination of at least two of the following methods in order to report the TA value to the BS.

Method 2-1: the BS may trigger a TA value report of the UE through DCI. The BS may trigger the TA value report through some bit field values of DCI or a combination of the bit field values. When a field indicating triggering of the TA value report is included in DCI and the field of the received DCI is configured as a specific value, the UE may understand that the TA value report is triggered. Alternatively, when values of one or more fields (e.g., for another purpose) included in DCI are configured as predetermined values, the UE may understand that the TA value report is triggered. The UE may transmit the TA value at a specific time point based on the time point at which DCI is received to the BS.

Method 2-2: the BS may trigger a TA value report of the UE through a MAC CE. The BS may trigger the TA value report by using some bit values of the MAC CE or a value of a bit field, and the UE may transmit a TA value at a time point at which the MAC CE is received or a time point after a predetermined time from the time point at which the MAC CE is received to the BS.

Method 2-3: the BS may indicate which TA value should be reported by the UE through an RRC configuration. For example, the BS may configure a period and an offset value for the TA report or/and a specific condition for reporting the TA value by the UE and determine when the UE reports the TA value, in which case a TA value application time which is a reference (that is, a time at which the TA value to be reported is applied, which may be referred to as a TA value reference time point) may be designated. The specific condition for reporting the TA value by the UE may be, for example, the case in which the TA value is larger than or equal to a predetermined value or the case in which the distance between the UE and the satellite is longer than or equal to a predetermined value, and the predetermined values may be information configured through higher signaling or transmitted through the SIB or the like or fixed values.

Method 2-4: the UE may report the TA value without a separate trigger from the BS. For example, method 4 may correspond to transmission of information indicating the TA value according to the specific condition from the UE to the BS, and the specific condition (without signaling such as DCI, MAC CE, or RRC for triggering from the BS) is a condition for a time at which the TA value report is performed or a comparison result between the TA value applied by the UE and a specific threshold value and may be predetermined.

When the TA value is transmitted as described above, the UE may transmit the same through a physical channel such as a PUCCH or a PUSCH, or may transmit TA value information to the BS through higher signaling. When the UE transmits TA value information through the physical channel, resources to be used for reporting the TA value information may be configured through higher signaling.

The TA value report may mean that a value of $T_{TA}$ or a value of $N_{TA,UE-specific}$ in the equation is reported. Alternatively, which one of $T_{TA}$ and $N_{TA,UE-specific}$ is reported may be configured in the UE by the BS through the SIB or higher signaling.

The reference time point at which TA value reported by the UE is determined and the time point at which the TA value is reported may be determined on the basis of a time point at which the UE performs the TA value report and a time point at which the TA value report is triggered. For example, when the TA value report is triggered in slot n through DCI, the UE may report a TA value applied or calculated in slot n-K or may report the TA value to the BS in slot n+N. K and N may be SCS, or may be values determined according to a UE capability, a DL/UL configuration of the slot, and a PUCCH resource configuration.

K may be 0. K=0 may mean that the TA value is reported on the basis of a time point at which a TA value report triggering signal is received. Further, K may be smaller than 0 in which case, for example, the TA value at the time point at which the UE reports the TA value may be pre-calculated, and report information may be generated and reported. In addition, K may be an integer larger than 0. This may mean that the UE reports the TA value at a time point earlier than the time point at which the UE reports the TA value (for example, slot n+N). The TA value at the earlier time point may be reported since a time is needed to encode information to be reported by the UE and prepare transmission.

Figure 33:
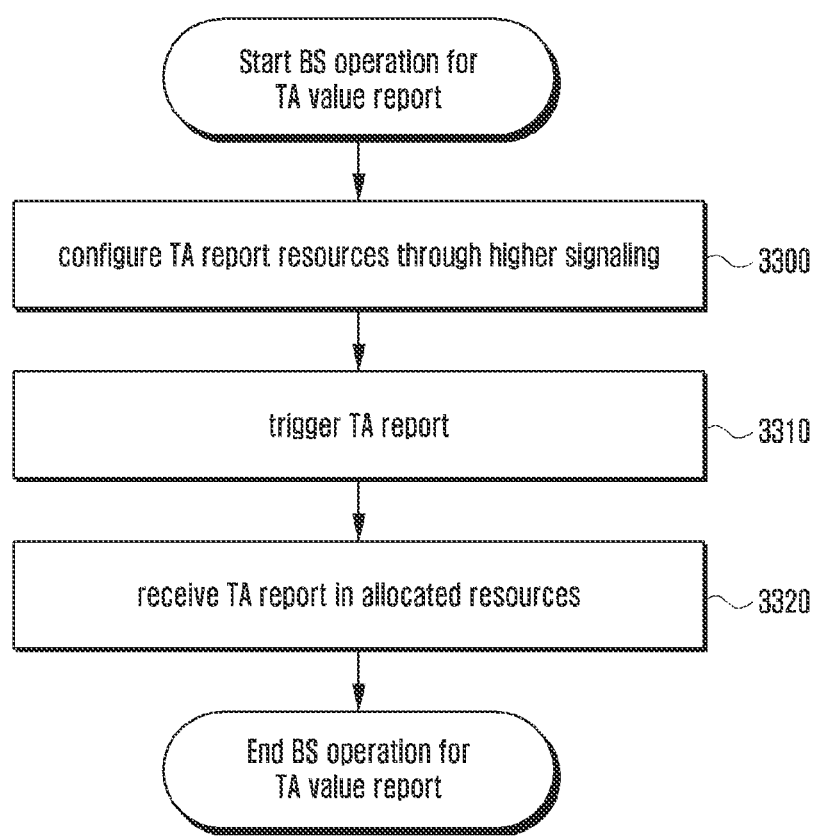
FIG. 33 illustrates operations of the of the BS and the UE for a TA value report of the UE.
Figure 34:
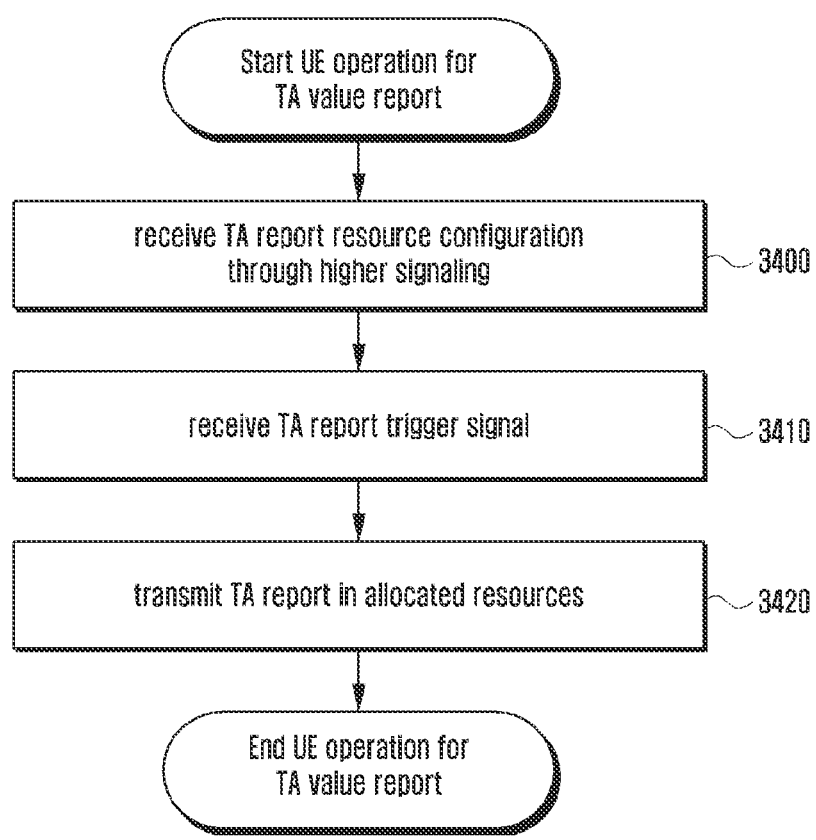
FIG. 34 illustrates an operation of the BS and the UE for a TA value report of the UE.

FIG. 33 illustrates operations of the BS and the UE for the TA value report of the UE, and FIG. 34 illustrates operations of the BS and the UE for the TA value report of the UE. In the TA value report according to the disclosure, the TA value applied by the UE may be indicated in units of ms, slots, or symbols, or may be provided as information including a value having decimal places other than an integer. The TA value report may include an absolute value of the TA, but may include a TA value previously indicated by the BS, a relative TA value except for a predetermined TA value, or a change in the TA value (for example, a TA change for a predetermined time).

FIG. 33 illustrates the operation of the BS.

Referring to FIG. 33, the BS transmits configuration information related to a TA report through higher signaling in step 3300. The configuration information may include, for example, at least one piece of information for configuring the TA report such as a period and offset for performing the TA report, a TA report trigger condition, TA value reference time point information, a type of TA information to be reported, and resource configuration information for performing the TA report. The BS triggers the TA report to the UE in step 3310. The trigger may be performed through, for example, higher signaling or DCI having the above-described specific content or may be omitted. The BS receives the TA report transmitted by the UE according to transmitted configuration information in step 3320.

FIG. 34 illustrates the operation of the UE.

Referring to FIG. 34, the UE receives configuration information related to the TA report transmitted by the BS through higher signaling in step 3400. The configuration information may include, for example, at least one piece of information for configuring the TA report such as a period and offset for performing the TA report, a TA report trigger condition, TA value reference time point information, a type of TA information to be reported, and resource configuration information for performing the TA report. The UE receives a signal for triggering the TA report transmitted by the BS in step 3410. The trigger may be performed through, for example, higher signaling or DCI having the above-described specific content or may be omitted. The UE transmits the TA report according to the received configuration information in operation 3420. For example, when receiving TA report resource information, the UE transmits the TA report in the configuration resources. The order of respective operations disclosed in FIGS. 33 and 34 may be changed and applied, or another operation may be added or omitted.

Third Embodiment

The third embodiment provides a method by which the UE calculates, determines, and reports $N_{TA,UE-specific}$ described through the first embodiment and the second embodiment. A value of $N_{TA,UE-specific}$ may be calculated on the basis of the distance between the UE and a NTN satellite. The UE may calculate its own location by receiving signals from navigation satellites in a satellite navigation system, and the navigation satellite may be different from the NTN satellite.

The UE may estimate a delay time between the satellite and the UE on the basis of the location of the UE and the location of the satellite, and correct the estimated delay time value by itself to perform uplink transmission. For example, the satellite may transmit information on the location of the satellite through broadcast information, and the UE may receive the information on the location of the satellite transmitted by the satellite and compare the information on the location with its own location. The location of the UE may be known using one of various types of global positioning systems (GPSs) or independently using information from the BS or a combination thereof. The UE may calculate an uplink transmission time by estimating a time spent for transmitting radio waves through the comparison.

For example, when the UE receives a signal in slot n at a specific time point through the downlink and performs uplink transmission corresponding to the signal in slot n+k, the uplink transmission may be transmitted earlier than the time point of slot n+k by 2*Td. Td may be a delay time from the UE to the satellite, calculated on the basis of location information of the satellite and the UE or may be a value corresponding thereto. The delay time Td may be a value obtained by dividing the distance between the UE and the satellite or a value corresponding thereto by the velocity of light or a value corresponding thereto. For example, the location of the satellite may be a value calculated on the basis of slot n+k in which the UE performs uplink transmission. This is because the location of the satellite in slot n and the location of the satellite in slot n+k may be different depending on movement of the satellite.

A propagation delay time equal to or shorter than 1 ms may be generated in the ground network in consideration of the distance to the BS within a maximum of about 100 km, but the distance to the satellite may be thousands of km and the distance between the satellite and the BS may also be thousands of km in the satellite network and thus a delay time in the satellite network may be significantly longer than the ground network.

Figure 35:
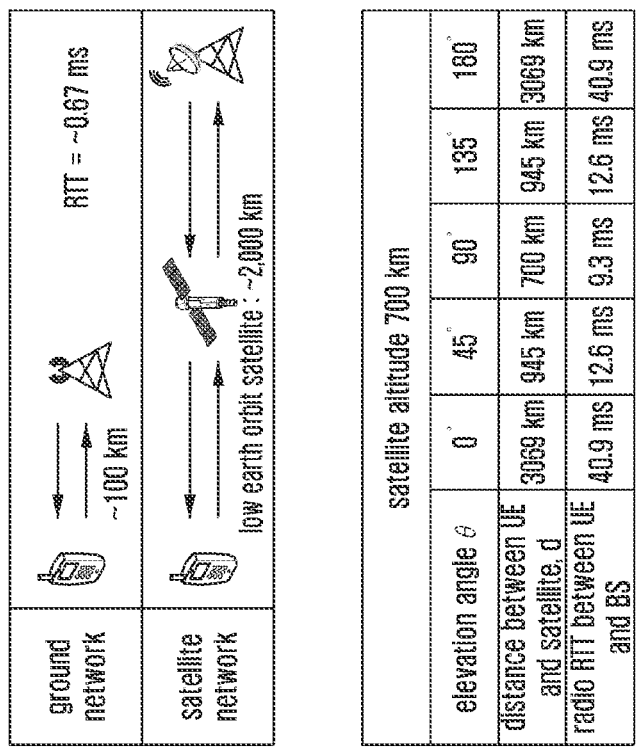
FIG. 35 illustrates difference in propagation delay time between a ground network and a satellite network.
Figure 35:
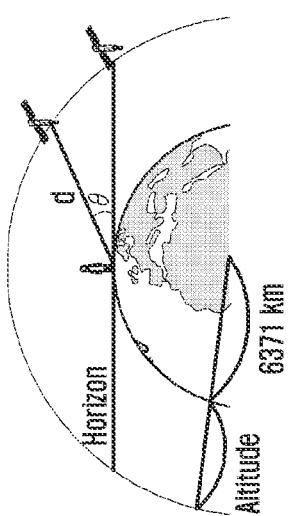

FIG. 35 illustrates difference in the propagation delay time between the ground network and the satellite network.

The delay time may vary depending on altitude and an elevation angle of the satellite in satellite network communication, and FIG. 35 illustrates the distance between the UE and the satellite and a propagation round trip time according to the an elevation angle when altitude of the satellite is 700 km. In the case of the satellite network, a low earth orbit satellite is assumed, and a radio round trip time (radio RTT) (including a round trip time spent for transmission of a signal between a transmitter and a receiver and a processing time in a counterpart node) may be from 40.9 ms to 9.3 ms when an elevation angle is from 0 to 180 degrees. The delay time is only an example but may vary depending on altitude and orbit of the satellite, and, for example, the delay time may further increase averagely as altitude is higher.

In the ground network, since a maximum delay time is within 1 or 2 ms, it is possible to match slot timing at which the BS performs downlink transmission and slot timing at which the BS performs uplink reception through timing advance provided in the LTE and 5G NT systems, particularly when the indexes of the DL slot and the UL slot are the same. That is, when the UE advances uplink transmission by a value of timing advance indicated by the BS from the downlink time point, a time point at which an uplink signal transmitted by the UE is received by the BS may become the same as the downlink time point of the BS. On the other hand, it is impossible to match slot timing at which the BS performs downlink transmission and slot timing at which the BS performs uplink reception through timing advance provided in the conventional LTE and 5G NR systems. This is because the propagation delay time generated in the satellite network is large corresponding to scores of ms and thus is larger than a maximum value of timing advance provided in the conventional LTE and 5G NR systems.

A satellite navigation system may also be called a global navigation satellite system (GNSS), and the GNSS may include, e.g., a GPS in the US, a GLONASS in Russia, Galileo in EU, Beidou in China, and the like. The GNSS may include a regional navigation satellite system (RNSS), and the RNSS may include, for example, IRNSS in India, QZSS in Japan, KPS in Korea, and the like. Meanwhile, a signal transmitted by the GNSS may include at least one of supplementary navigation information, a normal operation state of a satellite, a satellite time, satellite orbital power, a satellite altitude, a reference time, and information on various compensation documents.

The NTN satellite may be a communication satellite serving to transmit a signal for the connection between the UE and the BS. Further, the GNSS satellite may be a satellite for transmitting a signal of the satellite navigation system. Meanwhile, the UE may receive a signal from each of one or more GNSS satellites, calculate the location of the UE itself on the basis of the signal received from each of the one or more GNSS satellites, and identify a reference time in each of the one or more GNSS satellites. When the UE may calculate a plurality of locations of the UE on the basis of the signals received from a plurality of GNSS satellites, the UE may calculate the real location of the UE on the basis of an average of the plurality of locations, a location corresponding to a received signal having the highest strength among the plurality of locations, an average value of the plurality of locations based on a signal strength (for example, a method of applying a weighted value in the location corresponding to the signal having the highest signal strength), or the like. A scheme in which the UE calculates the location of the UE on the basis of the signals received from the plurality of GNSS satellites may be implemented in various forms, and a detailed description thereof is omitted.

A time acquired from the GNSS or a time of the BS transmitted by the BS may be, for example, based on a coordinated universal time (UTC), which is based on a time since 00:00:00 on Jan. 1, 1900 of the Gregorian calendar. This may vary depending on a type of the GNSS system, and the reference time as shown in Table 27, below may be used.

TABLE 27 gnss-DayNumber
This field specifies the sequential number of days (with day count starting at 0) from the origin of the
GNSS System Time as follows:
GPS, QZSS, SBAS—Days from Jan. 6, 1980 00:00:00 UTC (USNO);
Galileo—Days from Galileo System Time (GST) start epoch, defined as 13 seconds before midnight
between 21 August and
Aug. 22, 1999; i.e., GST was equal to 13 seconds at Aug. 22, 1999 00:00:00 UTC;
GLONASS—Days from Dec. 31, 1995 21:00:00 UTC (SU), which is local UTC Moscow
Jan. 1, 1996 00:00:00, defined as UTC(SU)
+ 3 hours in [9];
BDS—Days from Jan. 1, 2006 00:00:00 UTC (NTSC).
NavIC—Days from NavIC System Time start epoch,, defined as 13 seconds before midnight between
21 August and Aug. 22, 1999; i.e., NavIC System Time was equal to 00:00:00 at Aug. 21, 1999 23:55:47 UTC (BIPM).

In Table 27, above, NavIC may be NAVigation with Indian Constellation, QZS may be Quasi Zenith Satellite, QZSS may be Quasi-Zenith Satellite System, QZST may be Quasi-Zenith System Time, SBAS may be Space Based Augmentation System, and BDS may be BeiDou Navigation Satellite System.

Further, the BS may indicate a type of the GNSS system which is a reference of the location or time information used by the BS itself through the satellite, and, for example, indications as shown in Table 28, below may be used.

TABLE 28

| Value of gnss-TO-ID | Indication |
|---|---|
| 1 | GPS |
| 2 | Galileo |
| 3 | QZSS |
| 4 | GLONASS |
| 5 | BDS |
| 6 | NavIC |
| 7-15 | reserved |

As described above, the UE may calculate a time spent while the signal is transmitted from an NTN satellite to the UE on the basis of the location of the UE calculated by the UE and the location of the NTN satellite received from the NTN satellite and determine a TA value on the basis thereof. If a distance from the NTN satellite to the BS on the ground or the corresponding signal is transmitted to the BS on the ground via another NTN satellite when the UE determines the TA value, the UE may also consider the distance from the NTN satellite to another NTN satellite.

Alternatively, the UE may acquire reference time information from information transmitted by the GNSS satellite, compare time information transmitted by the NTN satellite with reference time information acquired from the GNSS satellite, and calculate a time (propagation delay) from the NTN satellite to the UE on the basis of the comparison result.

The location and time information of the NTN satellite may be transmitted by the BS to the UE through the SIB. The location and time information may be directly transmitted by the NTN satellite.

When the distance between the UE and the satellite or a value corresponding thereto is $d_{UE,sat}$ (the unit is km) and the velocity of light is $v_c$ (the unit is km/sec), $N_{TA,UE-specific}$ may be determined on the basis of $$\frac{d_{UE,sat}}{v_c}$$

(the unit is sec). For example, $$N_{TA,UE-specific} = \left\lfloor \frac{d_{UE,sat}}{v_c} \cdot \frac{1}{T_c} \right\rfloor$$

may be determined and applied, which is a method of determining $N_{TA,UE-specific}$ by making a value of $$\frac{d_{UE,sat}}{v_c} \cdot \frac{1}{T_c}$$

an integer. Alternatively/in addition, the UE may determine $N_{TA,UE-specific}$ through a method corresponding to a combination of at least one of methods 3 and report information on $N_{TA,UE-specific}$ to the BS.

Method 3-1: $N_{TA,UE-specific}=(D+a)/T_c$, D is an integer, and a is a decimal larger than or equal to 0 and smaller than 1. Here, $$D = \left\lfloor \frac{d_{UE,sat}}{v_c} \right\rfloor \text{ and } a = \frac{d_{UE,sat}}{v_c} - \left\lfloor \frac{d_{UE,sat}}{v_c} \right\rfloor.$$

That is, the method may separate a propagation delay between the UE and the satellite into an integer and a decimal part and reporting only the integer or a value corresponding thereto or separately reporting the integer or the decimal or values corresponding thereto. Through the method, it is possible to reduce the number of bits used for reporting the propagation delay. Although it has been described above that the decimal part becomes an integer multiple of $T_c$, the decimal part may be determined to be a multiple of $16 \cdot 64 \cdot T_c/2^\mu$. $\mu$ may be a current carrier, a BWP, or SCS of a relevant CORESET. Alternatively, $\mu$ may be a value used for a transmitted/received signal such as a transmitted/received PDSCH or PUSCH. $\mu=0, 1, 2, 3, 4, 5$ may be values corresponding to SCS 15 kHz, 30 kHz, 60 kHz, 120 kHz, 240 kHz, and 480 kHz, respectively. Alternatively, $\mu$ may be configured by the BS to determine $N_{TA,UE-specific}$ through higher signaling. Alternatively, a fixed value may be used for $\mu$, and for example, one of 0, 1, 2, 3, 4, 5 may be fixedly used as $\mu=5$.

Method 3-2: $N_{TA,UE-specific}$ may be determined to be a multiple of $16 \cdot 64/2^\mu$. $N_{TA,UE-specific}$ may be determined as $$N_{TA,UE-specific} = \left\lfloor \frac{d_{UE,sat}}{v_c} \cdot \frac{1}{16 \cdot 64 \cdot T_c/2^\mu} \right\rfloor \cdot 16 \cdot 64/2^\mu.$$

In the disclosure, $\lfloor x \rfloor$ may be a maximum integer which is not larger than x and may round the number down at the integer unit, that is, drop the decimal value. In the disclosure, instead of round off using $\lfloor x \rfloor$, round up or round off from the decimal point may be used. $\mu$ may be a current carrier, a BWP, an SIB, or SCS of a relevant CORESET. Alternatively, $\mu$ may be a value used for a transmitted/received signal such as a transmitted/received PDSCH or PUSCH. $\mu=0, 1, 2, 3, 4, 5$ may be values corresponding to SCS 15 kHz, 30 kHz, 60 kHz, 120 kHz, 240 kHz, and 480 kHz, respectively. Alternatively, $\mu$ may be configured by the BS to determine $N_{TA,UE-specific}$ through higher signaling. Alternatively, a fixed value may be used for $\mu$, and for example, $\mu=5$ may be fixedly used. Alternatively, $\mu$ to be used for calculating $N_{TA,UE-specific}$ may be separately configured through the SIB or higher signaling.

Method 3-3: $N_{TA,UE-specific}=T_{TA,UE-specific} \cdot 16 \cdot 64/2^\mu$, and $N_{TA,UE-specific}$ may be determined as an integer which makes $N_{TA,UE-specific}$ the nearest to $$\frac{d_{UE,sat}}{v_c \cdot T_c}.$$

Alternatively, a minimum integer which makes $$N_{TA,UE-specific} \geq \frac{d_{UE,sat}}{v_c \cdot T_c}$$

satisfied may be determined or a maximum integer which makes $$N_{TA,UE-specific} \leq \frac{d_{UE,sat}}{v_c \cdot T_c}$$

satisfied.

Method 3-4: $N_{TA,UE-specific}=0$ may be configured according to a BS configuration. This is because UEs within the coverage in a specific beam of the satellite have little difference in propagation delays generated in a link, i.e., a service link, between the UEs and the satellite and thus uplink time synchronization can be performed by the conventional TA mechanism and $N_{TA,common}$. The BS may configure, through the SIB, whether the UE configures the value of $N_{TA,UE-specific}$ as $N_{TA,UE-specific}=0$ or the UE uses the value of $N_{TA,UE-specific}$ calculated on the basis of the locations of the satellite and the UE and the velocity of light according to a GNSS signal. In another example, the BS may configure, through the SIB or separate RRC signaling, whether the UE continuously uses the value of $N_{TA,UE-specific}$ calculated based on a time point at which a PRACH preamble is transmitted on the basis of the locations of the satellite and the UE and the velocity of light according to the GNSS signal until there is a separate indication or configuration or uses a newly calculated value of $N_{TA,UE-specific}$ at every uplink transmission time point. That is, the value of $N_{TA,UE-specific}$ may be determined as described below in Table 5, above.

$N_{TA,UE-specific}$ is UE self-estimated TA to pre-compensate for the service link delay if configured, and $N_{TA,UE-specific}$ is 0 otherwise.

In method 3-1 to method 3-4, the methods of determining $N_{TA,UE-specific}$ on the basis of the distance between the UE and the satellite (or a value corresponding thereto) and the velocity of light are only examples, and there are more various methods. For example, when the value of $N_{TA,UE-specific}$ is defined as an integer or an expression based on an integer is defined, $$\left\lfloor \frac{d_{UE,sat}}{v_c} \cdot \frac{1}{T_c} \cdot \frac{1}{K} \right\rfloor \cdot K \text{ or } D = \left\lfloor \frac{d_{UE,sat}}{v_c} \cdot \frac{1}{K} \right\rfloor \cdot K$$

may be generally expressed to indicate the value of $N_{TA,UE-specific}$ as a multiple of a specific integer or rational number K. K may be a predetermined value or a value determined by signaling parameters. Method 2 corresponds to the case of $K=16\cdot64/2^\mu$, and K may be determined according to at least one of the system parameters $\mu$ and $T_c$. Such a method has an advantage of expressing more various values through the same bit signaling instead of having a characteristic of sparse granularity of values of $N_{TA,UE-specific}$. Further, in each of the methods, the values may be determined on the basis of round up ($\lceil x \rceil$) or round off Round(x) operations from the decimal place instead of using the round down operation such as $\lfloor x \rfloor$.

Fourth Embodiment

The fourth embodiment provides a method by which the BS transmits $N_{TA\ common}$ described through the first embodiment and the second embodiment to the UE and the UE performs calculations and application.

Hereinafter, methods by which the BS configures and indicates $N_{TA\ common}$ information to transmit the same to the UE are described, and one or more of the methods may be combined and applied.

Method 4-1: the BS may configure one offset value in the UE through RRC signaling. The configured value is $T_{A\ common}$ and $N_{TA\ common}$ may be determined on the basis thereof.

Method 4-2: the BS may indicate one offset value to the UE through a MAC CE. The configured value is $T_{A\ common}$ and $N_{TA\ common}$ may be determined on the basis thereof. The method has an advantage compared to method 4-1 in that the BS and the UE can clearly know time points at which the BS and the UE apply $N_{TA,common}$. For example, $N_{TA,common}$ may be applied after a predetermined time from the time point at which the MAC CE is received or the time point at which ACK is transmitted in response to reception of the MAC CE. For example, the BS may transmit $T_{A\ common}$ in unit of msec through a 8-bit MAC CE and indicate 0 ms to 255 ms. At this time, $N_{TA\ common}$ is determined as $N_{TA,common}=T_{A,common}/(1000\cdot T_c)$.

Method 4-3: the BS may configure one or more offset values in the UE through higher-layer signaling. Alternatively, the values may be pre-configured. The configured values may become candidate values of $T_{A\ common}$, and the BS may indicate one thereof through a MAC CE.

Method 4-4: the BS may configure one offset value in the UE through an SIB. The configured value is $T_{A\ common}$ and $N_{TA\ common}$ may be determined on the basis thereof. The UE calculates and applies TA by using the value to transmit a PRACH preamble in an initial access process. Thereafter, $\Delta T_{A,common}$ may be indicated to the UE through a MAC CE, the UE may calculate an amount of the change in $N_{TA\ common}$ by using the same, and $N_{TA,common(new)}=N_{TA,common(old)}+(\Delta T_{A,common}-x)\cdot y$. x and y may be determined according to the number of bits and the unit for transmission of $\Delta T_{A,common}$. For example, $N_{TA,common(new)}=N_{TA,common(old)}+(\Delta T_{A,common}-M)\cdot 16\cdot 64/2^\mu$. Here, a value of M may be 31, or may be a value larger than or equal to 31 when a maximum value of $\Delta T_{A,common}$ which can be indicated through the MAC CE is larger than 63 and may be a value equal to or smaller than 31 when the maximum value of $\Delta T_{A,common}$ is smaller than 63.

Method 4-5: the BS may indicate one offset value to the UE through a MAC CE. The configured value is $T_{A\ common}$, and $N_{TA\ common}$ may be determined on the basis thereof. The method has an advantage compared to method 4-1 in that time points at which the BS and the UE apply $N_{TA\ common}$ can be clearly known. For example, $N_{TA,common}$ may be applied after a predetermined time from the time point at which the MAC CE is received or the time point at which ACK is transmitted in response to reception of the MAC CE. For example, the BS may transmit $T_{A\ common}$ in units of $16\cdot 64\cdot T_c/2^\mu$ sec through a MAC CE of about 19 bits or 24 bits. At this time, $N_{TA\ common}$ is determined as $N_{TA,common}=T_{A,common}\cdot 16\cdot 64/2^\mu$. The number of bits may be another value as well as the example.

Method 4-6: the BS may indicate one offset value to the UE through a MAC CE. The configured value is $T_{A\ common}$, and $N_{TA\ common}$ may be determined on the basis of $T_{A\ common}$ and an altitude of the satellite. The method has an advantage compared to method 4-5 in that the number of transmitted bits can be reduced. For example, the BS may transmit $T_{A\ common}$ in units of $16\cdot 64\cdot T_c/2^\mu$ sec through a MAC CE of about 16 bits. At this time, $N_{TA\ common}$ is determined utilizing Equation 11:

$$N_{TA,common} = \frac{h_{sat}}{v_c} \cdot \frac{1}{T_c} + T_{A,common} \cdot 16 \cdot 64/2^\mu. \tag{11}$$

In Equation 11, $h_{sat}$ is an altitude of the satellite. This may mean, when the satellite is a specific altitude, the minimum distance between the UE and the satellite is the specific altitude and thus the BS signals only the remaining additional distance through $T_{A\ common}$. The number of bits of the MAC CE may be another value as well as the example.

In Equation 11, a value of $$\frac{h_{sat}}{v_c} \cdot \frac{1}{T_c}$$

may be defined to be an integer or a rational number through a method similar to the third embodiment. For example, various integer or rational number schemes can be applied on the basis of a value of $h_{sat}$ rather than a value of $d_{UE,sat}$ in the third embodiment as well as the integer or rational number using the round down operation such as $$\left\lfloor \frac{h_{sat}}{v_c} \cdot \frac{1}{T_c} \right\rfloor, \left\lfloor \frac{h_{sat}}{v_c} \cdot \frac{1}{T_c} \cdot \frac{1}{K} \right\rfloor \cdot K, \text{ or } \left\lfloor \frac{h_{sat}}{v_c} \cdot \frac{1}{K} \right\rfloor \cdot K.$$

Of course, an integer scheme or a rational number scheme similar to the above description may be applied to a total value of $$\frac{h_{sat}}{v_c} \cdot \frac{1}{T_c} + T_{A,common} \cdot 16 \cdot 64/2^\mu$$

For example, $$N_{TA,common} = \left\{ \left\lfloor \frac{h_{sat}}{v_c} \cdot \frac{1}{T_c \cdot 16 \cdot 64/2^\mu} \right\rfloor + T_{A,common} \right\} \cdot 16 \cdot 64/2^\mu,$$

in which case the same scheme is applied as $K=16 \cdot 64/2^\mu$ in $$\left\lfloor \frac{h_{sat}}{v_c} \cdot \frac{1}{T_c} \cdot \frac{1}{K} \right\rfloor \cdot K.$$

Further, for the operation used for the integer scheme or the rational number scheme, various other operations such as round up and round off as well as round down may be applied.

Method 4-7: the BS may transmit the value of $N_{TA\ common}$ at the time point at which $N_{TA\ common}$ is received through the SIB and information on a rate of the change in $N_{TA\ common}$. The information may be transmitted to a specific UE through RRC signaling rather than the SIB, and the transmission method may vary depending on a state of the UE (RRC_idle, RRC_inactive, or RRC_connected).

The information on the rate of the change in $N_{TA\ common}$ may be transmitted through one, two, or three parameters by the SIB. For example, when the information on the change is transmitted through one parameter A, a time point at which $N_{TA\ common}$ is transmitted through the SIB is t1, and a time point at which uplink transmission is performed is t2, $N_{TA,common(t2)}$ which is $N_{TA\ common}$ to be applied by the UE at t2 may be calculated as $N_{TA,common(t2)}=N_{TA,common(t1)}+(t2-t1) \cdot A$. At this time, units of t1 and t2 may be msec, and the unit of A may be Tc/msec. That is, A may indicate how much $N_{TA\ common}$ has changed as many as the number of Tc per 1 msec. In another example, when the information on the rate of the change is transmitted through two parameters A and B, the time point at which $N_{TA\ common}$ is transmitted through the SIB is t1, and the time point at which uplink transmission is performed is t2, $N_{TA,common(t2)}$ which is $N_{TA\ common}$ to be applied by the UE at t2 may be calculated as $N_{TA,common(t2)}=N_{TA,common(t1)}+(t2-t1)^2 \cdot B+(t2-t1) \cdot A$ (when the information on the rate of the change is transmitted through n parameters, $N_{TA,common(t2)}$ can be expressed in the form of an $n^{th}$-degree polynomial with respect to difference (t2-t1) between the two time points). At this time, units of t1 and t2 may be msec, the unit of A may be Tc/msec, and the unit of B may be Tc/msec$^2$. That is, A may indicate how much $N_{TA\ common}$ has changed as many as the number of Tc per 1 msec, and B may indicate how the rate of the change in $N_{TA\ common}$ has changed, based on the number of Tc per 1 msec.

Fifth Embodiment

The fifth embodiment provides a method and an apparatus in which the BS transmits $K_{offset}$ which is a parameter for determining timing at which the UE transmits a second signal in response to the first signal transmitted by the BS to the UE.

The BS transmits the first signal and indicates a time point at which the UE transmits the second signal corresponding thereto through higher signaling and DCI. For example, the BS transmits a PDSCH and indicates HARQ-ACK feedback therefor by an HARQ-ACK timing-related indicator of bit fields of the DCI scheduling the PDSCH. However, in satellite communication, a delay time between the UE and the BS is very long, and thus the offset value indicated by the conventional DCI cannot indicate correct timing. Accordingly, the BS may transmit $K_{offset}$ which is an additional timing offset to the UE through the SIB, and the UE may determine transmission timing of the second signal (uplink transmission) by adding the offset $K_{offset}$.

The BS may update the $K_{offset}$ value to the UE through RRC signaling in an RRC_connected state after initial access of the UE. However, when the uplink is performed only through RRC signaling, the BS and the UE may have different values of $K_{offset}$ during a time interval in which an RRC reconfiguration is performed. In this case, the second signal may not be correctly transmitted and received. In order to remove such an ambiguity time interval, the BS may configure a plurality of values of $K_{offset}$ in the UE and indicate one of the configured values of $K_{offset}$ through a MAC CE. Accordingly, the UE may apply the updated $K_{offset}$ value from a determined time point after the MAC CE is received.

For example, candidate values of $K_{offset}$ may be configured according to indexes shown in Table 29, below through RRC signaling.

TABLE 29

| index | K_offset |
|---|---|
| 0 | 100 |
| 1 | 120 |
| 2 | 140 |
| 3 | 160 |
| 4 | 180 |
| 5 | 200 |
| 6 | 220 |
| 7 | 240 |

Table 29 shows an example in which $K_{offset}$ is configured at regular intervals through 8 indexes and various other configurations are possible. When values of the index i are 0, 1, 2, ..., $2^M-1$ and thus the number of values is $2^M$ (M being an integer such as 2, 3, 4, ...) and when a value of $K_{offset}$ in the case of index i is $K_{offset}(i)$, it may be defined to have values at uniform intervals such as $K_{offset}(i)=K_{offset}(0)+(i-1)*A$ (A being a positive constant) for i>0. Of course, a value of M may be variable according to a system configuration, and a value of A may also be variable according to the value of M. Further, some of the indexes may be defined as a reserved field. When a maximum value of $K_{offset}$, except for the reserved field, is $K_{offset}(i_{max})$, the relation of $A=(K_{offset}(i_{max})-K_{offset}(0))/i_{max}$ may be established.

Of course, the values configured to have uniform difference are only examples, and the values may not include all of the values having uniform difference. For example, values having different differences may be configured according to an index range (a value of $i_m$ may be simply configured as $2^{M-1}$ or generally configured as another integer value).

$1 \le i < i_m$, $K_{offset}(i)=K_{offset}(0)+(i-1)*A1$ $i_m \le i \le i_{max}$, $K_{offset}(i)=K_{offset}(i_m)+(i-i_m)*A2$ A1 and A2 are different positive constants, and $A1=(K_{offset}(i_m)-K_{offset}(0))/i_m$, $A2=(K_{offset}(i_{max})-K_{offset}(i_m))/(i_{max}-i_m)$, Thereafter, the BS may transmit an index to the UE in slot n through a MAC CE, and the UE may transmit the second signal by applying $K_{offset}$ indicated in slot n+k. A value of k may be configured or may be determined according to SCS.

The first embodiment to the fifth embodiment have been separately described for convenience of description, but the respective embodiments include operations associated with each other, and thus two or more embodiments may be combined. Further, methods of the respective embodiments are not exclusive, and one or more methods may be combined and performed.

The transmission and reception method of the BS, the satellite, and the UE or a transmission side or a reception side for performing the embodiments is described, and the BS, the satellite, and a receiver, a processor, and a transmitter of the UE should operate according to each embodiment.

Figure 36:
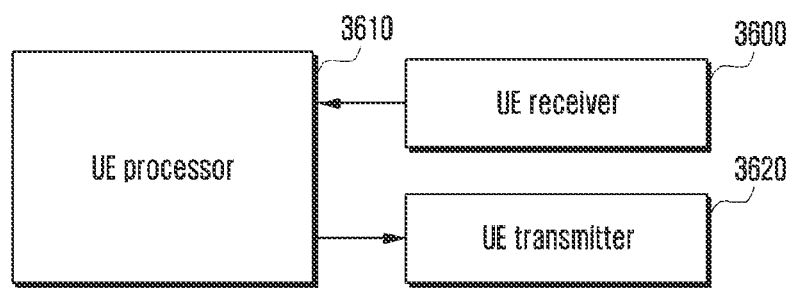
FIG. 36 is a block diagram illustrating an internal structure of the UE according to an embodiment.

FIG. 36 is a block diagram illustrating an internal structure of the UE according to an embodiment. As illustrated in FIG. 36, the UE may include a UE receiver 3600, a UE transmitter 3620, and a UE processor 3610. The UE receiver 3600 and the UE transmitter 3620 are commonly called a transceiver in an embodiment. The transceiver may transmit and receive a signal to and from the BS. The signal may include control information and data. To this end, the transceiver may include an RF transmitter that up-converts and amplifies a frequency of a transmitted signal, an RF receiver that low-noise amplifies a received signal and down-converts the frequency, and the like. Further, the transceiver may receive a signal through a wireless channel, output the signal to the terminal processor 3610, and transmit the signal output from the terminal processor 3610 through a wireless channel. The UE processor 3610 may control a series of processes such that the UE operates according to the above-described embodiments. For example, the UE receiver 3600 may receive a signal from the satellite or the ground BS and a signal from the GNSS, and the UE processor 3610 may transmit and receive a signal to the BS according to the method described in the disclosure. Thereafter, the UE transmitter 3620 may transmit a signal using a determined time point.

Figure 37:
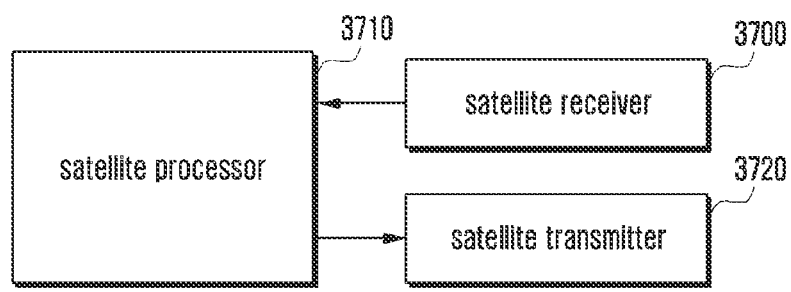
FIG. 37 is a block diagram illustrating an internal structure of the satellite according to an embodiment.

FIG. 37 is a block diagram illustrating the internal structure of the satellite according to an embodiment. As illustrated in FIG. 37, the satellite may include a satellite receiver 3700, a satellite transmitter 3720, and a satellite processor 3710. The receiver, the transmitter, and the processor may be plural. That is, a receiver and a transmitter for transmitting and receiving a signal to and from the UE and a transmitter and a reception for transmitting and receiving a signal to and from the BS (and a receiver and a transmitter for transmitting and receiving a signal to and from another satellite) may be separately provided. The satellite receiver 3700 and the satellite transmitter 3720 may be commonly called a transmitter of the satellite in the embodiment. The transceiver may transmit and receive a signal to and from the UE and the BS. The signal may include control information and data. To this end, the transceiver may include an RF transmitter that up-converts and amplifies a frequency of a transmitted signal, an RF receiver that low-noise amplifies a received signal and down-converts the frequency, and the like. Further, the transceiver may receive a signal through a radio channel, output the signal to the satellite processor 3710, and transmit the signal output from the satellite processor 3710 through a radio channel. The satellite processor 3710 may include a compensator (pre-compensator) for compensating for a frequency offset or Doppler shift and also a device capable of tracking the location through a GPS or the like. Further, the satellite processor 3710 may include a frequency shift function for moving a center frequency of the received signal. The satellite processor 3710 may control a series of processes such that the satellite, the BS, and the UE operate according to the above-described embodiments. For example, the satellite receiver 3700 may receive a PRACH preamble from the UE and transmit a RAR according thereto to the UE again, thereby determining transmission of TA information to the BS. Thereafter, the satellite transmitter 3720 may transmit corresponding signals at a determined time point.

Figure 38:
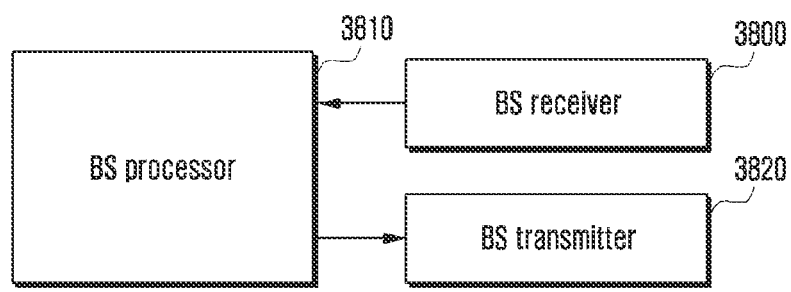
FIG. 38 is a block diagram illustrating an internal structure of the BS according to an embodiment.

FIG. 38 is a block diagram illustrating an internal structure of the BS according to an embodiment. As illustrated in FIG. 38, the BS may include a BS receiver 3800, a BS transmitter 3820, and a BS processor 3810. The BS may be the ground BS or a part of the satellite. The BS receiver 3800 and the BS transmitter 3820 are commonly called a transceiver. The transceiver may transmit and receive a signal to and from the UE. The signal may include control information and data. To this end, the transceiver may include an RF transmitter that up-converts and amplifies a frequency of a transmitted signal, an RF receiver that low-noise amplifies a received signal and down-converts the frequency, and the like. Further, the transceiver may receive a signal through a wireless channel, output the signal to the BS processor 3810, and transmit the signal output from the BS processor 3810 through a wireless channel. The BS processor 3810 may control a series of processes such that the BS operates according to the above-described embodiments. For example, the BS processor 3810 may transmit a RAR including TA information.

The above embodiments may be employed individually or in combination, as necessary. For example, embodiments 1 and 2 may be applied in combination, and may be implemented in LTE, 5G, and other systems.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a user equipment (UE) configured to operate in a wireless communication system, the method comprising:

identifying a timing advance (TA) value for transmitting an uplink signal, wherein the TA value is identified based on a first value NTA, a second value NTA, common, and a third value NTA,UE-specific;
receiving a first offset for an uplink transmission timing via higher layer signaling:
receiving a downlink signal indicating a second offset for the uplink transmission timing; and
transmitting the uplink signal based on a timing of the downlink signal, the first offset, the second offset, and the TA value,
wherein the first value $N_{TA}$ is based on one of a random access response or a timing advance medium access control (MAC) control element (CE),
wherein the second value $N_{TA,common}$ is derived from higher layer parameters, and
wherein the third value $N_{TA,uE-specific}$ is obtained by the UE based on a position of the UE and information on a position of a satellite wirelessly connected to the UE.

2. The method of claim 1, wherein the second value $N_{TA,common}$ is derived from the higher layer parameters including a common TA parameter, a drift rate parameter of a common TA, and a drift variation parameter of the common TA.

3. The method of claim 2, wherein the second value $N_{TA,common}$ is derived from:

$$A\,(t1)+(t2-t1)\cdot B+(t2-t1)^2\cdot C,$$

wherein A is the common TA parameter, B is the drift rate parameter, C is the drift variation parameter, t1 is a reference timing of the higher layer parameters, and t2 is a timing for deriving the second value $N_{TA,common}$.

4. The method of claim 1, wherein the information on the position of the satellite is received via higher layer signaling.

5. The method of claim 1, further comprising:
transmitting a TA report including information on the third value $N_{TA,UE-specific}$, based on a comparison between a threshold value and the information on the third value $N_{TA,UE-specific}$,
wherein the threshold value is received via higher layer signaling.

6. A user equipment (UE) configured to operate in a wireless communication system, the UE comprising:
a transceiver; and
a controller coupled with the transceiver and configured to:
identify a timing advance (TA) value for transmitting an uplink signal, wherein the TA value is identified based on a first value $N_{TA}$, a second value $N_{TA,common}$, and a third value $N_{TA,UE-specific}$,
receive a first offset for an uplink transmission timing via higher layer signaling,
receive a downlink signal indicating a second offset for the uplink transmission timing, and
transmit the uplink signal based on a timing of the downlink signal, the first offset, the second offset, and the TA value,
wherein the first value $N_{TA}$ is based on one of a random access response or a timing advance medium access control (MAC) control element (CE),
wherein the second value $N_{TA,common}$ is derived from higher layer parameters, and
wherein the third value $N_{TA,uE-specific}$ is obtained by the UE based on a position of the UE and information on a position of a satellite wirelessly connected to the UE.

7. The UE of claim 6, wherein the second value $N_{TA,common}$ is derived from the higher layer parameters including a common TA parameter, a drift rate parameter of a common TA, and a drift variation parameter of the common TA.

8. The UE of claim 7, wherein the second value $N_{TA,common}$ is derived from:

$$A\,(t1)+(t2-t1)\cdot B+(t2-t1)^2\cdot C,$$

wherein A is the common TA parameter, B is the drift rate parameter, C is the drift variation parameter, t1 is a reference timing of the higher layer parameters, and t2 is a timing for deriving the second value $N_{TA,common}$.

9. The UE of claim 6, wherein the information on the position of the satellite is received via higher layer signaling.

10. The UE of claim 6, wherein the controller is further configured to:
transmit a TA report including information on the third value $N_{TA,uE-specific}$, based on a comparison between a threshold value and the information on the third value $N_{TA,UE-specific}$,
wherein the threshold value is received via higher layer signaling.

11. A method performed by a base station configured to operate in a wireless communication system, the method comprising:
identifying a timing advance (TA) value for receiving an uplink signal from a user equipment (UE), wherein the TA value is based on a first value NTA, a second value NTA.common, and a third value NTA.UE-specific;
transmitting a first offset for an uplink transmission timing via higher layer signaling;
transmitting a downlink signal indicating a second offset for the uplink transmission timing; and
receiving the uplink signal associated with the uplink transmission timing, wherein the uplink transmission timing is based on a timing of the downlink signal, the first offset, the second offset, and the TA value,
wherein the first value $N_{TA}$ is associated with a random access response or a timing advance medium access control (MAC) control element (CE),
wherein the second value $N_{TA,common}$ is associated with higher layer parameters, and
wherein the third value $N_{TA,uE-specific}$ is obtained by the UE based on a position of the UE and information on a position of a satellite wirelessly connected to the UE.

12. The method of claim 11, wherein the higher layer parameters includes a common TA parameter, a drift rate parameter of a common TA, and a drift variation parameter of the common TA.

13. The method of claim 11, wherein the information on the position of the satellite is transmitted via higher layer signaling.

14. The method of claim 11, further comprising:
receiving a TA report including information on the third value $N_{TA,UE-specific}$,
wherein the threshold value for trigger the TA report is transmitted via higher layer signaling.

15. A base station configured to operate in a wireless communication system, the base station comprising:
a transceiver; and
a controller coupled with the transceiver and configured to:
identify a timing advance (TA) value for receiving an uplink signal from a user equipment (UE), wherein the TA value is based on a first value $N_{TA}$, a second value $N_{TA,common}$, and a third value $N_{TA,UE-specific}$,
transmit a first offset for an uplink transmission timing via higher layer signaling, transmit a downlink signal indicating a second offset for the uplink transmission timing, and receive the uplink signal associated with the uplink transmission timing, wherein the uplink transmission timing is based on a timing of the downlink signal, the first offset, the second offset, and the TA value, wherein the first value $N_{TA}$ is associated with a random access response or a timing advance medium access control (MAC) control element (CE), wherein the second value $N_{TA,common}$ is associated with higher layer parameters, and wherein the third value $N_{TA,UE\text{-}specific}$ is obtained by the UE based on a position of the UE and information on a position of a satellite wirelessly connected to the UE.

16. The base station of claim 15, wherein the higher layer parameters includes a common TA parameter, a drift rate parameter of a common TA, and a drift variation parameter of the common TA.

17. The base station of claim 15, wherein the information on the position of the satellite is transmitted via higher layer signaling.

18. The base station of claim 15, wherein the controller is further configured to receive a TA report including information on the third value $N_{TA,UE\text{-}specific}$, and wherein the threshold value for trigger the TA report is transmitted via higher layer signaling.

* * * * *